(12) United States Patent  
Backholm et al.

(10) Patent No.: US 9,819,552 B2  
(45) Date of Patent: Nov. 14, 2017

(54) MODELING NETWORK SIGNALING IN A MOBILE NETWORK

(71) Applicant: Seven Networks, LLC, Marshall, TX (US)

(72) Inventors: Ari Backholm, San Francisco, CA (US); Andrey Shvayka, Kiev (UA)

(73) Assignee: Seven Networks, LLC, Marshall, TX (US)

(*) Notice: Subject to any disclaimer, the term of this patent is extended or adjusted under 35 U.S.C. 154(b) by 0 days.

(21) Appl. No.: 14/295,289

(22) Filed: Jun. 3, 2014

(65) Prior Publication Data

US 2015/0012257 A1 Jan. 8, 2015

Related U.S. Application Data

(60) Provisional application No. 61/842,279, filed on Jul. 2, 2013.

(51) Int. Cl.
*G06G 7/62* (2006.01)
*H04L 12/24* (2006.01)
*H04L 12/26* (2006.01)

(52) U.S. Cl.
CPC ........ *H04L 41/145* (2013.01); *H04L 41/0893* (2013.01); *H04L 43/10* (2013.01)

(58) Field of Classification Search
CPC ..... H04L 41/145; H04L 41/147; H04L 41/14; H04L 41/0893; H04L 43/10; H04W 24/06

(Continued)

(56) References Cited

U.S. PATENT DOCUMENTS 6,615,166 B1* 9/2003 Guheen et al. ............ 703/27
6,650,731 B1* 11/2003 Steltner .............. H04Q 3/0091
379/15.01

(Continued)

FOREIGN PATENT DOCUMENTS

KR 20080039156 A 5/2008
WO 2006099524 A1 9/2006

OTHER PUBLICATIONS

Bajaj, Lokesh, et al., "GloMoSim: A Scalable Network Simulation Environment," May 1999, Computer Science Department, University of California, Los Angeles, UCLA Computer Science Department Technical Report 990027, pp. 1-12.*

(Continued)

*Primary Examiner* — Juan Ochoa
(74) *Attorney, Agent, or Firm* — NK Patent Law, PLLC

(57) ABSTRACT

The disclosed technology includes systems and methods for modeling signaling and/or connections in a mobile network, and specifically, the benefits of any optimization technique on the traffic including signals and/or connections in the mobile network. Embodiments can allocate signaling to specific applications (e.g., to determine which applications are chatty and which can cause problematic signaling), and/or to further model the optimizations or savings utilizing the disclosed traffic optimization technology. In some embodiments, to enable or enhance the performance of the data traffic and signal optimization for the network, the disclosed technology includes one or more fields (e.g., an expanded "CRCS" fields) that are calculated by, for example, a CRCS analysis core module, to define and identify at least: (1) whether a transaction causes a connection (and thus signaling); and (2) the number of connections that are reduced or saved by the disclosed embodiments of distributed caching and proxy system.

16 Claims, 68 Drawing Sheets

(58) Field of Classification Search
USPC .......................................................... 703/13
See application file for complete search history.

(56) References Cited

U.S. PATENT DOCUMENTS

| | | | |
|---|---|---|---|
| 7,389,538 B2* | 6/2008 | Wells ............................. 726/22 |
| 7,398,271 B1* | 7/2008 | Borkovsky ....... G06F 17/30864 |
| 7,774,440 B1* | 8/2010 | Bagrodia et al. ............. 709/221 |
| 8,166,164 B1* | 4/2012 | Luna ....................... H04L 67/22 709/203 |
| 8,190,701 B2* | 5/2012 | Luna ....................... H04L 67/04 709/213 |
| 8,204,953 B2* | 6/2012 | Luna ....................... H04L 67/04 709/213 |
| 8,908,535 B2* | 12/2014 | Campbell et al. ............ 370/242 |
| 8,977,284 B2* | 3/2015 | Reed ................... H04W 64/006 455/404.2 |
| 9,137,739 B2* | 9/2015 | Raleigh ............ G06Q 10/06375 |
| 9,413,839 B2* | 8/2016 | Annan ................... H04L 67/22 |
| 9,497,094 B2* | 11/2016 | Manghirmalani .. H04L 43/0894 |
| 2006/0183462 A1* | 8/2006 | Kolehmainen .......... H04B 5/00 455/411 |
| 2007/0019576 A1 | 1/2007 | Huang |
| 2007/0061393 A1* | 3/2007 | Moore ................ G06F 17/3089 709/201 |
| 2007/0260475 A1 | 11/2007 | Bhanote |
| 2013/0031599 A1* | 1/2013 | Luna .................... G06F 21/554 726/1 |
| 2013/0223227 A1 | 8/2013 | Lee et al. |
| 2014/0036697 A1* | 2/2014 | Annan .................... H04L 67/28 370/252 |
| 2015/0012257 A1 | 1/2015 | Backholm et al. |

OTHER PUBLICATIONS

Zeng et al., "GloMoSim: A Library for Parallel Simulation of Large-scale Wireless Networks", May 26-29, 1998, Department of Computer Science, University of California, Los Angeles, Proceedings of the 12th Workshop on Parallel and Distributed Simulations-PADS, pp. 1-8.*

Koopman et al., "Cyclic Redundancy Code (CRC) Polynomial Selection for Embedded Networks", 2004, Preprint: The International Conference on Dependable Systems and Networks, DSN-2004, pp. 1-11.*

Philip Koopman, "32-Bit Cyclic Redundancy Codes for Internet Applications", 2002, Preprint of a regular paper to appear in The International Conference on Dependable Systems and Networks (DSN) 2002, pp. 1-11.*

IEEE 100 The Authoritative Dictionary of IEEE Standards Terms, 2000, Seventh Edition, p. 435.*

IPRP for Application No. PCT/US2014/040766 dated Oct. 2, 2014.

Yadigar Cakmak, 'Mobile Traffic Modeling', Middle East Technical University, Dec. 31, 2004, available at: http://etd.lib.metu.edu.tr/upload/12605662/index.pdf.

M. Zubair Shafiq et al., 'Characterizing and Modeling Internet Traffic Dynamics of Cellular Devices', Sigmetrics' 11, Jun. 7, 2011, available at: http://www2.research.att.com/~jiawang/Sigmetrics2011-CellularNetworkDevice.pdf.

USPTO, Non-Final Rejection in U.S. Appl. No. 14/832,955 dated Jan. 23, 2017.

USPTO, Non-Final Rejection in U.S. Appl. No. 14/847,697 dated Feb. 22, 2017.

* cited by examiner

| Traffic Category/Application Category 700 ||
|---|---|
| Interactive traffic | Background traffic |
| User waiting for response | User not waiting for response |
| Application in foreground | Application in background |
| Backlight on | Backlight off |

*FIG. 6*

| Content Category 800 ||
|---|---|
| High priority | Low priority |
| Time critical | Non-time critical |

*FIG. 7*

| Mobile Application/Widget 955 | Local Proxy 965 | Host server 985 Server Cache 935 or Caching Proxy 975 | Application Server/ Content Provider 995 |
|---|---|---|---|
| Polls application server/provider 932 | Poll intercepted 934 | | |
| | Proxy detects that cache content is available for the polled content and is valid and thus retrieves a response to satisfy the poll 936 | | |
| Receives a response to the poll from a cache entry 938 | | | |
| Polls application server/provider 940 | Poll intercepted 942 | | |
| | Proxy detects that cache content is unavailable and decides to setup the polled source for caching 944 | | |
| | Poll request forwarded to the source 946 | | Receives the poll request from the application and provides a response to satisfy the current request 948 |
| Receives the response to satisfy the request from the application server/provider 950 | | | |
| | Tracks polling frequency of the application and sets up a polling schedule for the host server 952 | | |
| | Sends the cache setup to the host server 954 | Receives the cache setup including an identification of the application server/provider to be polled and a polling schedule 956 | |
| | | Polls the Application server/provider to monitor the response to the request 958 | Receives poll from host server and sends the response 960 |
| | | Same response received, pulls the application based on the polling schedule 962 | Receives poll from host server and sends the response 964 |
| | | Detects changed or new response, notifies the local proxy 966 | |
| | | Changed or new response stored in the server cache or the caching proxy 968 | |
| | Receives notification that new or changed data is available; invalidates relevant cache entries 970 | | |
| Polls application server/content provider 972 | Determines that no valid cache entry is available and retrieves the response from the server cache 974 | Receives request for the new response and sends the response to the local proxy 976 | |
| Request satisfied from the server cache or caching proxy 978 | | | |
| Polls application server/content provider 980 | Determines that no valid cache entry is available and forwards the poll to the application server/provider 982 | | Receives poll from and sends the response 984 |
| Request satisfied from the application server/provider 986 | | | |

*FIG. 8*

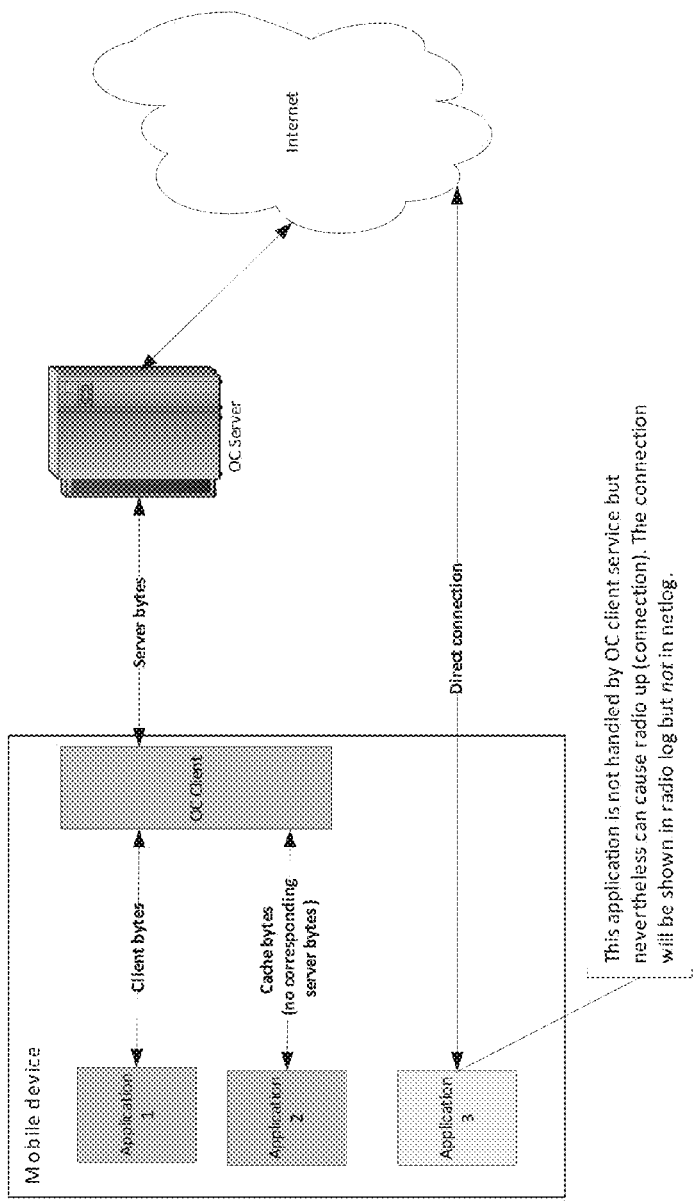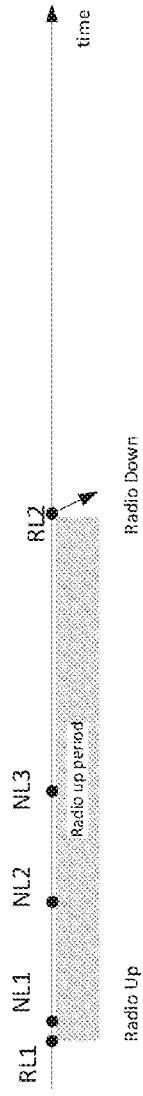
FIG. 11A
FIG. 11B

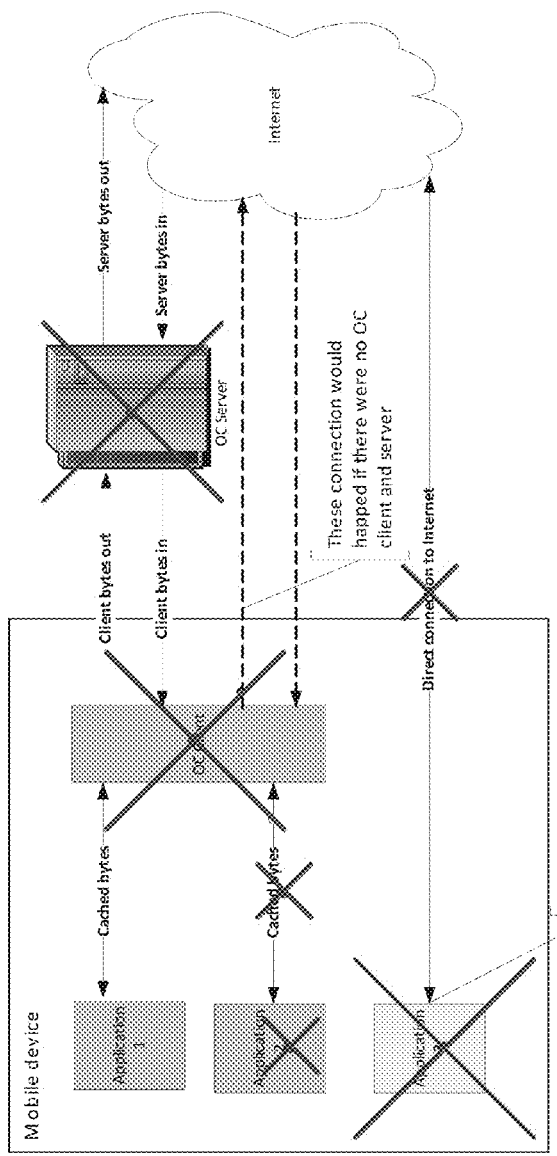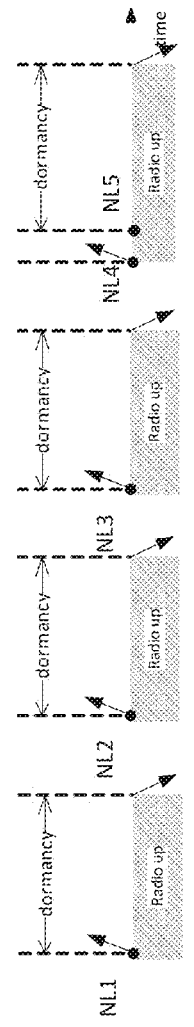
FIG. 16A
FIG. 16B

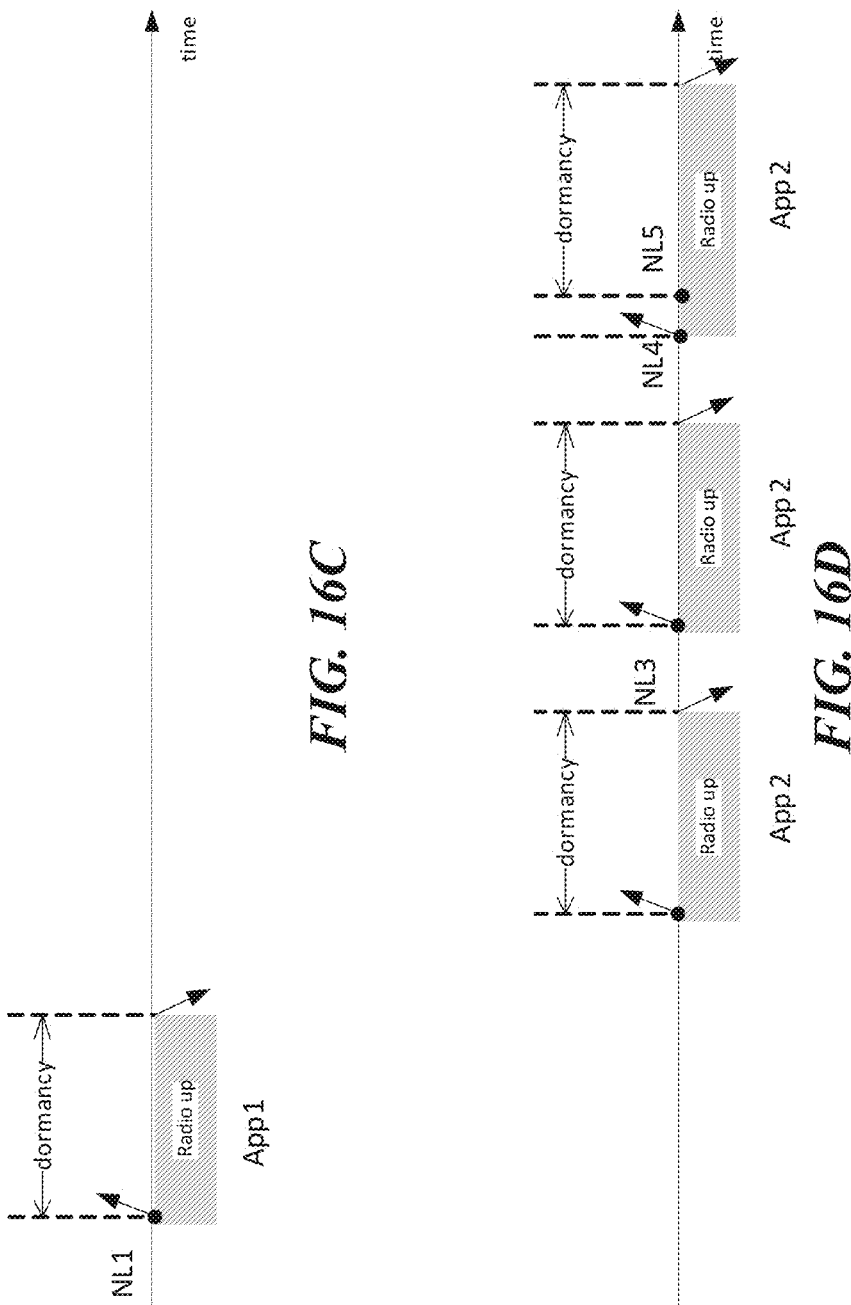

| Metric | Unit | Formula | Expanded Form | Description |
|---|---|---|---|---|
| OC-AT-ADJ | Byte | SUM(TOTAL_BYTE_FROM_APP+ TOTAL_BYTE_TO_APP) | OC App Traffic | Total bytes transferred to/from application from/to OC client. (tcp payload w/o retries) |
| OC-NT | Byte | SUM(TOTAL_HITS_FROM_NET+ TOTAL_BYTE_TO_NET) | OC Network Traffic | Total bytes transferred to/from network from/to OC client. (tcp payload w/o retries) |
| OC-ST | Byte | SUM(TOTAL_BYTE_TO_APP)- SUM(TOTAL_BYTE_FROM_NET) + SUM(TOTAL_BYTE_FROM_APP)- SUM(TOTAL_BYTE_TO_NET) | OC Saved Traffic | (OC-AT-ADJ) – (OC-NT) Total bytes saved as difference between data served/requested to/from application and network. |
| TNT | Byte | SUM(TOTAL_TRAFFIC_IN) + SUM(TOTAL_TRAFFIC_OUT) | Total Network Traffic | Total traffic flowing to and from network for all applications (all IP layer traffic, incl tcp/ip overhead and retries) |
| TAT | Byte | SUM(TOTAL_TRAFFIC_IN)+ SUM(TOTAL_TRAFFIC_OUT)+ SUM(TOTAL_BYTE_TO_APP)- SUM(TOTAL_BYTE_FROM_NET) + SUM(TOTAL_BYTE_FROM_APP)- SUM(TOTAL_BYTE_TO_NET) | Total App Traffic | (OC-ST)+TNT Total traffic flowing to and from application for all applications |
| BOO | Byte | (((SUM(AAA.TOTAL_BYTE_FROM_APP)+SUM(A AA.TOTAL_BYTE_TO_APP))- (SUM(AAA.TOTAL_BYTE_FROM_NET)+SUM(AA A.TOTAL_BYTE_TO_NET))/((SUM(AAA.TOTAL_ TRAFFIC_IN)+SUM(AAA.TOTAL_TRAFFIC_OUT)) / TCPIP_OVERHEAD+(SUM(AAA.TOTAL_BYTE_FR OM_APP)+SUM(AAA.TOTAL_BYTE_TO_APP)) - (SUM(AAA.TOTAL_BYTE_FROM_NET)+SUM(AA A.TOTAL_BYTE_TO_NET)))) | Bytes Optimization Overall | (OC-ST) / TAT Ratio of bytes saved and total traffic through the network. Calculated for all applications. |

*FIG. 23A*

| Metric | Unit | Formula | Expanded Form | Description |
|---|---|---|---|---|
| BC | Byte | | Bytes Coverage | (OC-AT-ADJ) / TAT |
| BOI | Byte | ((SUM(TOTAL_BYTE_FROM_APP)+SUM(TOTAL_BYTE_TO_APP))-(SUM(TOTAL_BYTE_FROM_NET)+SUM(TOTAL_BYTE_TO_NET)))/(SUM(TOTAL_BYTE_FROM_APP)+SUM(TOTAL_BYTE_TO_APP)) | Bytes Optimization Internal | (OC-ST) / (OC-AT-ADJ) Ratio of bytes saved and total bytes requested by the application. Calculated for OC proxied applications only. |
| OC-AC | Connections | SUM(RADIO_STATE_CHANGES_ACTUAL) + SUM(RADIO_STATE_CHANGES_SAVED) | OC App Connections | Total connections made by the device to the network if OC was absent. Only for OC proxied applications. Calculated using radio logs and netlog. |
| OC-NC | Connections | SUM(RADIO_STATE_CHANGES_ACTUAL) | OC Network Connections | Actual connections made by device to the network. Only for OC proxied applications. Calculated using radio logs and netlog. |
| OC-SC | Connections | SUM(SIM_RADIO_STATE_CHANGES_SAVED) | OC Saved Connections | (OC-AC) - (OC-NC) |
| OC-SAC | Connections | SUM(SIM_RADIO_STATE_CHANGES_ACTUAL) + SUM(SIM_RADIO_STATE_CHANGES_SAVED) | OC Simulated App Connections | Total connections made by all OC proxied applications (internal) if OC is absent. Calculated using netlog and assuming only OC proxied apps are running on device. |
| OC-SNC | Connections | SUM(SIM_RADIO_STATE_CHANGES_ACTUAL) | OC Simulated Network Connections | Actual connections created for all OC proxied applications (internal). Calculated using netlog and assuming only OC proxied apps are running on device. |
| OC-APP-SAC | Connections | SUM(SIM_RADIO_STATE_CHANGES_ACTUAL) + SUM(SIM_RADIO_STATE_CHANGES_SAVED) | OC per App Simulated App Connections | Per app connections assuming it is the only application running and OC is absent. Only for OC proxied apps. |

*FIG. 23B*

| Metric | Unit | Formula | Expanded Form | Description |
|---|---|---|---|---|
| BC | Byte | | Bytes Coverage | {(OC-AT-AD)} / TAT |
| BOI | Byte | ((SUM(TOTAL_BYTE_FROM_APP)+SUM(TOTAL_BYTE_TO_APP))-(SUM(TOTAL_BYTE_FROM_NET)+SUM(TOTAL_BYTE_TO_NET)))/(SUM(TOTAL_BYTE_FROM_APP)+SUM(TOTAL_BYTE_TO_APP)) | Bytes Optimization Internal | {OC-ST} / {OC-AT-AD} Ratio of bytes saved and total bytes requested by the application. Calculated for OC proxied applications only. |
| OC-AC | Connections | SUM(RADIO_STATE_CHANGES_ACTUAL) + SUM(RADIO_STATE_CHANGES_SAVED) | OC App Connections | Total connections made by the device to the network if OC was absent. Only for OC proxied applications. Calculated using radio logs and netlog. |
| OC-NC | Connections | SUM(RADIO_STATE_CHANGES_ACTUAL) | OC Network Connections | Actual connections made by device to the network. Only for OC proxied applications. Calculated using radio logs and netlog. |
| OC-SC | Connections | SUM(SIM_RADIO_STATE_CHANGES_SAVED) | OC Saved Connections | {OC-AC} - {OC-NC} |
| OC-SAC | Connections | SUM(SIM_RADIO_STATE_CHANGES_ACTUAL) + SUM(SIM_RADIO_STATE_CHANGES_SAVED) | OC Simulated App Connections | Total connections made by all OC proxied applications (internal) if OC is absent. Calculated using netlog and assuming only OC proxied apps are running on device. |
| OC-SNC | Connections | SUM(SIM_RADIO_STATE_CHANGES_ACTUAL) | OC Simulated Network Connections | Actual connections created for all OC proxied applications (internal). Calculated using netlog and assuming only OC proxied apps are running on device. |

*FIG. 23C*

| Metric | Unit | Formula | Expanded Form | Description |
|---|---|---|---|---|
| OC-APP-SAC | Connections | SUM(SIM_RADIO_STATE_CHANGES_ACTUAL) + SUM(SIM_RADIO_STATE_CHANGES_SAVED) | OC per App Simulated App Connections | Per app connections assuming it is the only application running and OC is absent. Only for OC proxied apps. |
| OC-NTC | Time | SUM(RADIO_STATE_CHANGES_ACTUAL) | OC Network Time Connected | Actual time device is connected to the network. Only for OC proxied applications. |
| OC-STC | Time | SUM(RADIO_TIME_CONN_SAVED) | OC Saved Time Connected | OC-ATC – OC-NTC |
| OC-SATC | Time | SUM(SIM_RADIO_STATE_CHANGES_ACTUAL + SIM_RADIO_STATE_CHANGES_SAVED) | OC Simulated App Time Connected | Total connections made by all OC proxied applications (internal) and app-specific assuming it is the only application running and OC is absent. Calculated using netlog and assuming only OC proxied apps are running on device. |
| OC-SNTC | Time | SUM(SIM_RADIO_STATE_CHANGES_ACTUAL) | OC Simulated Network Time Connected | Actual connections created for all OC proxied applications (internal) and app-specific assuming it is the only application running. Calculated using netlog and assuming only OC proxied apps are running on device. |
| OC-APP-SATC | Time | SUM(SIM_RADIO_STATE_CHANGES_ACTUAL + SIM_RADIO_STATE_CHANGES_SAVED) | OC per App Simulated App Time Connected | Per App connections made assuming it is the only application running and OC is absent. Calculated using netlog and only for OC proxied apps |
| OC-APP-SNTC | Time | SUM(SIM_RADIO_STATE_CHANGES_ACTUAL) | OC per App Simulated Network Time Connected | Per App Actual connections created assuming it is the only application running. Calculated using netlog and only for OC proxied apps |

*FIG. 23D*

| Metric | Unit | Formula | Expanded Form | Description |
|---|---|---|---|---|
| OC-APP-SAC | Connections | SUM(SIM_RADIO_STATE_CHANGES_ACTUAL) + SUM(SIM_RADIO_STATE_CHANGES_SAVED) | OC per App Simulated App Connections | Per app connections assuming it is the only application running and OC is absent. Only for OC proxied apps. |
| OC-NTC | Time | SUM(RADIO_STATE_CHANGES_ACTUAL) | OC Network Time Connected | Actual time device is connected to the network. Only for OC proxied applications. |
| OC-STC | Time | SUM(RADIO_TIME_CONN_SAVED) | OC Saved Time Connected | OC-NTC - OC-NTC |
| OC-SATC | Time | SUM(SIM_RADIO_STATE_CHANGES_ACTUAL + SIM_RADIO_STATE_CHANGES_SAVED) | OC Simulated App Time Connected | Total connections made by all OC proxied applications (internal) and app-specific assuming it is the only application running and OC is absent. Calculated using netlog and assuming only OC proxied apps are running on device. |
| OC-SNTC | Time | SUM(SIM_RADIO_STATE_CHANGES_ACTUAL) | OC Simulated Network Time Connected | Actual connections (internal) and app-specific assuming it is the only application running. Calculated using netlog and assuming only OC proxied apps are running on device. |
| OC-APP-SATC | Time | SUM(SIM_RADIO_STATE_CHANGES_ACTUAL + SIM_RADIO_STATE_CHANGES_SAVED) | OC per App Simulated App Time Connected | Per App connections made assuming it is the only application running and OC is absent. Calculated using netlog and only for OC proxied apps |
| OC-APP-SNTC | Time | SUM(SIM_RADIO_STATE_CHANGES_ACTUAL) | OC per App Simulated Network Time Connected | Per App Actual connections created assuming it is the only application running. Calculated using netlog and only for OC proxied apps |

*FIG. 23E*

| Metric | Unit | Formula | Expanded Form | Description |
|---|---|---|---|---|
| DAI_B | Byte | SUM(TOTAL_BYTE_FROM_APP) | Data Application In | Bytes transferred from application to the OC client |
| DAI_H | Hits | SUM(TOTAL_HITS_FROM_APP) | Data Application In | Number of times data is requested by application from the OC client |
| DAO_B | Byte | SUM(TOTAL_BYTE_TO_APP) | Data Application Out | Bytes transferred to the application from OC client |
| DAO_H | Hits | SUM(TOTAL_HITS_TO_APP) | Data Application Out | Number of times data is transferred to the application from the OC client |
| DAT_B | Byte | SUM(TOTAL_BYTE_FROM_APP) + SUM(TOTAL_BYTE_TO_APP) | Data Application Total | Total bytes transferred to/from application from/to OC client |
| DAT_H | Hits | SUM(TOTAL_HITS_FROM_APP) + SUM(TOTAL_HITS_TO_APP) | Data Application Total | Total number of times data requested /transferred by/to application from OC client |
| DNI_B | Byte | SUM(TOTAL_BYTE_FROM_NET) | Data Network In | Bytes transferred from network to the OC client |
| DNI_H | Hits | SUM(TOTAL_HITS_FROM_NET) | Data Network In | Number of times data is transferred by network to the OC client |
| DNO_B | Byte | SUM(TOTAL_BYTE_TO_NET) | Data Network Out | Bytes transferred to the network from OC client |
| DNO_H | Hits | SUM(TOTAL_HITS_TO_NET) | Data Network Out | Number of times data is requested by the OC client from the network |
| DNT_B | Byte | SUM(TOTAL_BYTE_FROM_NET) + SUM(TOTAL_BYTE_TO_NET) | Data Network Total | Total bytes transferred to/from network from/to OC client |
| DNT_H | Hits | SUM(TOTAL_HITS_FROM_NET) + SUM(TOTAL_HITS_TO_NET) | Data Network Total | Total number of times data requested /transferred by/to OC client from network |
| DOI_B | Byte | SUM(TOTAL_BYTE_FROM_CACHE) + SUM(TOTAL_BYTE_FROM_NET) - SUM(TOTAL_BYTE_TO_APP) | Data Overhead In | |
| DOI_H | Hits | SUM(TOTAL_HITS_FROM_CACHE) + SUM(TOTAL_HITS_FROM_NET) - SUM(TOTAL_HITS_TO_APP) | Data Overhead In | |

FIG. 26A

| Metric | Unit | Formula | Expanded Form | Description |
|---|---|---|---|---|
| DOO_H | Hits | SUM(TOTAL_HITS_CACHE_REQ) + SUM(TOTAL_HITS_TO_NET) - SUM(TOTAL_HITS_FROM_APP) | Data Overhead Out | |
| DOT_B | Byte | SUM(TOTAL_BYTE_FROM_CACHE) + SUM(TOTAL_BYTE_FROM_NET) - SUM(TOTAL_BYTE_TO_APP) + SUM(TOTAL_BYTE_CACHE_REQ) + SUM(TOTAL_BYTE_TO_NET) - SUM(TOTAL_BYTE_FROM_APP) | Data Overhead Total | |
| DOT_H | Hits | SUM(TOTAL_HITS_FROM_CACHE) + SUM(TOTAL_HITS_FROM_NET) - SUM(TOTAL_HITS_TO_APP) + SUM(TOTAL_HITS_CACHE_REQ) + SUM(TOTAL_HITS_TO_NET) - SUM(TOTAL_HITS_FROM_APP) | Data Overhead Total | |
| DSI_B | Byte | SUM(TOTAL_BYTE_TO_APP) - SUM(TOTAL_BYTE_FROM_NET) | Data Saved In | DAO_B – DNI_B ; Difference between data served to application and network data i.e. data served from cache or savings due to compression |
| DSI_H | Hits | SUM(TOTAL_HITS_TO_APP) - SUM(TOTAL_HITS_FROM_NET) | Data Saved In | DAO_H – DNI_H ; Requests saved as difference between responses sent to application and response received from network |
| DSO_B | Byte | SUM(TOTAL_BYTE_FROM_APP) - SUM(TOTAL_BYTE_TO_NET) | Data Saved Out | DAI_B – DNO_B ; Difference between data requested by application and actually sent to network i.e. data served from cache |
| DSO_H | Hits | SUM(TOTAL_HITS_FROM_APP) - SUM(TOTAL_HITS_TO_NET) | Data Saved Out | DAI_H – DNO_H ; Requests saved as difference between requests made by application and actually sent to the network |
| DST_B | Byte | SUM(TOTAL_BYTE_TO_APP) - SUM(TOTAL_BYTE_FROM_NET) + SUM(TOTAL_BYTE_FROM_APP) - SUM(TOTAL_BYTE_TO_NET) | Data Saved Total | DAO_B – DNI_B + DAI_B – DNO_B ; Total bytes saved as difference between data served/requested to/from application and network. |

*FIG. 26B*

| Metric | Unit | Formula | Expanded Form | Description |
|---|---|---|---|---|
| TI | Byte | SUM(TOTAL_TRAFFIC_IN) | Traffic In | Traffic proxy to OC and other applications from the network. Measured by operating system. Includes the tcpip overhead |
| TO | Byte | SUM(TOTAL_TRAFFIC_OUT) | Traffic Out | Traffic proxy through OC and other applications to the network. Measured by operating system. Includes the tcpip overhead |
| TT | Byte | SUM(TOTAL_TRAFFIC_IN) + SUM(TOTAL_TRAFFIC_OUT) | Traffic Total | Total traffic flowing to and from network for all applications |

*FIG. 26C*

| Metric | Unit | Formula | Expanded Form | Description |
|---|---|---|---|---|
| IOIB | Byte | (SUM(TOTAL_BYTE_TO_APP) - SUM(TOTAL_BYTE_FROM_NET))/ SUM(TOTAL_BYTE_TO_APP) | Internal Optimization In Bytes | DSI_B/DAO_B |
| IOIH | Hits | (SUM(TOTAL_HITS_TO_APP) - SUM(TOTAL_HITS_FROM_NET))/ SUM(TOTAL_HITS_TO_APP) | Internal Optimization In Hits | DSI_H/DAO_H |
| IOOB | Byte | (SUM(TOTAL_BYTE_FROM_APP) - SUM(TOTAL_BYTE_TO_NET))/ SUM(TOTAL_BYTE_FROM_APP) | Internal Optimization Out Bytes | DSO_B/DAI_B |
| IOOH | Hits | (SUM(TOTAL_HITS_FROM_APP) - SUM(TOTAL_HITS_TO_NET))/ SUM(TOTAL_HITS_FROM_APP) | Internal Optimization Out Hits | DSO_H/DAI_H |
| IOTB | Byte | ((SUM(TOTAL_BYTE_FROM_APP)+SUM(TOTAL_BYTE_TO_APP)) - (SUM(TOTAL_BYTE_FROM_NET)+SUM(TOTAL_BYTE_TO_NET)))/ (SUM(TOTAL_BYTE_FROM_APP)+SUM(TOTAL_BYTE_TO_APP)) | Internal Optimization Total Bytes | DST_B/DAT_B, Ratio of bytes saved and total bytes requested by the application. Calculated for OC proxied applications only. |
| IOTH | Hits | ((SUM(TOTAL_HITS_FROM_APP)+SUM(TOTAL_HITS_TO_APP)) - (SUM(TOTAL_HITS_FROM_NET)+SUM(TOTAL_HITS_TO_NET)))/ (SUM(TOTAL_HITS_FROM_APP)+SUM(TOTAL_HITS_TO_APP)) | Internal Optimization Total Hits | DST_H/DAT_H |

*FIG. 26D*

| Metric | Unit | Formula | Expanded Form | Description |
|---|---|---|---|---|
| OOIB | Byte | ((SUM(AAA.TOTAL_BYTE_TO_APP)-SUM(AAA.TOTAL_BYTE_FROM_NET))/(SUM(AAA.TOTAL_BYTE_TO_APP)+SUM(AAA.TOTAL_BYTE_FROM_NET)+SUM(AAA.TOTAL_TRAFFIC_IN)/TCPIP_OVERHEAD)) | Overall Optimization In Bytes | DSI_B/(DSI_B + TI/OVERHEAD) TCPIP Overhead is determined for a carrier and can be found from oc_be_params table in BI database |
| OOOB | Byte | ((SUM(AAA.TOTAL_BYTE_FROM_APP)-SUM(AAA.TOTAL_BYTE_TO_NET))/(SUM(AAA.TOTAL_BYTE_FROM_APP)-SUM(AAA.TOTAL_BYTE_TO_NET)+SUM(AAA.TOTAL_TRAFFIC_OUT)/TCPIP_OVERHEAD)) | Overall Optimization Out Bytes | DSO_B/(DSO_B + TO/OVERHEAD) |
| OOTB | Byte | (((SUM(AAA.TOTAL_BYTE_FROM_APP)+SUM(AAA.TOTAL_BYTE_TO_APP))-(SUM(AAA.TOTAL_BYTE_FROM_NET)+SUM(AAA.TOTAL_BYTE_TO_NET)))/((SUM(AAA.TOTAL_TRAFFIC_IN)+SUM(AAA.TOTAL_TRAFFIC_OUT))/TCPIP_OVERHEAD+(SUM(AAA.TOTAL_BYTE_FROM_APP)+SUM(AAA.TOTAL_BYTE_TO_APP))-(SUM(AAA.TOTAL_BYTE_FROM_NET)+SUM(AAA.TOTAL_BYTE_TO_NET)))) | Overall Optimization Total Bytes | DST_B/(DST_B + (TI+TO)/OVERHEAD). Ratio of bytes saved and total traffic through the network. Calculated for all applications |
| ISOC | Connections | (SUM(AAA.RADIO_STATE_CHANGES_SAVED)/(SUM(AAA.RADIO_STATE_CHANGES_SAVED)+SUM(AAA.RADIO_STATE_CHANGES_ACTUAL))) | Internal Signaling Optimization Connections | Calculated only for OC proxied applications. |
| ISOTC | Time | (SUM(AAA.RADIO_TIME_CONN_SAVED)/(SUM(AAA.RADIO_TIME_CONN_SAVED)+SUM(AAA.RADIO_TIME_CONN_ACTUAL))) | Internal Signaling Optimization Time Connected | Calculated only for OC proxied applications. |

*FIG. 26E*

| Metric | Unit | Formula | Expanded Form | Description |
|---|---|---|---|---|
| OOIB | Byte | ((SUM(AAA.TOTAL_BYTE_TO_APP) - SUM(AAA.TOTAL_BYTE_FROM_NET))/(SUM(AAA.TOTAL_BYTE_TO_APP) - SUM(AAA.TOTAL_BYTE_FROM_NET)+SUM(AAA.TOTAL_TRAFFIC_IN)/TCPIP_OVERHEAD)) | Overall Optimization In Bytes | DSI_B/ (DSI_B + TI/OVERHEAD) TCPIP Overhead is determined for a carrier and can be found from oc_be_params table in BI database |
| OOOB | Byte | ((SUM(AAA.TOTAL_BYTE_FROM_APP) - SUM(AAA.TOTAL_BYTE_TO_NET))/(SUM(AAA.TOTAL_BYTE_FROM_APP) - SUM(AAA.TOTAL_BYTE_TO_NET)+SUM(AAA.TOTAL_TRAFFIC_OUT)/TCPIP_OVERHEAD)) | Overall Optimization Out Bytes | DSO_B/ (DSO_B + TO/OVERHEAD) |
| OOTB | Byte | ((((SUM(AAA.TOTAL_BYTE_FROM_APP)+SUM(AAA.TOTAL_BYTE_TO_APP)) - SUM(AAA.TOTAL_BYTE_FROM_NET)+SUM(AAA.TOTAL_BYTE_TO_NET))/((SUM(AAA.TOTAL_TRAFFIC_IN)+SUM(AAA.TOTAL_TRAFFIC_OUT))/TCPIP_OVERHEAD+(SUM(AAA.TOTAL_BYTE_FROM_APP)+SUM(AAA.TOTAL_BYTE_TO_APP)) - (SUM(AAA.TOTAL_BYTE_FROM_NET)+SUM(AAA.TOTAL_BYTE_TO_NET)))) | Overall Optimization Total Bytes | DST_B/(DST_B + (TI+TO)/OVERHEAD). Ratio of bytes saved and total traffic through the network. Calculated for all applications. |
| ISOC | Connections | (SUM(AAA.RADIO_STATE_CHANGES_SAVED)/(SUM(AAA.RADIO_STATE_CHANGES_SAVED)+SUM(AAA.RADIO_STATE_CHANGES_ACTUAL))) | Internal Signaling Optimization Connections | Calculated only for OC proxied applications. |
| ISOTC | Time | (SUM(AAA.RADIO_TIME_CONN_SAVED)/(SUM(AAA.RADIO_TIME_CONN_SAVED)+SUM(AAA.RADIO_TIME_CONN_ACTUAL))) | Internal Signaling Optimization Time Connected | Calculated only for OC proxied applications. |

*FIG. 26F*

| Metric | Unit | Formula | Description |
|---|---|---|---|
| USER_ID | Users | USER_ID | The 7tp address of the user associated with the data record. |
| USER_APP | | AAA.USER_ID\|\|AAA.APPLICATION | Concatenation of User and package name. Used to count unique combination of user processes to get per user per process metrics. An application can have multiple packages/processes |
| USER_APP_NAME | | AAA.USER_ID\|\|NVL(APP.APP_NAME, AAA.APPLICATION) | Concatenation of User and application name. Used to count unique combination of user applications to get per user per app metrics. |
| USER_DAY | User days | AAA.USER_ID\|\|TO_CHAR(AAA.TS, 'YYYYMMDD') | Concatenation of User and date. Used to count unique combination of user days to get per user per day metrics. |
| USER_DAY_APP | | AAA.USER_ID\|\|TO_CHAR(AAA.TS, 'YYYYMMDD')\|\|AAA.APPLICATION | Concatenation of User, date and package. Used to count unique combination of user days packages to get per user per day package metrics. |
| USER_DAY_APP_NAME | | AAA.USER_ID\|\|TO_CHAR(AAA.TS, 'YYYYMMDD')\|\|NVL(APP.APP_NAME, AAA.APPLICATION) | Concatenation of User, date and application name. Used to count unique combination of user days applications to get per user per day per application metrics. |
| USER_HR | User hours | AAA.USER_ID\|\|TO_CHAR(AAA.TS, 'YYYYMMDDHH24') | Concatenation of User, date and hour. Used to count unique combination of user days hour to get per user per day per hour metrics. |
| USER_HR_APP | | AAA.USER_ID\|\|TO_CHAR(AAA.TS, 'YYYYMMDDHH24')\|\|AAA.APPLICATION | Concatenation of User, date, hour and package. Used to count unique combination of user days hour packages to get per user per day per hour per package metrics. |
| USER_HR_APP_NAME | | AAA.USER_ID\|\|TO_CHAR(AAA.TS, 'YYYYMMDDHH24')\|\|NVL(APP.APP_NAME, AAA.APPLICATION) | Concatenation of User, date, hour and application name. Used to count unique combination of user days hour application to get per user per day per hour per application metrics. |

*FIG. 26G*

| Metric | Unit | Formula | Description |
|---|---|---|---|
| Battery Consumption | Charge%/Hour | ((-SUM(AAA.CHARGE_DROP_PERCENT)/(100))/ ((SUM(AAA.TIME_ON_NOT_CHARGING)/ (60*60)))) | Charge_drop_percent is the %age drop in the battery of a device. Time_on_not_charging is the time when the device is not connected to the charger. Battery consumption gives the rate at which battery is being consumed by the device when not charging. |

*FIG. 26H*

| Metric | Short notation | Unit | Formula | Description |
|---|---|---|---|---|
| data_activity_connected | RS1 | # of connections | SUM(TRANS_INTO_RADIO_STATE_1) | 'connected' in 2 state model |
| data_activity_dormant | RS2 | # of connections | SUM(TRANS_INTO_RADIO_STATE_2) | 'not connected' in 2 state model |
| data_connected | RS3 | # of connections | SUM(TRANS_INTO_RADIO_STATE_3) | 'not connected' in 2 state model |
| data_connecting | RS4 | # of connections | SUM(TRANS_INTO_RADIO_STATE_4) | 'not connected' in 2 state model |
| data_disconnected | RS5 | # of connections | SUM(TRANS_INTO_RADIO_STATE_5) | 'not connected' in 2 state model |
| data_suspended | RS6 | # of connections | SUM(TRANS_INTO_RADIO_STATE_6) | 'not connected' in 2 state model |
| state_emergency_only | RS7 | # of connections | SUM(TRANS_INTO_RADIO_STATE_7) | 'not connected' in 2 state model |
| state_in_service | RS8 | # of connections | SUM(TRANS_INTO_RADIO_STATE_8) | 'not connected' in 2 state model |
| state_out_of_service | RS9 | # of connections | SUM(TRANS_INTO_RADIO_STATE_9) | 'not connected' in 2 state model |
| state_power_off | RS10 | # of connections | SUM(TRANS_INTO_RADIO_STATE_10) | 'not connected' in 2 state model |

| Metric | Unit | Formula | Expanded Form | Description |
|---|---|---|---|---|
| RC | # of connections | SUM(RADIO_STATE_CHANGES_ACTUAL) | Residual Connections | Actual connections made by device to the network. Only for OC proxied applications. Calculated using radio logs and netlog. |
| VC | # of connections | SUM(RADIO_STATE_CHANGES_ACTUAL) + SUM(RADIO_STATE_CHANGES_SAVED) | Virtual Connections | Total connections made by the device to the network if OC was absent. Only for OC proxied applications. Calculated using radio logs and netlog. |
| SC | # of connections | SUM(RADIO_STATE_CHANGES_SAVED) | Saved Connections | Connections saved by OC. Calculated using radio logs and netlog. |
| RTC | seconds | SUM(RADIO_TIME_CONN_ACTUAL) | Residual Time Connected | Actual time device is connected to the network. Only for OC proxied applications. |

*FIG. 26I*

| Metric | Unit | Formula | Expanded Form | Description |
|---|---|---|---|---|
| STC | seconds | SUM(RADIO_TIME_CONN_SAVED) | Saved Time Connected | Time saved by OC as no connection was there for this time. Only for OC proxied applications. |
| VTC | seconds | SUM(RADIO_TIME_CONN_ACTUAL) + SUM(RADIO_TIME_CONN_SAVED) | Virtual Time Connected | Total time device would be connected to the network if OC was absent. Only for OC proxied applications. |
| SRC | # of connections | SIM_RADIO_STATE_CHANGES_ACTUAL | Simulated Residual Connections | Actual connections created for all OC proxied applications (internal) and app-specific assuming it is the only application running. Calculated using netlog and assuming only OC proxied apps are running on device. |
| SVC | # of connections | SIM_RADIO_STATE_CHANGES_ACTUAL + SIM_RADIO_STATE_CHANGES_SAVED | Simulated Virtual Connections | SRC + SSC. Total connections made by all OC proxied applications (internal) and app-specific assuming it is the only application running and OC is absent. Calculated using netlog and assuming only OC proxied apps are running on device. |
| SSC | # of connections | SIM_RADIO_STATE_CHANGES_SAVED | Simulated Saved Connections | Connections saved by OC for all OC proxied applications (internal) and app-specific assuming it is the only application running. Calculated using netlog and assuming only OC proxied apps are running on device. |
| SRTC | seconds | SIM_RADIO_TIME_CONN_ACTUAL | Simulated Residual Time Connected | Time device is actually connected to network for all OC proxied applications (internal) and app-specific assuming it is the only application running. |

*FIG. 26J*

| Metric | Unit | Formula | Expanded Form | Description |
|---|---|---|---|---|
| ORC | # of connections | SUM(TRANS_INTO_RADIO_STATE_1) | Overall Residual Connections | Actual connections made by device to the network for all applications. |
| OVC | # of connections | SUM(TRANS_INTO_RADIO_STATE_1) + SUM(RADIO_STATE_CHANGES_SAVED) | Overall Virtual Connections | Equal to ORC + SC; Total connections made by the device to the network if OC was absent for all applications. |
| ORTC | seconds | SUM(TIME_RADIO_STATE_1) | Overall Residual Time Connected | Actual time device is connected to the network for all applications. |
| OVTC | seconds | SUM(TIME_RADIO_STATE_1) + SUM(RADIO_TIME_CONN_SAVED) | Overall Virtual Time Connected | Equal to ORTC + STC; Total time device would be connected to the network if OC was absent for all applications. |

*FIG. 26K*

| Metric | Formula | Expanded Form | Description |
|---|---|---|---|
| BEARER TYPE | | | Has value – Mobile or Total. Total includes mobile, wifi, sms etc. |
| BE_ID | | Business Entity ID | This represents the entity against which a set of data is being collected via the filtering mechanism. This is generally roughly related to the OC instances, although in some cases there are multiple BEs established for a single instance (i.e., Etisalat instance has both an internal user BE and a SEVEN user BE established). |
| BE NAME | | Business Entity Name | Name of the Business Entity |
| OPER_ID | | Operator ID | Unique number assigned to a customer (used by the user, but carrier as a customer of SEVEN. |
| INST_ID | | Instance ID | Unique number assigned to multiple instances of a customer. Oper_ID and INST_ID uniquely identify a BE_ID |
| CLIENT_VERSION | | | Represents version of the OC client installed on a device |
| OPER_MODE | | Operation Mode | Has value – foreground, background, total, unknown. Total includes sum of foreground, background and unknown |
| OPTFLAG | | Optimization flag | Has a value – 0, 1, -1. 0 indicates OC is off while 1 indicates OC is in ON state and -1 implies unknown |
| PROCESS_NAME | AAA.APPLICATION | | Package name of application. An application can have multiple processes |
| DAY | TO_CHAR(AAA.TS,'YYYY-MM-DD') | | The date for which the data record has been captured. This is in local time zone of user |
| DAY_UTC | TO_CHAR(AAA.TS_UTC,'YYYY-MM-DD') | | The date for which the data record has been captured. This is in UTC |
| HOUR | TO_CHAR(AAA.TS,'YYYY-MM-DD HH24') | | The date and hour for which the data record has been captured. This is in local time zone of user |

*FIG. 26L*

| Metric | Formula | Expanded Form | Description |
|---|---|---|---|
| HOUR_UTC | TO_CHAR(AAA.TS_UTC,'YYYY-MM-DD HH24') | | The date and hour for which the data record has been captured. This is in UTC |
| HOUROFDAY | TO_CHAR(AAA.TS,'HH24') | | The hour of the day for which the data record has been captured. This is in local time zone of user. Values are from 0 to 23. |
| HOUROFDAY_UTC | TO_CHAR(AAA.TS_UTC,'HH24') | | The hour of the day for which the data record has been captured. This is in UTC. Values are from 0 to 23 |
| MONTH | TO_CHAR(AAA.TS,'YYYY-MM') | | The month for which the data record has been captured. This is in local time zone of user |
| MONTH_UTC | TO_CHAR(AAA.TS_UTC,'YYYY-MM') | | The month for which the data record has been captured. This is in UTC |
| WEEK | TO_CHAR(AAA.TS,'YYYY-WW') | | The week for which the data record has been captured. This is in local time zone of user |
| WEEK_UTC | TO_CHAR(AAA.TS_UTC,'YYYY-WW') | | The week for which the data record has been captured. This is in UTC |
| YEAR | TO_CHAR(AAA.TS,'YYYY') | | The year for which the data record has been captured. This is in local time zone of user |
| YEAR_UTC | TO_CHAR(AAA.TS_UTC,'YYYY') | | The year for which the data record has been captured. This is in UTC |

*FIG. 26M*

| Metric | Formula | Description |
|---|---|---|
| OPT_STRATEGY | | Defines the caching strategies used by OC for optimization. For different types of optimization strategies, refer to https://matrix.seven.com/display/Eng/Optimization+Strategy+for+Analytics |
| RECURRING_RESP | | The RECURRING_HASH field will divide the data to (a) unnecessary (RECURRING_HASH == 1), (b) necessary (RECURRING_HASH == 0), and (c) overhead/other (RECURRING_HASH == -1). |
| UNNECESSARY TRANSACTIONS | For recurring hash = 1; DAI_H – DNO_H | Difference between transactions requested by application and transactions actually sent out to the network |
| % OF UNNECESSARY TRANSACTIONS SAVED | For recurring hash = 1; 1 – DNO_H/DAI_H | Calculated for recurring hash = 1. Measures the transactions saved from going out to the network divide by total transactions requested by the application |

*FIG. 26N*

MODELING NETWORK SIGNALING IN A MOBILE NETWORK

CROSS REFERENCE TO RELATED APPLICATION

This application claims benefit of and priority to U.S. Provisional Patent Application No. 61/842,279 entitled "Signaling or Connection Modeling In A Mobile Network," which was filed on Jul. 2, 2013, the contents of which are incorporated by reference herein.

BACKGROUND

Field of Invention

The present invention relates to modeling network signaling in a mobile network, and more specifically, to applying a traffic optimization technique to filter the network signaling and modeling the signaling and/or connections in the mobile network to determine the benefits of the optimization technique on the traffic including signals and/or connections in the mobile network.

Description of Related Art

In order to address mobile network congestion, it is ideal to be able to enforce network management policies or corrective actions on the devices which are in specific congested areas. Unfortunately, the corrective actions are currently indiscriminately applied to the devices. This presents a challenge as indiscriminate application of corrective actions can negatively impact end-user experience.

BRIEF DESCRIPTION OF THE DRAWINGS

FIG. 1A-1 illustrates an example diagram illustrating a general architectural overview of a distributed Open Channel system.

FIG. 6 depicts a table showing examples of different traffic or application category types which can be used in implementing network access and content delivery policies.

FIG. 7 depicts a table showing examples of different content category types which can be used in implementing network access and content delivery policies.

FIG. 8 depicts an interaction diagram showing how polls having data requests from a mobile device (e.g., any wireless device) to an application server/content provider over a wireless network (or broadband network) can be can be cached on the local proxy and managed by the distributed caching system.

FIG. 11A-FIG. 16D depict example field calculations for use in determining general connection and time calculations.

FIGS. 23A-23E respectively depict graphics illustrations of the output metrics which can be used in various embodiments of the analysis core module.

FIGS. 26A-26N show additional examples of and/or alternative output metrics that the analysis core module can adapt.

DETAILED DESCRIPTION

Figure 1A:
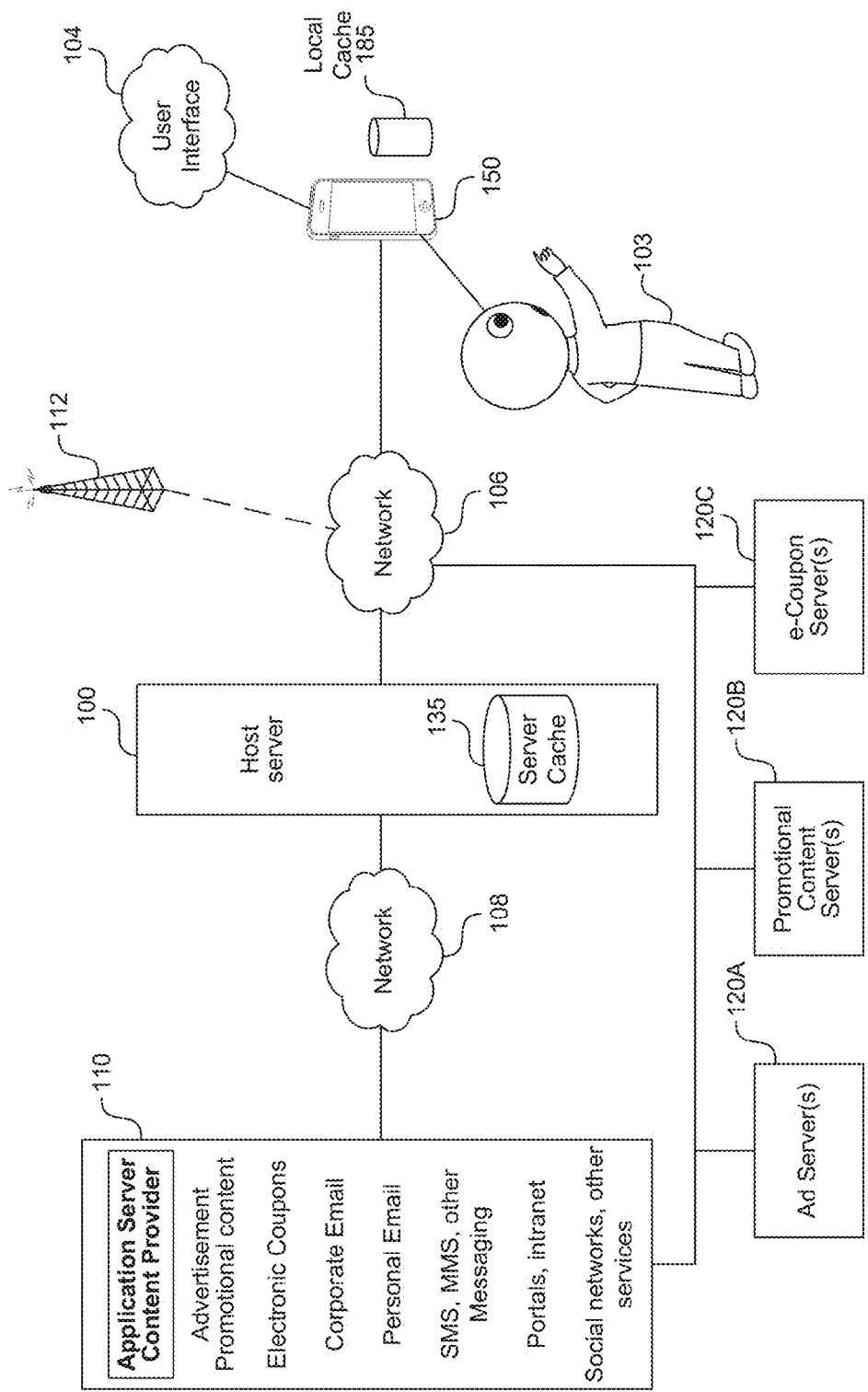
FIG. 1A illustrates an example diagram of a system where a host server facilitates management of traffic, content caching, and/or resource conservation between mobile devices (e.g., wireless devices), an application server or content provider, or other servers such as an ad server, promotional content server, or an e-coupon server in a wireless network (or broadband network) for resource conservation.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The disclosed technology includes systems and methods for modeling signaling and/or connections in a mobile network, and specifically, the benefits of any optimization technique on the traffic including signals and/or connections in the mobile network. Embodiments can allocate signaling to specific applications (e.g., to determine which applications are chatty and which can cause problematic signaling), and/or to further model the optimizations or savings utilizing the disclosed traffic optimization technology.

In some embodiments, the disclosed technology recognizes that signaling in the mobile network can occur when, for example, radio connections get set up (e.g., connected) or torn down (e.g., disconnected). Each radio connection can be used for one or more transactions/data transfers, which can source from one or more applications. The disclosed technology defines whether a transaction causes a connection (and thus signaling), and can further model, compute, or otherwise quantify the signaling or connection savings resulting from any traffic optimization techniques utilized in the signaling or data path.

In some embodiments, to enable or enhance the performance of the data traffic and signal optimization for the network, the disclosed technology includes one or more fields (e.g., an expanded fields) that are calculated by, for example, a analysis core module, to define and identify at least: (1) whether a transaction causes a connection (and thus signaling); and (2) the number of connections that are reduced or saved by the disclosed embodiments of distributed caching and proxy system.

FIG. 1A illustrates an example diagram of a system where a host server 100 facilitates management of traffic, content caching, and/or resource conservation between mobile devices (e.g., wireless devices 150 or client devices 150), and an application server or content provider 110, or other servers such as an ad server 120A, promotional content server 120B, or an e-coupon server 120C in a wireless network (or broadband network) for resource conservation. The host server 100 can further become aware of mobile device radio states for use in selecting a suitable communications channel for sending messages generated by the host server or other control signals and facilitate using a user as an end point for profiling and optimizing the delivery of content and data in a wireless network.

The mobile/client devices 150 can be any system and/or device, and/or any combination of devices/systems that is able to establish a connection, including wired, wireless, cellular connections with another device, a server and/or other systems such as host server 100 and/or application server/content provider 110. Client/mobile devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and tablet), a handheld tablet (e.g., an iPad, the Galaxy series, the Nexus, the Kindles, Kindle Fires, any Android-based tablet, Windows-based tablet, Amazon-based, or any other tablet), any portable readers/reading devices, a hand held console, a hand held gaming device or console, a head mounted device, a head mounted display, a thin client or any Super Phone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation is performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management for resource conservation in networks (e.g., network 106 and/or 108) and devices 150, reside in a distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation). The proxy and cache system can be distributed between, and reside on, a given client device 150 in part or in whole and/or host server 100 in part or in whole. The distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation) are illustrated with further reference to the example diagram shown in FIG. 1C. Functions and techniques performed by the (distributed) proxy and/or cache components in the client device 150, the host server 100, and the related components therein are described, respectively, in detail with further reference to the examples of FIG. 2-5.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

With more detailed description below, and with particular reference to FIGS. 2A-2E and 3A-3E, one or more embodiments disclosed herein can provide techniques to model the signaling that takes place in a mobile network (e.g., network 106), to allocate signaling to one or more specific applications (e.g., so as to determine which applications are causing the traffic signals), and to model traffic signaling savings resulted from the distributed caching and proxy system described herein (e.g., as implemented by client-side proxy 175 and/or server-side proxy 125, FIG. 1C).

The present embodiments recognize that data signaling in the mobile network takes place when, for example, radio connections get set up (e.g., connected) or torn down (e.g., disconnected). Moreover, each radio connection can be used for one or more transactions/data transfers, which can source from one or more applications.

To enable or enhance the performance of the data traffic and signal optimization for the network, the present embodiments can include one or more fields (e.g., expanded fields). The one or more fields can be calculated by, for example, the client-side proxy 175 and/or server-side proxy 125, to define and identify at least: (1) whether a transaction causes a connection (and thus corresponding signaling); and (2) the number of connections that are reduced or saved by the disclosed embodiments of distributed caching and proxy system.

It is noted that, for convenience, a client (e.g., local proxy 105, 175, 275) of the distributed caching system can be referred to herein as an "Open Channel client" or "OC client." Similarly, a server (e.g., host server 111, 100, 300 hosting proxy server 113, 125, 325) of the distributed caching system can be referred to herein as an "Open Channel server" or "OC server." The client and/or server, individually or collectively, can implement the distributed caching techniques described herein. The distributed caching techniques include, but are not limited to, the Signal Optimization and Extended Caching techniques referred to herein as "Open Channel" or "OC."

In one embodiment, a analysis core module can perform calculations and/or determinations for measurements and modeling of the signals. The analysis core module, which can be included in client-side proxy 175 and/or server-side proxy 125 (e.g., as shown in FIGS. 2E and 3E), is described in more detail below.

Figures 1, 1A:
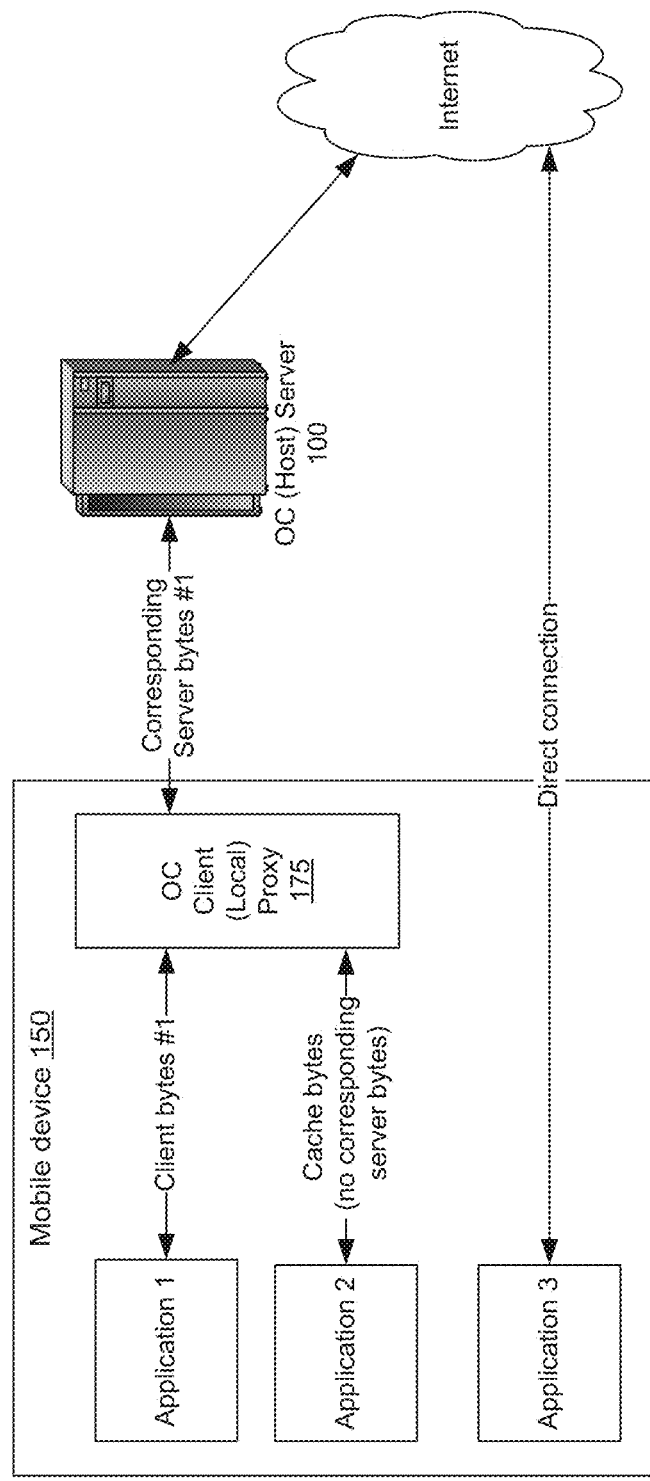

FIG. 1A-1 depicts an example block diagram illustrating an architectural overview of a distributed Open Channel system including an Open Channel (OC) client (or local) proxy 175 and an OC (or host) server 100 that are configured to, individually or in combination, model signaling in a mobile network as described herein.

In one embodiment, a analysis core tool or module (not shown) can calculate expanded fields that are maintained and utilized by the analysis core tool to model signaling of a mobile device in a mobile network. More specifically, the analysis core tool can model the effects of the Open Channel architecture (e.g., the distributed caching techniques including the Signal Optimization and Extended Caching techniques discussed herein). The analysis core tool or module can include hardware and/or software modules and can be included in one or both of the OC client (local) proxy 175 and an OC (host) server 150.

In one embodiment, the expanded fields are calculated in order to model the optimizations or savings of the Open Channel architecture (e.g., the mobile data traffic optimization technology). For example the expanded fields can measure an overall efficiency for the Open Channel architecture. The fields can be calculated by the OC client (local) proxy 175 and/or by the OC (host) server 150. Additionally, fields can be calculated per mobile device and/or fields can be calculated for modeling the signaling attributed to individual applications executing on a mobile device. For example, the signaling can be identified and allocated (or attributed) to specific applications to, for example, determine which applications are chatty, which applications are causing problematic signaling, etc.

The mobile device 150 can include any number of mobile device applications. The applications can be built-in, pre-installed, or download by a user of the mobile device. Additionally, the applications can be in communication with (be handled by) the OC client proxy 175 or have a direct connection to the network (e.g., Internet). As illustrated in the example of FIG. 1A-1, applications 1-3 are shown each initiating transactions. Applications 1 and 2 are shown being handled by the OC client 175 while application 3 is shown having a direct connection to the network (e.g., Internet). Applications 1 and 2 may also be referred to as "radio-aware" herein. Application 3 is not handled by Open Channel architecture, but nevertheless can cause radio up (i.e., mobile device radio connection). The radio connection can be tracked using a radio log. It is appreciated that each application can initiate any number of transactions that may or may not cause network signaling.

As discussed above, expanded fields described herein can be calculated in order to measure Open Channel solution efficiency including signaling efficiency and time connected efficiency. For example, the signaling efficiency and time connected efficiency can be calculated for the signaling associated with a mobile device. The signaling efficiency (also referred to as signaling savings) represents an amount of saved mobile network connections. Similarly, the time connected efficiency (also referred to as time savings) represents amount of saved mobile network up-time.

In one embodiment, the expanded fields can be divided into multiple types. For example, the expanded fields can include a connection flag type and a time connected counts type. Additionally, the expanded fields can be divided into several categories as illustrated below in Table 1.

TABLE 1

| | | fields categories | | |
|---|---|---|---|---|
| | Actual | Simulated | Simulated per App | Simulated per Host |
| Actual | A | RS | RSpA | RSpH |
| Virtual | V | VS | VSpA | VSpH |
| Savings | V − A | VS − RS | VSpA − RSpA | VSpH − RSpH |

As discussed above, a analysis core tool or module (not shown) can calculate expanded fields that are maintained and utilized by the analysis core tool to model signaling of a mobile device in a mobile network. In one embodiment, modeling the signaling of the mobile device includes making various connection and time calculations. Examples of the various connection and time calculations are discussed in greater detail with respect to FIGS. 10A-26N.

Figure 1B:
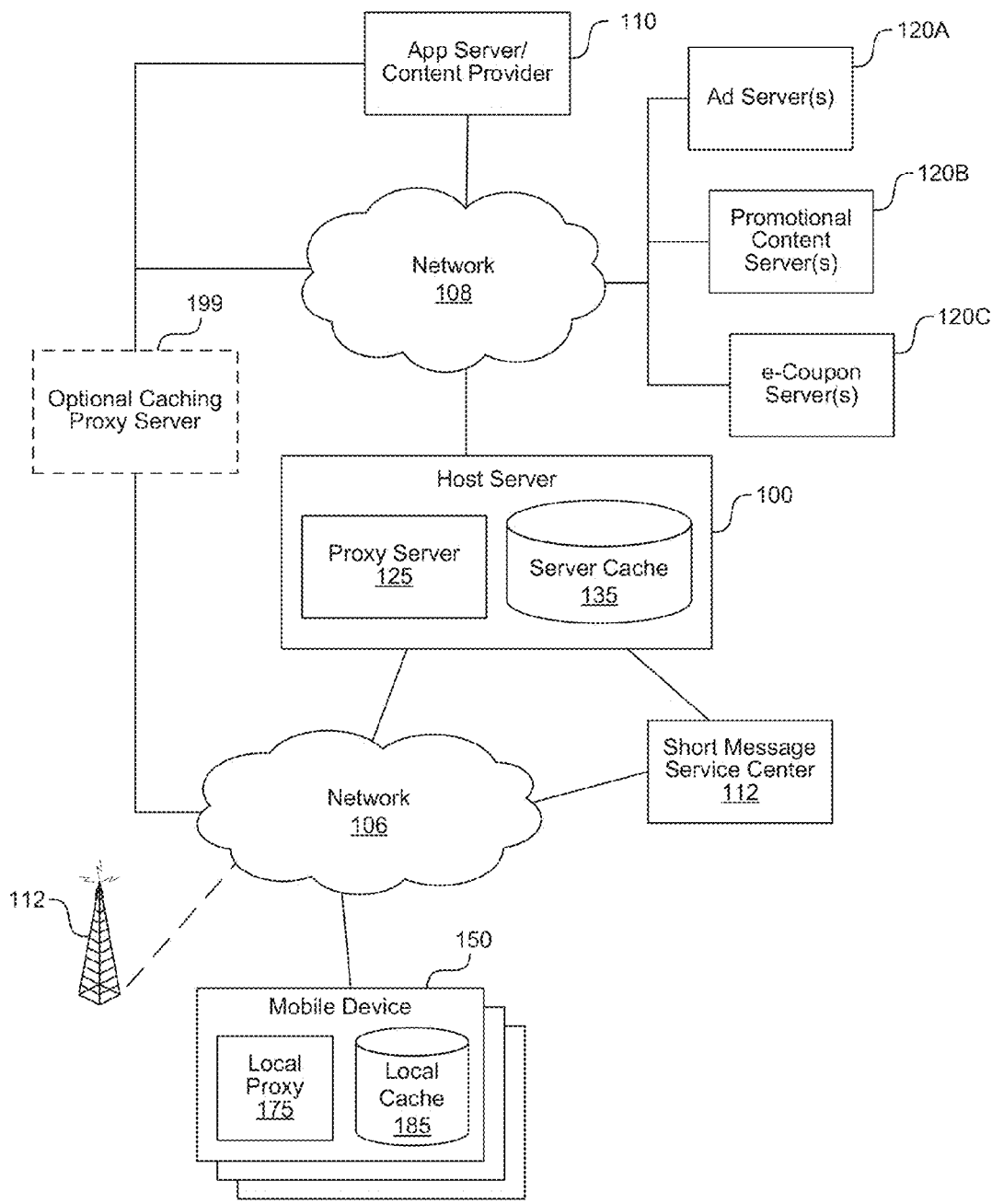
FIG. 1B illustrates an example diagram of a proxy and cache system distributed between the host server and device which facilitates network traffic management between a device, an application server or content provider, or other servers such as an ad server, promotional content server, or an e-coupon server for resource conservation and content caching.

FIG. 1B illustrates an example diagram of a proxy and cache system distributed between the host server 100 and device 150 which facilitates network traffic management between the device 150 and an application server or content provider 110, or other servers such as an ad server 120A, promotional content server 120B, or an e-coupon server 120C for resource conservation and content caching. The proxy system distributed among the host server 100 and the device 150 can further monitor mobile application activities for malicious traffic on a mobile device and/or automatically generate and/or distribute policy information regarding malicious traffic in a wireless network.

The distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation) can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2-5.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and/or cache system (e.g., (distributed) traffic optimizer, traffic management system, (distributed) content caching mechanism for traffic alleviation) (e.g., (distributed) traffic optimizer, traffic management system, (distributed) content caching mechanism for traffic alleviation) allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1C:
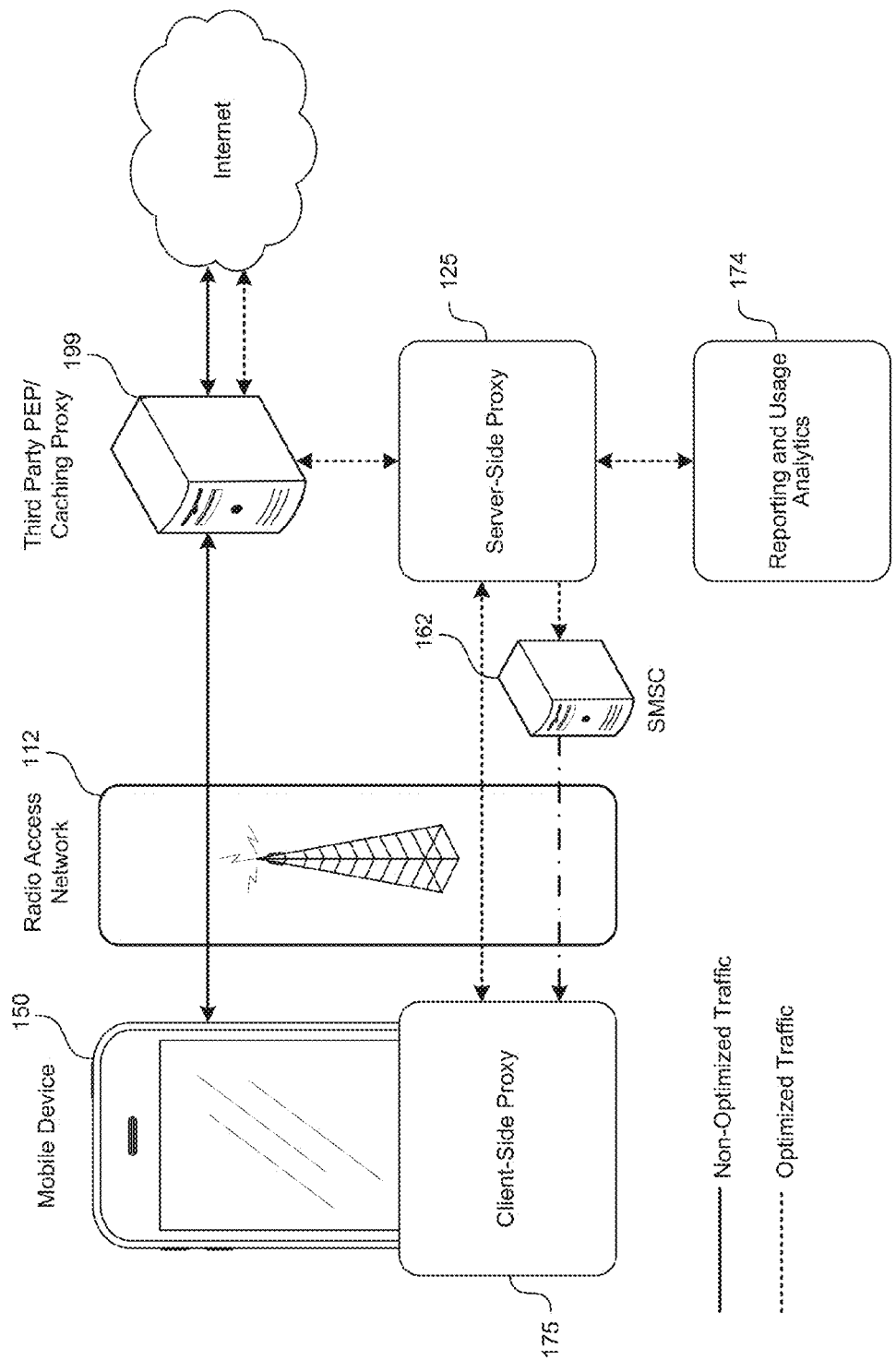
FIG. 1C illustrates an example diagram of the logical architecture of a distributed proxy and cache system.

FIG. 1C illustrates an example diagram of the logical architecture of a distributed proxy and cache system.

The distributed system can include, for example the following components:

Client Side Proxy 175: a component installed in the Smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIG. 2A-FIG. 2B and FIG. 4A-4C.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers. Additional components and features of the server-side proxy 125 are illustrated with further references to the examples of FIG. 3A-FIG. 3B and FIG. 5A-5C.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1D:
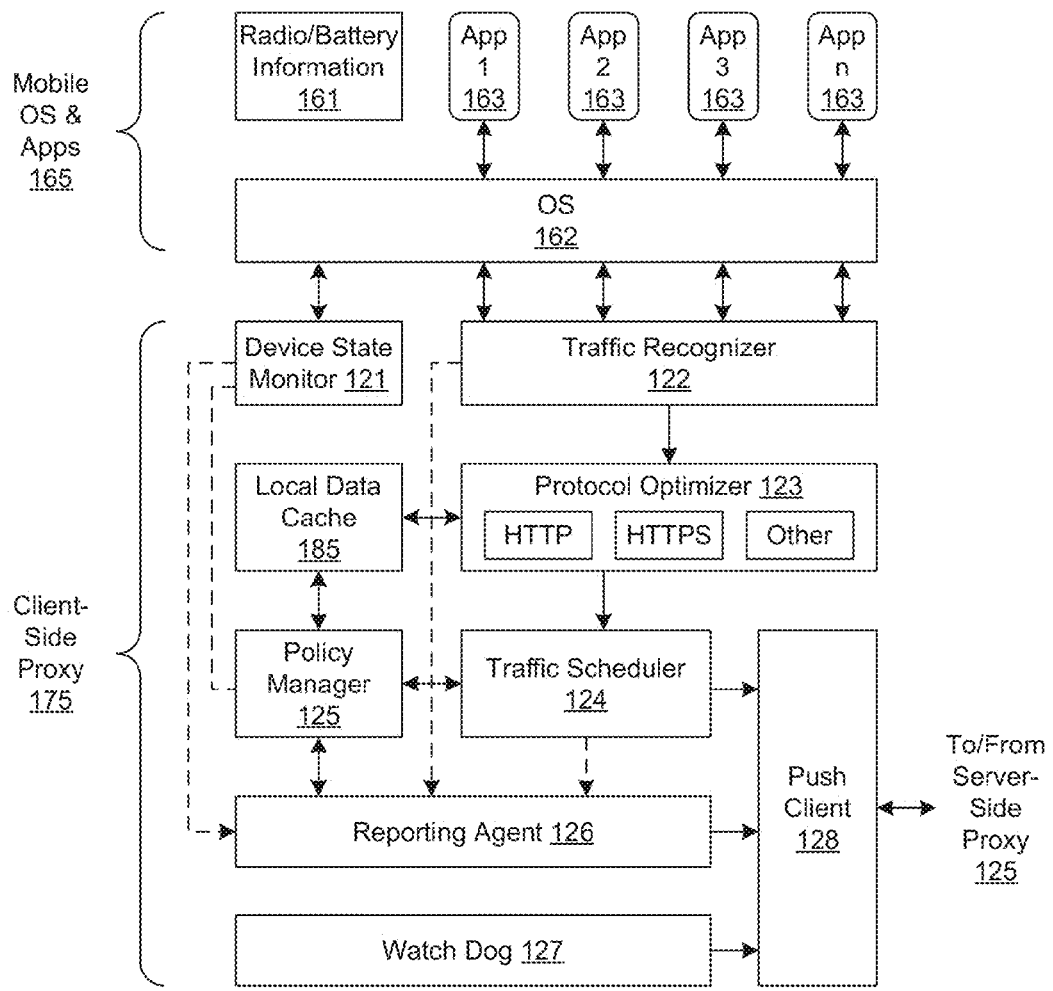
FIG. 1D illustrates an example diagram showing the architecture of client side components in a distributed proxy and cache system.

FIG. 1D illustrates an example diagram showing the architecture of client side components in a distributed proxy and cache system.

The client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests. Some example components of the client side proxy 175 are described as follows:

Device State Monitor 121: The device state monitor 121 can be responsible for identifying several states and metrics in the device, such as network status, display status, battery level, etc. such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a reporting server (e.g., the reporting and/or usage analytics system which may be internal to or external to the server side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1E:
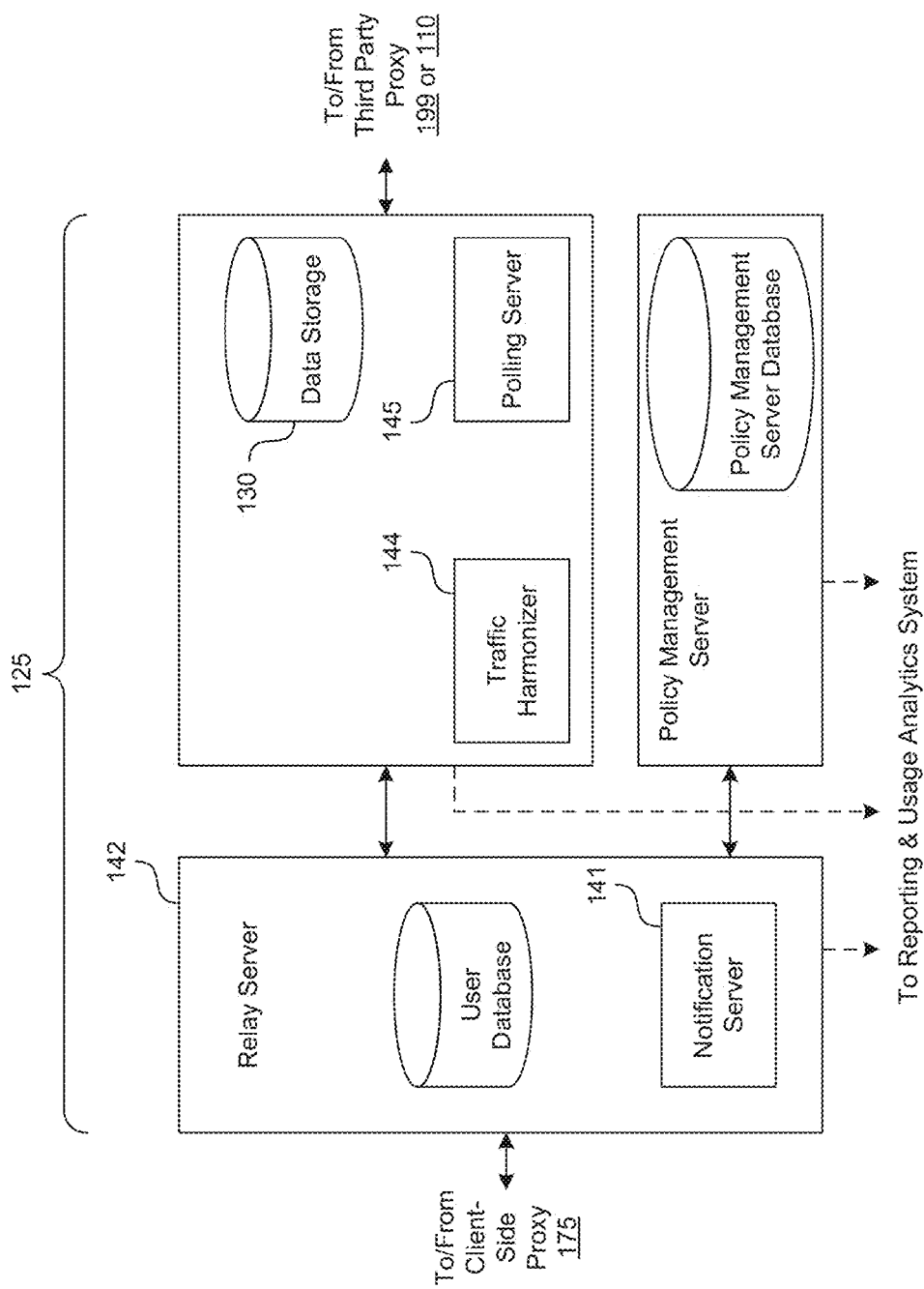
FIG. 1E illustrates a diagram of the example components on the server side of the distributed proxy and cache system.

FIG. 1E illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Figure 1F:
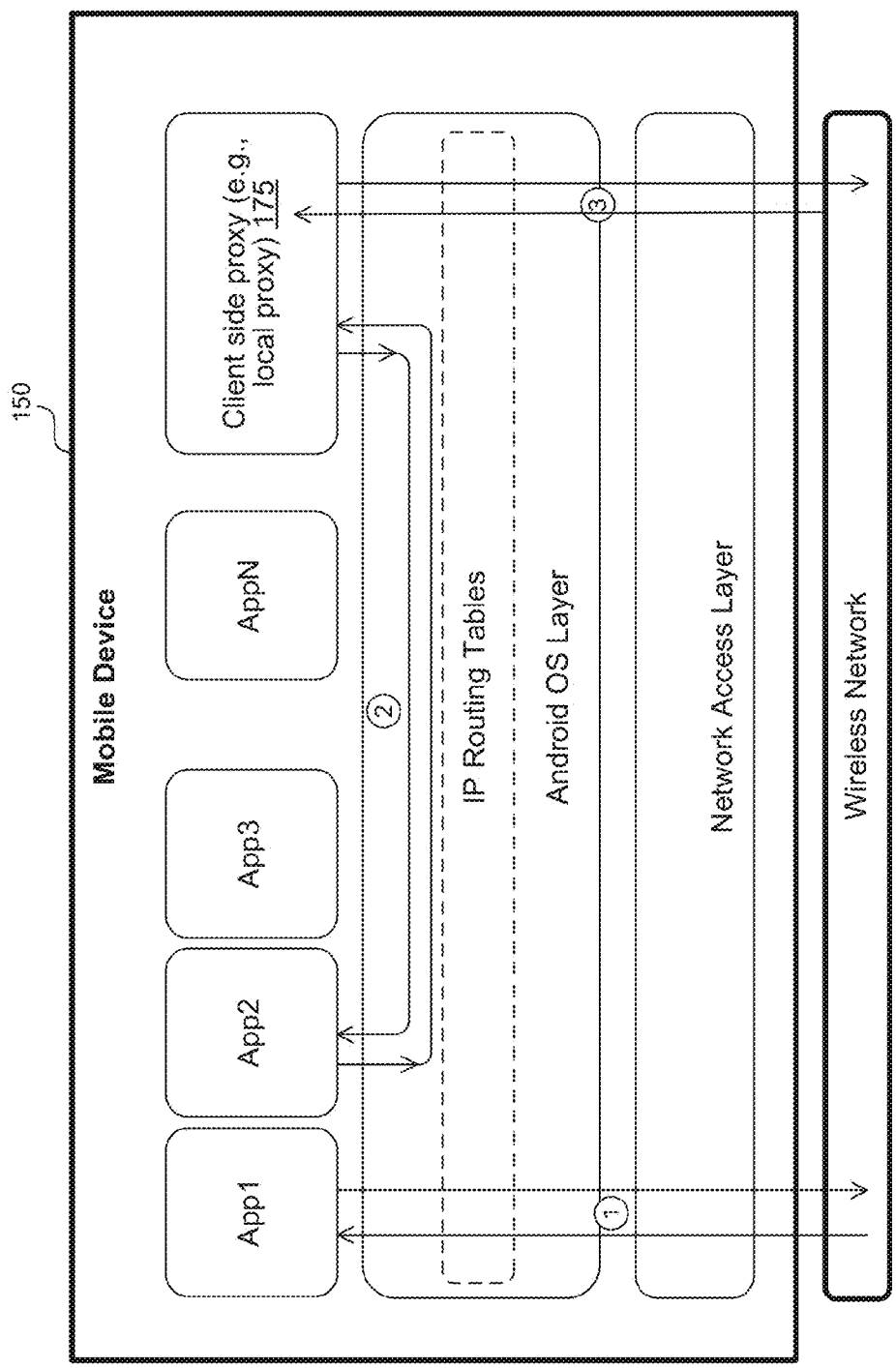
FIG. 1F illustrates an example diagram showing data flows between example client side components in a distributed proxy and cache system.

FIG. 1F illustrates an example diagram showing data flows between example client side components in a distributed proxy and cache system. Traffic from applications (e.g., App1, App2, App3 to AppN), client side proxy (e.g., local proxy) 175, IP Routing Tables (e.g., in the Android Operating System Layer), Network Access Layer and Wireless Network are depicted.

In one implementation, non-optimized application traffic flow, such as traffic from App1, can completely bypass the client side proxy 175 components and proceed directly through the operating system layer (e.g., the Android OS layer) and Network Access Layer to the wireless network. Traffic that is not optimized can include, but is not limited to: rich media, like video and audio, as well as traffic from networks and applications that has been configured to bypass optimization and traffic pending optimization, and the like. In one embodiment, all traffic can be configured to bypass the client side/server side proxy.

In another implementation, optimized application traffic, such as traffic from App2, can be redirected from the application to the client side proxy 175. By default, this can be traffic on ports 80 (HTTP) and 53 (DNS), and selected traffic on port 443 (HTTPS), for example. However, traffic to other ports can be configured to be directed to the client side proxy.

In yet another implementation, traffic flow can be between the client side proxy 175 and the origin servers (e.g., content server 110) via the Internet and/or between the client side proxy 175 and the server side proxy (e.g., proxy server) 125.

Figure 2A:
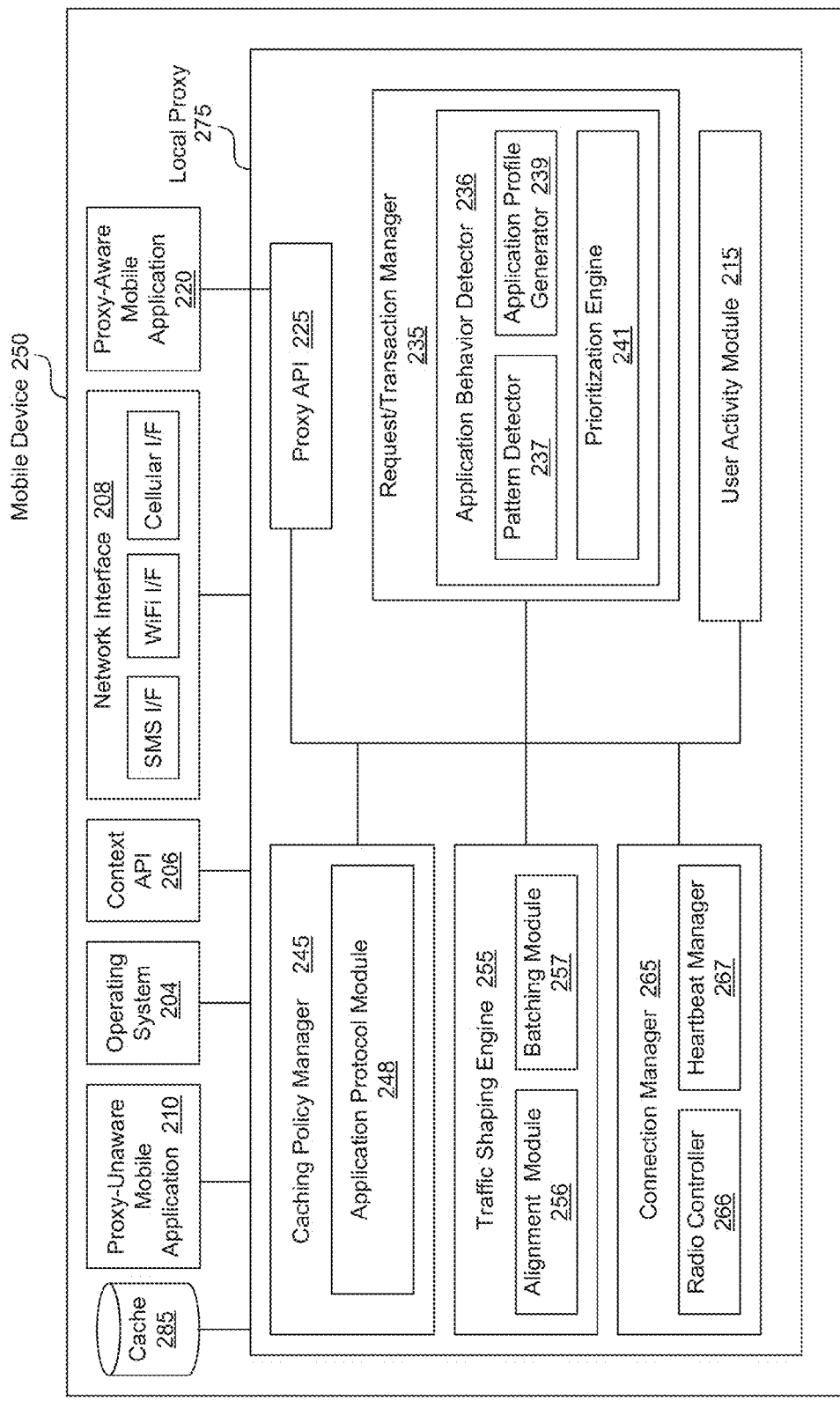
FIG. 2A depicts a block diagram illustrating an example of client-side components in a distributed proxy and cache system residing on a mobile device (e.g., wireless device) that manages traffic in a wireless network (or broadband network) for resource conservation, content caching, and/or traffic management. The client-side proxy (or local proxy) can further categorize mobile traffic and/or implement delivery policies based on application behavior, content priority, user activity, and/or user expectations, for example, for further use in facilitating aligned data transfer to optimize connections established at the mobile device.

FIG. 2A depicts a block diagram illustrating an example of client-side components in a distributed proxy and cache system residing on a device 250 that manages traffic in a wireless network for resource conservation, content caching, and/or traffic management. The client-side proxy (or local proxy 275) can further categorize mobile traffic and/or implement delivery policies based on application behavior, content priority, user activity, and/or user expectations.

The device 250, which can be a portable or mobile device (e.g., any wireless device), such as a portable phone, generally includes, for example, a network interface 208 an operating system 204, a context API 206, and mobile applications which may be proxy-unaware 210 or proxy-aware 220. Note that the device 250 is specifically illustrated in the example of FIG. 2 as a mobile device, such is not a limitation and that device 250 may be any wireless, broadband, portable/mobile or non-portable device able to receive, transmit signals to satisfy data requests over a network including wired or wireless networks (e.g., WiFi, cellular, Bluetooth, LAN, WAN, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

Figure 3A:
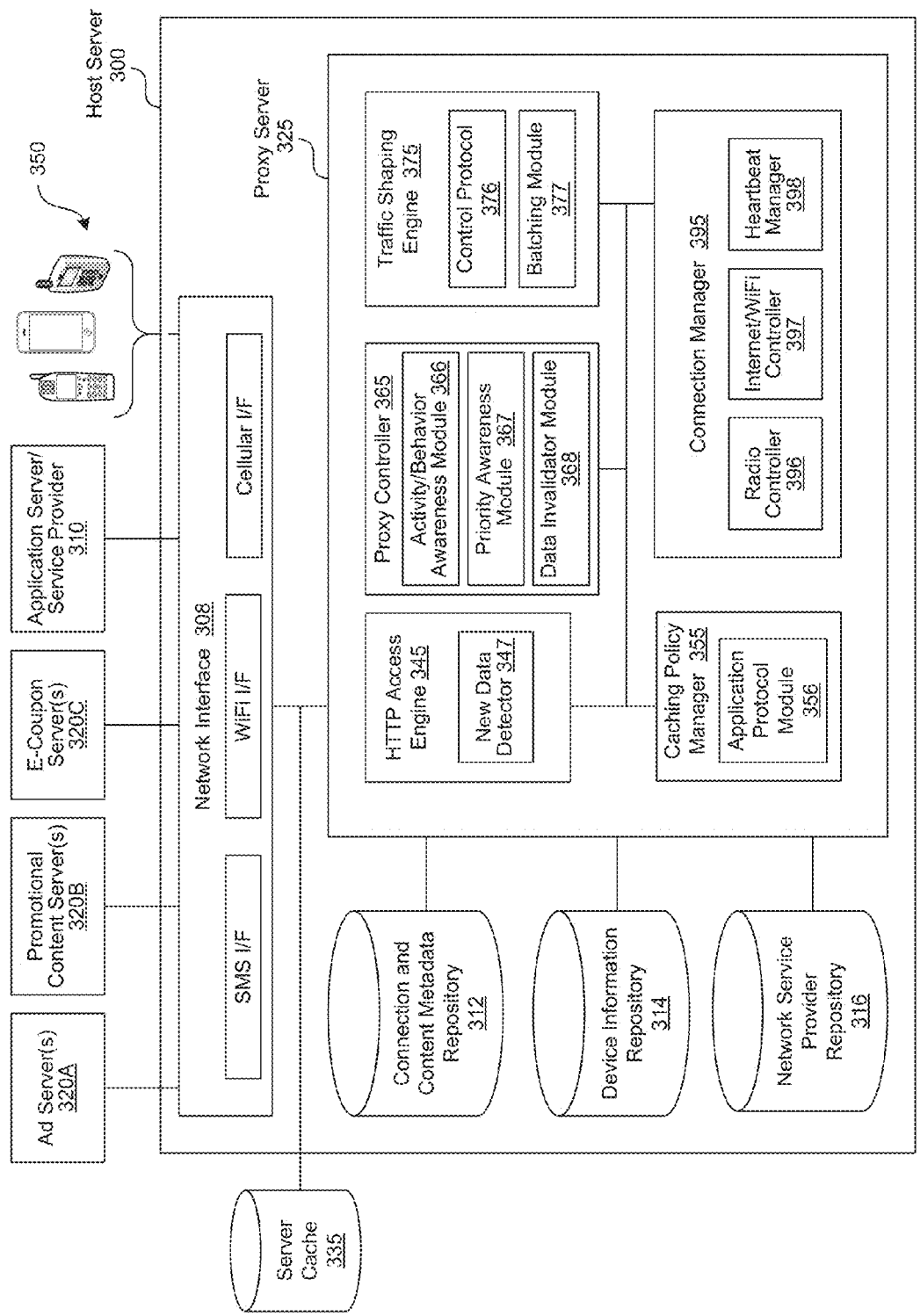
FIG. 3A depicts a block diagram illustrating an example of server-side components in a distributed proxy and cache system that manages traffic in a wireless network (or broadband network) for resource conservation, content caching, and/or traffic management. The server-side proxy (or proxy server) can further categorize mobile traffic and/or implement delivery policies based on application behavior, content priority, user activity, and/or user expectations, for example, for further use in aligning data transfer to optimize connections established for wireless transmission to a mobile device.

The proxy 275 is generally application independent and can be used by applications (e.g., both proxy-aware and proxy-unaware applications 210 and 220 or mobile applications) to open TCP connections to a remote server (e.g., the server 100 in the examples of FIG. 1A-1B and/or server proxy 125/325 shown in the examples of FIG. 1B and FIG. 3A). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 and 300 in the examples of FIG. 1A-B and FIG. 3A) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIG. 1A-B and FIG. 3A) send the data that was buffered as a result of the previously decreased communication frequency.

In addition, or in alternative, the local proxy 275 can communicate the characteristics of user activity at the device 250 to the remote device (e.g., host server 100 and 300 in the examples of FIG. 1A-B and FIG. 3A) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with a application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode) via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE 2

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | | |
| Read more | High | | |
| Download attachment | High | New email in deleted items | Low |
| New Calendar event | High | Delete an email | Low |
| Edit/change Calendar event | High | (Un)Read an email | Low |
| | | Move messages | Low |
| Add a contact | High | Any calendar change | High |
| Edit a contact | High | Any contact change | High |
| Search contacts | High | Wipe/lock device | High |
| Change a setting | High | Settings change | High |
| Manual send/receive | High | Any folder change | High |
| IM status change | Medium | Connector restart | High (if no changes nothing is sent) |
| Auction outbid or change notification | High | | |
| Weather Updates | Low | Social Network Status Updates | Medium |
| | | Severe Weather Alerts | High |
| | | News Updates | Low |

Table 2 above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table 2, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table 2 in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1A and FIG. 3A or a content provider/application server such as the server/provider 110 shown in the examples of FIG. 1A and FIG. 1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 325 of FIG. 3A) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 325 of FIG. 3A) which forwards the data request to a content source (e.g., application server/content provider 110 of FIG. 1A) and a response from the content source can be provided through the remote proxy, as will be further described in the description associated with the example host server 300 of FIG. 3A. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 325 in the example of FIG. 3A).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead, by a proxy server (e.g., proxy server 125 of FIG. 1B or proxy server 325 of FIG. 3A) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250. The remote entity may be the host server 300 as shown in the example of FIG. 3A.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
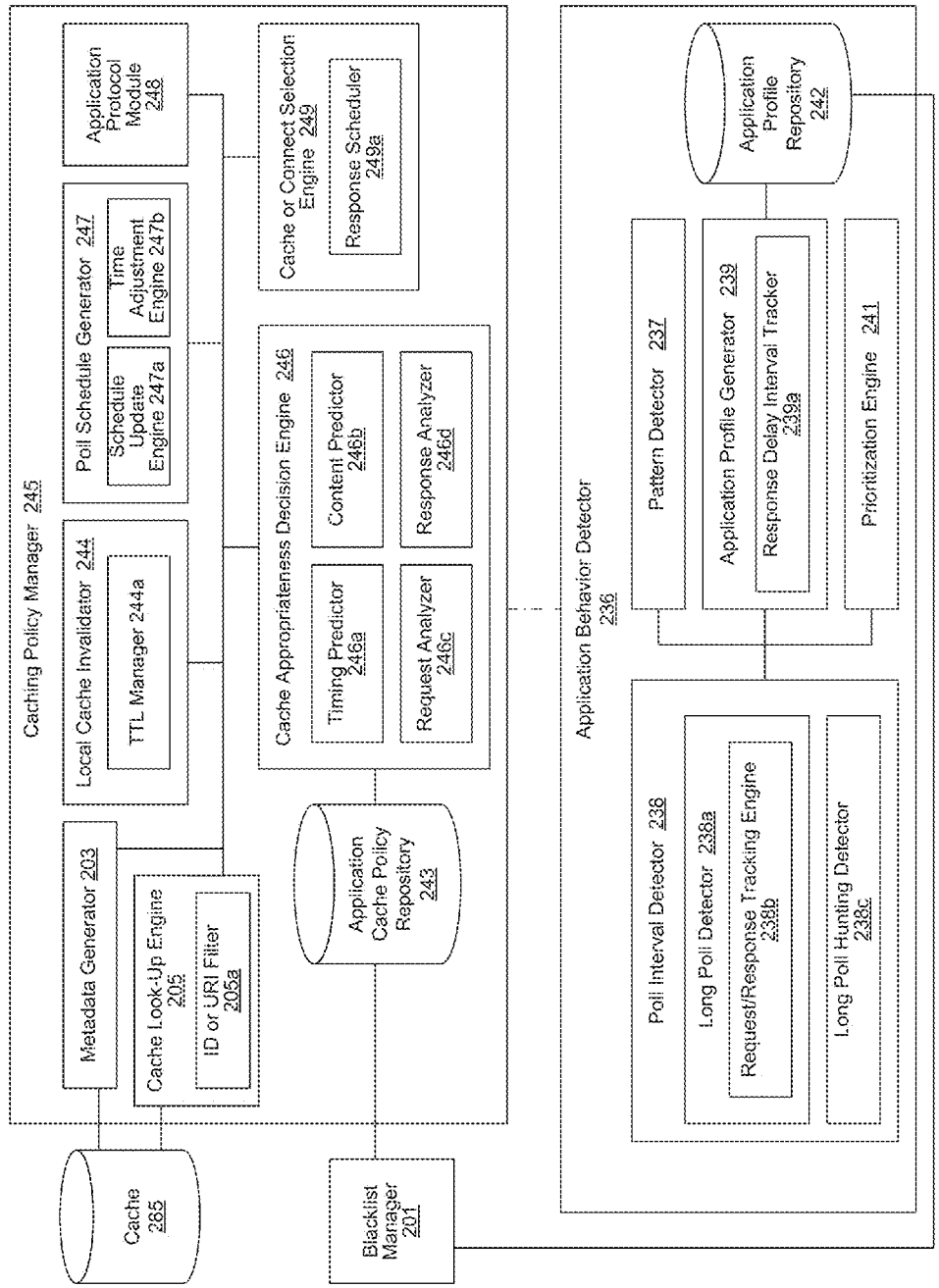
FIG. 2B depicts a block diagram illustrating a further example of components in the cache system shown in the example of FIG. 2A which is capable of caching and adapting caching strategies for mobile application behavior and/or network conditions. Components capable of detecting long poll requests and managing caching of long polls are also illustrated.

FIG. 2B depicts a block diagram illustrating a further example of components in the cache system shown in the example of FIG. 2A which is capable of caching and adapting caching strategies for mobile application behavior and/or network conditions.

In one embodiment, the caching policy manager 245 includes a metadata generator 203, a cache look-up engine 205, a cache appropriateness decision engine 246, a poll schedule generator 247, an application protocol module 248, a cache or connect selection engine 249 and/or a local cache invalidator 244. The cache appropriateness decision engine 246 can further include a timing predictor 246*a*, a content predictor 246*b*, a request analyzer 246*c*, and/or a response analyzer 246*d*, and the cache or connect selection engine 249 includes a response scheduler 249*a*. The metadata generator 203 and/or the cache look-up engine 205 are coupled to the cache 285 (or local cache) for modification or addition to cache entries or querying thereof.

The cache look-up engine 205 may further include an ID or URI filter 205*a*, the local cache invalidator 244 may further include a TTL manager 244*a*, and the poll schedule generator 247 may further include a schedule update engine 247*a* and/or a time adjustment engine 247*b*. One embodiment of caching policy manager 245 includes an application cache policy repository 243. In one embodiment, the application behavior detector 236 includes a pattern detector 237, a poll interval detector 238, an application profile generator 239, and/or a priority engine 241. The poll interval detector 238 may further include a long poll detector 238*a* having a response/request tracking engine 238*b*. The poll interval detector 238 may further include a long poll hunting detector 238c. The application profile generator 239 can further include a response delay interval tracker 239a.

The pattern detector 237, application profile generator 239, and the priority engine 241 were also described in association with the description of the pattern detector shown in the example of FIG. 2A. One embodiment further includes an application profile repository 242 which can be used by the local proxy 275 to store information or metadata regarding application profiles (e.g., behavior, patterns, type of HTTP requests, etc.)

The cache appropriateness decision engine 246 can detect, assess, or determine whether content from a content source (e.g., application server/content provider 110 in the example of FIG. 1B) with which a mobile device 250 interacts and has content that may be suitable for caching. For example, the decision engine 246 can use information about a request and/or a response received for the request initiated at the mobile device 250 to determine cacheability, potential cacheability, or non-cacheability. In some instances, the decision engine 246 can initially verify whether a request is directed to a blacklisted destination or whether the request itself originates from a blacklisted client or application. If so, additional processing and analysis may not be performed by the decision engine 246 and the request may be allowed to be sent over the air to the server to satisfy the request. The black listed destinations or applications/clients (e.g., mobile applications) can be maintained locally in the local proxy (e.g., in the application profile repository 242) or remotely (e.g., in the proxy server 325 or another entity).

In one embodiment, the decision engine 246, for example, via the request analyzer 246c, collects information about an application or client request generated at the mobile device 250. The request information can include request characteristics information including, for example, request method. For example, the request method can indicate the type of HTTP request generated by the mobile application or client. In one embodiment, response to a request can be identified as cacheable or potentially cacheable if the request method is a GET request or POST request. Other types of requests (e.g., OPTIONS, HEAD, PUT, DELETE, TRACE, or CONNECT) may or may not be cached. In general, HTTP requests with uncacheable request methods will not be cached.

Request characteristics information can further include information regarding request size, for example. Responses to requests (e.g., HTTP requests) with body size exceeding a certain size will not be cached. For example, cacheability can be determined if the information about the request indicates that a request body size of the request does not exceed a certain size. In some instances, the maximum cacheable request body size can be set to 8092 bytes. In other instances, different values may be used, dependent on network capacity or network operator specific settings, for example.

In some instances, content from a given application server/content provider (e.g., the server/content provider 110 of FIG. 1B) is determined to be suitable for caching based on a set of criteria, for example, criteria specifying time criticality of the content that is being requested from the content source. In one embodiment, the local proxy (e.g., the local proxy 175 or 275 of FIG. 1B and FIG. 2A) applies a selection criteria to store the content from the host server which is requested by an application as cached elements in a local cache on the mobile device to satisfy subsequent requests made by the application.

The cache appropriateness decision engine 246, further based on detected patterns of requests sent from the mobile device 250 (e.g., by a mobile application or other types of clients on the device 250) and/or patterns of received responses, can detect predictability in requests and/or responses. For example, the request characteristics information collected by the decision engine 246, (e.g., the request analyzer 246c) can further include periodicity information between a request and other requests generated by a same client on the mobile device or other requests directed to the same host (e.g., with similar or same identifier parameters).

Periodicity can be detected, by the decision engine 246 or the request analyzer 246c, when the request and the other requests generated by the same client occur at a fixed rate or nearly fixed rate, or at a dynamic rate with some identifiable or partially or wholly reproducible changing pattern. If the requests are made with some identifiable pattern (e.g., regular intervals, intervals having a detectable pattern, or trend (e.g., increasing, decreasing, constant, etc.) the timing predictor 246a can determine that the requests made by a given application on a device is predictable and identify it to be potentially appropriate for caching, at least from a timing standpoint.

An identifiable pattern or trend can generally include any application or client behavior which may be simulated either locally, for example, on the local proxy 275 on the mobile device 250 or simulated remotely, for example, by the proxy server 325 on the host 300, or a combination of local and remote simulation to emulate application behavior.

In one embodiment, the decision engine 246, for example, via the response analyzer 246d, can collect information about a response to an application or client request generated at the mobile device 250. The response is typically received from a server or the host of the application (e.g., mobile application) or client which sent the request at the mobile device 250. In some instances, the mobile client or application can be the mobile version of an application (e.g., social networking, search, travel management, voicemail, contact manager, email) or a web site accessed via a web browser or via a desktop client.

For example, response characteristics information can include an indication of whether transfer encoding or chunked transfer encoding is used in sending the response. In some instances, responses to HTTP requests with transfer encoding or chunked transfer encoding are not cached, and therefore are also removed from further analysis. The rationale here is that chunked responses are usually large and non-optimal for caching, since the processing of these transactions may likely slow down the overall performance. Therefore, in one embodiment, cacheability or potential for cacheability can be determined when transfer encoding is not used in sending the response.

In addition, the response characteristics information can include an associated status code of the response which can be identified by the response analyzer 246d. In some instances, HTTP responses with uncacheable status codes are typically not cached. The response analyzer 246d can extract the status code from the response and determine whether it matches a status code which is cacheable or uncacheable. Some cacheable status codes include by way of example: 200—OK, 301—Redirect, 302—Found, 303—See other, 304—Not Modified, 307 Temporary Redirect, or 500—Internal server error. Some uncacheable status codes can include, for example, 403—Forbidden or 404—Not found.

In one embodiment, cacheability or potential for cacheability can be determined if the information about the response does not indicate an uncacheable status code or indicates a cacheable status code. If the response analyzer 246*d* detects an uncacheable status code associated with a given response, the specific transaction (request/response pair) may be eliminated from further processing and determined to be uncacheable on a temporary basis, a semi-permanent, or a permanent basis. If the status code indicates cacheability, the transaction (e.g., request and/or response pair) may be subject to further processing and analysis to confirm cacheability.

Response characteristics information can also include response size information. In general, responses can be cached locally at the mobile device 250 if the responses do not exceed a certain size. In some instances, the default maximum cached response size is set to 128 KB. In other instances, the max cacheable response size may be different and/or dynamically adjusted based on operating conditions, network conditions, network capacity, user preferences, network operator requirements, or other application-specific, user specific, and/or device-specific reasons. In one embodiment, the response analyzer 246*d* can identify the size of the response, and cacheability or potential for cacheability can be determined if a given threshold or max value is not exceeded by the response size.

Furthermore, response characteristics information can include response body information for the response to the request and other response to other requests generated by a same client on the mobile device, or directed to a same content host or application server. The response body information for the response and the other responses can be compared, for example, by the response analyzer 246*d*, to prevent the caching of dynamic content (or responses with content that changes frequently and cannot be efficiently served with cache entries, such as financial data, stock quotes, news feeds, real-time sporting event activities, etc.), such as content that would no longer be relevant or up-to-date if served from cached entries.

The cache appropriateness decision engine 246 (e.g., the content predictor 246*b*) can definitively identify repeatability or identify indications of repeatability, potential repeatability, or predictability in responses received from a content source (e.g., the content host/application server 110 shown in the example of FIG. 1A-B). Repeatability can be detected by, for example, tracking at least two responses received from the content source and determines if the two responses are the same. For example, cacheability can be determined, by the response analyzer 246*d*, if the response body information for the response and the other responses sent by the same mobile client or directed to the same host/server are same or substantially the same. The two responses may or may not be responses sent in response to consecutive requests. In one embodiment, hash values of the responses received for requests from a given application are used to determine repeatability of content (with or without heuristics) for the application in general and/or for the specific request. Additional same responses may be required for some applications or under certain circumstances.

Repeatability in received content need not be 100% ascertained. For example, responses can be determined to be repeatable if a certain number or a certain percentage of responses are the same, or similar. The certain number or certain percentage of same/similar responses can be tracked over a select period of time, set by default or set based on the application generating the requests (e.g., whether the application is highly dynamic with constant updates or less dynamic with infrequent updates). Any indicated predictability or repeatability, or possible repeatability, can be utilized by the distributed system in caching content to be provided to a requesting application or client on the mobile device 250.

In one embodiment, for a long poll type request, the local proxy 175 can begin to cache responses on a third request when the response delay times for the first two responses are the same, substantially the same, or detected to be increasing in intervals. In general, the received responses for the first two responses should be the same, and upon verifying that the third response received for the third request is the same (e.g., if R0=R1=R2), the third response can be locally cached on the mobile device. Less or more same responses may be required to begin caching, depending on the type of application, type of data, type of content, user preferences, or carrier/network operator specifications.

Increasing response delays with same responses for long polls can indicate a hunting period (e.g., a period in which the application/client on the mobile device is seeking the longest time between a request and response that a given network will allow, a timing diagram showing timing characteristics is illustrated in FIG. 8), as detected by the long poll hunting detector 238*c* of the application behavior detector 236.

An example can be described below using T0, T1, T2, where T indicates the delay time between when a request is sent and when a response (e.g., the response header) is detected/received for consecutive requests:

$T0 = \text{Response0}(t) - \text{Request0}(t) = 180$ s. (+/−tolerance)

$T1 = \text{Response1}(t) - \text{Request1}(t) = 240$ s. (+/−tolerance)

$T2 = \text{Response2}(t) - \text{Request2}(t) = 500$ s. (+/−tolerance)

In the example timing sequence shown above, T0<T1<T2, this may indicate a hunting pattern for a long poll when network timeout has not yet been reached or exceeded. Furthermore, if the responses R0, R1, and R2 received for the three requests are the same, R2 can be cached. In this example, R2 is cached during the long poll hunting period without waiting for the long poll to settle, thus expediting response caching (e.g., this is optional accelerated caching behavior which can be implemented for all or select applications).

As such, the local proxy 275 can specify information that can be extracted from the timing sequence shown above (e.g., polling schedule, polling interval, polling type) to the proxy server and begin caching and to request the proxy server to begin polling and monitoring the source (e.g., using any of T0, T1, T2 as polling intervals but typically T2, or the largest detected interval without timing out, and for which responses from the source is received will be sent to the proxy server 325 of FIG. 3A for use in polling the content source (e.g., application server/service provider 310)).

However, if the time intervals are detected to be getting shorter, the application (e.g., mobile application)/client may still be hunting for a time interval for which a response can be reliably received from the content source (e.g., application/server server/provider 110 or 310), and as such caching typically should not begin until the request/response intervals indicate the same time interval or an increasing time interval, for example, for a long poll type request.

An example of handling a detected decreasing delay can be described below using T0, T1, T2, T3, and T4 where T indicates the delay time between when a request is sent and when a response (e.g., the response header) is detected/received for consecutive requests:

$T0 = \text{Response0}(t) - \text{Request0}(t) = 160 \text{ s. } (+/- \text{tolerance})$ $T1 = \text{Response1}(t) - \text{Request1}(t) = 240 \text{ s. } (+/- \text{tolerance})$ $T2 = \text{Response2}(t) - \text{Request2}(t) = 500 \text{ s. } (+/- \text{tolerance})$ $T3 = \text{Time out at } 700 \text{ s. } (+/- \text{tolerance})$ $T4 = \text{Response4}(t) - \text{Request4}(t) = 600 \text{ } (+/- \text{tolerance})$ If a pattern for response delays T1<T2<T3>T4 is detected, as shown in the above timing sequence (e.g., detected by the long poll hunting detector 238c of the application behavior detector 236), it can be determined that T3 likely exceeded the network time out during a long poll hunting period. In Request 3, a response likely was not received since the connection was terminated by the network, application, server, or other reason before a response was sent or available. On Request 4 (after T4), if a response (e.g., Response 4) is detected or received, the local proxy 275 can then use the response for caching (if the content repeatability condition is met). The local proxy can also use T4 as the poll interval in the polling schedule set for the proxy server to monitor/poll the content source.

Note that the above description shows that caching can begin while long polls are in hunting mode in the event of detecting increasing response delays, as long as responses are received and not timed out for a given request. This can be referred to as the optional accelerated caching during long poll hunting. Caching can also begin after the hunting mode (e.g., after the poll requests have settled to a constant or near constant delay value) has completed. Note that hunting may or may not occur for long polls and when hunting occurs; the proxy 275 can generally detect this and determine whether to begin to cache during the hunting period (increasing intervals with same responses) or wait until the hunt settles to a stable value.

In one embodiment, the timing predictor 246a of the cache appropriateness decision engine 246 can track timing of responses received from outgoing requests from an application (e.g., mobile application) or client to detect any identifiable patterns which can be partially wholly reproducible, such that locally cached responses can be provided to the requesting client on the mobile device 250 in a manner that simulates content source (e.g., application server/content provider 110 or 310) behavior. For example, the manner in which (e.g., from a timing standpoint) responses or content would be delivered to the requesting application/client on the device 250. This ensures preservation of user experience when responses to application or mobile client requests are served from a local and/or remote cache instead of being retrieved/received directly from the content source (e.g., application, content provider 110 or 310).

In one embodiment, the decision engine 246 or the timing predictor 246a determines the timing characteristics a given application (e.g., mobile application) or client from, for example, the request/response tracking engine 238b and/or the application profile generator 239 (e.g., the response delay interval tracker 239a). Using the timing characteristics, the timing predictor 246a determines whether the content received in response to the requests are suitable or are potentially suitable for caching. For example, poll request intervals between two consecutive requests from a given application can be used to determine whether request intervals are repeatable (e.g., constant, near constant, increasing with a pattern, decreasing with a pattern, etc.) and can be predicted and thus reproduced at least some of the times either exactly or approximated within a tolerance level.

In some instances, the timing characteristics of a given request type for a specific application, for multiple requests of an application, or for multiple applications can be stored in the application profile repository 242. The application profile repository 242 can generally store any type of information or metadata regarding application request/response characteristics including timing patterns, timing repeatability, content repeatability, etc.

The application profile repository 242 can also store metadata indicating the type of request used by a given application (e.g., long polls, long-held HTTP requests, HTTP streaming, push, COMET push, etc.) Application profiles indicating request type by applications can be used when subsequent same/similar requests are detected, or when requests are detected from an application which has already been categorized. In this manner, timing characteristics for the given request type or for requests of a specific application which has been tracked and/or analyzed, need not be reanalyzed.

Application profiles can be associated with a time-to-live (e.g., or a default expiration time). The use of an expiration time for application profiles, or for various aspects of an application or request's profile can be used on a case by case basis. The time-to-live or actual expiration time of application profile entries can be set to a default value or determined individually, or a combination thereof. Application profiles can also be specific to wireless networks, physical networks, network operators, or specific carriers.

One embodiment includes an application blacklist manager 201. The application blacklist manager 201 can be coupled to the application cache policy repository 243 and can be partially or wholly internal to local proxy or the caching policy manager 245. Similarly, the blacklist manager 201 can be partially or wholly internal to local proxy or the application behavior detector 236. The blacklist manager 201 can aggregate, track, update, manage, adjust, or dynamically monitor a list of destinations of servers/host that are 'blacklisted,' or identified as not cached, on a permanent or temporary basis. The blacklist of destinations, when identified in a request, can potentially be used to allow the request to be sent over the (cellular) network for servicing. Additional processing on the request may not be performed since it is detected to be directed to a blacklisted destination.

Blacklisted destinations can be identified in the application cache policy repository 243 by address identifiers including specific URIs or patterns of identifiers including URI patterns. In general, blacklisted destinations can be set by or modified for any reason by any party including the user (owner/user of mobile device 250), operating system/mobile platform of device 250, the destination itself, network operator (of cellular network), Internet service provider, other third parties, or according to a list of destinations for applications known to be uncacheable/not suited for caching. Some entries in the blacklisted destinations may include destinations aggregated based on the analysis or processing performed by the local proxy (e.g., cache appropriateness decision engine 246).

For example, applications or mobile clients on the mobile device for which responses have been identified as non-suitable for caching can be added to the blacklist. Their corresponding hosts/servers may be added in addition to or in lieu of an identification of the requesting application/client on the mobile device 250. Some or all of such clients identified by the proxy system can be added to the blacklist. For example, for all application clients or applications that are temporarily identified as not being suitable for caching, only those with certain detected characteristics (based on timing, periodicity, frequency of response content change, content predictability, size, etc.) can be blacklisted.

The blacklisted entries may include a list of requesting applications or requesting clients on the mobile device (rather than destinations) such that, when a request is detected from a given application or given client, it may be sent through the network for a response, since responses for blacklisted clients/applications are in most circumstances not cached.

A given application profile may also be treated or processed differently (e.g., different behavior of the local proxy 275 and the remote proxy 325) depending on the mobile account associated with a mobile device from which the application is being accessed. For example, a higher paying account, or a premier account may allow more frequent access of the wireless network or higher bandwidth allowance thus affecting the caching policies implemented between the local proxy 275 and proxy server 325 with an emphasis on better performance compared to conservation of resources. A given application profile may also be treated or processed differently under different wireless network conditions (e.g., based on congestion or network outage, etc.).

Note that cache appropriateness can be determined, tracked, and managed for multiple clients or applications on the mobile device 250. Cache appropriateness can also be determined for different requests or request types initiated by a given client or application on the mobile device 250. The caching policy manager 245, along with the timing predictor 246a and/or the content predictor 246b which heuristically determines or estimates predictability or potential predictability, can track, manage and store cacheability information for various application or various requests for a given application. Cacheability information may also include conditions (e.g., an application can be cached at certain times of the day, or certain days of the week, or certain requests of a given application can be cached, or all requests with a given destination address can be cached) under which caching is appropriate which can be determined and/or tracked by the cache appropriateness decision engine 246 and stored and/or updated when appropriate in the application cache policy repository 243 coupled to the cache appropriateness decision engine 246.

The information in the application cache policy repository 243 regarding cacheability of requests, applications, and/or associated conditions can be used later on when same requests are detected. In this manner, the decision engine 246 and/or the timing and content predictors 246a/b need not track and reanalyze request/response timing and content characteristics to make an assessment regarding cacheability. In addition, the cacheability information can in some instances be shared with local proxies of other mobile devices by way of direct communication or via the host server (e.g., proxy server 325 of host server 300).

For example, cacheability information detected by the local proxy 275 on various mobile devices can be sent to a remote host server or a proxy server 325 on the host server (e.g., host server 300 or proxy server 325 shown in the example of FIG. 3A, host 100 and proxy server 125 in the example of FIG. 1A-B). The remote host or proxy server can then distribute the information regarding application-specific, request-specific cacheability information and/or any associated conditions to various mobile devices or their local proxies in a wireless network or across multiple wireless networks (same service provider or multiple wireless service providers) for their use.

In general, the selection criteria for caching can further include, by way of example but not limitation, the state of the mobile device indicating whether the mobile device is active or inactive, network conditions, and/or radio coverage statistics. The cache appropriateness decision engine 246 can in any one or any combination of the criteria, and in any order, identifying sources for which caching may be suitable.

Once application servers/content providers having identified or detected content that is potentially suitable for local caching on the mobile device 250, the cache policy manager 245 can proceed to cache the associated content received from the identified sources by storing content received from the content source as cache elements in a local cache (e.g., local cache 185 or 285 shown in the examples of FIG. 1B and FIG. 2A, respectively) on the mobile device 250.

The response can be stored in the cache 285 (e.g., also referred as the local cache) as a cache entry. In addition to the response to a request, the cached entry can include response metadata having additional information regarding caching of the response. The metadata may be generated by the metadata generator 203 and can include, for example, timing data such as the access time of the cache entry or creation time of the cache entry. Metadata can include additional information, such as any information suited for use in determining whether the response stored as the cached entry is used to satisfy the subsequent response. For example, metadata information can further include, request timing history (e.g., including request time, request start time, request end time), hash of the request and/or response, time intervals or changes in time intervals, etc.

The cache entry is typically stored in the cache 285 in association with a time-to-live (TTL), which for example may be assigned or determined by the TTL manager 244a of the cache invalidator 244. The time-to-live of a cache entry is the amount of time the entry is persisted in the cache 285 regardless of whether the response is still valid or relevant for a given request or client/application on the mobile device 250. For example, if the time-to-live of a given cache entry is set to 12 hours, the cache entry is purged, removed, or otherwise indicated as having exceeded the time-to-live, even if the response body contained in the cache entry is still current and applicable for the associated request.

A default time-to-live can be automatically used for all entries unless otherwise specified (e.g., by the TTL manager 244a), or each cache entry can be created with its individual TTL (e.g., determined by the TTL manager 244a based on various dynamic or static criteria). Note that each entry can have a single time-to-live associated with both the response data and any associated metadata. In some instances, the associated metadata may have a different time-to-live (e.g., a longer time-to-live) than the response data.

The content source having content for caching can, in addition or in alternate, be identified to a proxy server (e.g., proxy server 125 or 325 shown in the examples of FIG. 1B and FIG. 3A, respectively) remote from and in wireless communication with the mobile device 250 such that the proxy server can monitor the content source (e.g., application server/content provider 110) for new or changed data. Similarly, the local proxy (e.g., the local proxy 175 or 275 of FIG. 1B and FIG. 2A, respectively) can identify to the proxy server that content received from a specific application server/content provider is being stored as cached elements in the local cache 285.

Once content has been locally cached, the cache policy manager 245, upon receiving future polling requests to contact the application server/content host (e.g., 110 or 310), can retrieve the cached elements from the local cache to respond to the polling request made at the mobile device 250 such that a radio of the mobile device is not activated to service the polling request. For example, the cache look-up engine 205 can query the cache 285 to identify the response to be served to a response. The response can be served from the cache in response to identifying a matching cache entry and also using any metadata stored with the response in the cache entry. The cache entries can be queried by the cache look-up engine using a URI of the request or another type of identifier (e.g., via the ID or URI filter 205*a*). The cache-lookup engine 205 can further use the metadata (e.g., extract any timing information or other relevant information) stored with the matching cache entry to determine whether response is still suited for use in being served to a current request.

Note that the cache-look-up can be performed by the engine 205 using one or more of various multiple strategies. In one embodiment, multiple cook-up strategies can be executed sequentially on each entry store din the cache 285, until at least one strategy identifies a matching cache entry. The strategy employed to performing cache look-up can include a strict matching criteria or a matching criteria which allows for non-matching parameters.

For example, the look-up engine 205 can perform a strict matching strategy which searches for an exact match between an identifier (e.g., a URI for a host or resource) referenced in a present request for which the proxy is attempting to identify a cache entry and an identifier stored with the cache entries. In the case where identifiers include URIs or URLs, the matching algorithm for strict matching will search for a cache entry where all the parameters in the URLs match. For example:

Example 1

1. Cache contains entry for http://test.com/products/2.
Request is being made to URI http://test.com/products/
Strict strategy will find a match, since both URIs are same.

Example 2

1. Cache contains entry for http://test.com/products/?query=all
2. Request is being made to URI http://test.com/products/?query=sub Under the strict strategy outlined above, a match will not be found since the URIs differ in the query parameter.

In another example strategy, the look-up engine 205 looks for a cache entry with an identifier that partially matches the identifier references in a present request for which the proxy is attempting to identify a matching cache entry. For example, the look-up engine 205 may look for a cache entry with an identifier which differs from the request identifier by a query parameter value. In utilizing this strategy, the look-up engine 205 can collect information collected for multiple previous requests (e.g., a list of arbitrary parameters in an identifier) to be later checked with the detected arbitrary parameter in the current request. For example, in the case where cache entries are stored with URI or URL identifiers, the look-up engine searches for a cache entry with a URI differing by a query parameter. If found, the engine 205 can examine the cache entry for information collected during previous requests (e.g. a list of arbitrary parameters) and checked whether the arbitrary parameter detected in or extracted from the current URI/URL belongs to the arbitrary parameters list.

Example 1

1. Cache contains entry for http://test.com/products/?query=all, where query is marked as arbitrary.
2. Request is being made to URI http://text.com/products/?query=sub Match will be found, since query parameter is marked as arbitrary.

Example 2

1. Cache contains entry for http://test.com/products/?query=all, where query is marked as arbitrary.
2. Request is being made to URI http://test.com/products/?query=sub&sort=asc Match will not be found, since current request contains sort parameter which is not marked as arbitrary in the cache entry.

Additional strategies for detecting cache hit may be employed. These strategies can be implemented singly or in any combination thereof. A cache-hit can be determined when any one of these strategies determines a match. A cache miss may be indicated when the look-up engine 205 determines that the requested data cannot be served from the cache 285, for any reason. For example, a cache miss may be determined when no cache entries are identified for any or all utilized look-up strategies.

Cache miss may also be determined when a matching cache entry exists but determined to be invalid or irrelevant for the current request. For example, the look-up engine 205 may further analyze metadata (e.g., which may include timing data of the cache entry) associated with the matching cache entry to determine whether it is still suitable for use in responding to the present request.

When the look-up engine 205 has identified a cache hit (e.g., an event indicating that the requested data can be served from the cache), the stored response in the matching cache entry can be served from the cache to satisfy the request of an application/client.

By servicing requests using cache entries stored in cache 285, network bandwidth and other resources need not be used to request/receive poll responses which may have not changed from a response that has already been received at the mobile device 250. Such servicing and fulfilling application (e.g., mobile application) requests locally via cache entries in the local cache 285 allows for more efficient resource and mobile network traffic utilization and management since the request need not be sent over the wireless network further consuming bandwidth. In general, the cache 285 can be persisted between power on/off of the mobile device 250, and persisted across application/client refreshes and restarts.

For example, the local proxy 275, upon receipt of an outgoing request from its mobile device 250 or from an application or other type of client on the mobile device 250, can intercept the request and determine whether a cached response is available in the local cache 285 of the mobile device 250. If so, the outgoing request is responded to by the local proxy 275 using the cached response on the cache of the mobile device. As such, the outgoing request can be filled or satisfied without a need to send the outgoing request over the wireless network, thus conserving network resources and battery consumption.

In one embodiment, the responding to the requesting application/client on the device 250 is timed to correspond to a manner in which the content server would have responded to the outgoing request over a persistent connection (e.g., over the persistent connection, or long-held HTTP connection, long poll type connection, that would have been established absent interception by the local proxy). The timing of the response can be emulated or simulated by the local proxy 275 to preserve application behavior such that end user experience is not affected, or minimally affected by serving stored content from the local cache 285 rather than fresh content received from the intended content source (e.g., content host/application server 110 of FIG. 1A-B). The timing can be replicated exactly or estimated within a tolerance parameter, which may go unnoticed by the user or treated similarly by the application so as to not cause operation issues.

For example, the outgoing request can be a request for a persistent connection intended for the content server (e.g., application server/content provider of examples of FIG. 1A-1B). In a persistent connection (e.g., long poll, COMET-style push or any other push simulation in asynchronous HTTP requests, long-held HTTP request, HTTP streaming, or others) with a content source (server), the connection is held for some time after a request is sent. The connection can typically be persisted between the mobile device and the server until content is available at the server to be sent to the mobile device. Thus, there typically can be some delay in time between when a long poll request is sent and when a response is received from the content source. If a response is not provided by the content source for a certain amount of time, the connection may also terminate due to network reasons (e.g., socket closure) if a response is not sent.

Thus, to emulate a response from a content server sent over a persistent connection (e.g., a long poll style connection), the manner of response of the content server can be simulated by allowing a time interval to elapse before responding to the outgoing request with the cached response. The length of the time interval can be determined on a request by request basis or on an application by application (client by client basis), for example.

In one embodiment, the time interval is determined based on request characteristics (e.g., timing characteristics) of an application on the mobile device from which the outgoing request originates. For example, poll request intervals (e.g., which can be tracked, detected, and determined by the long poll detector 238a of the poll interval detector 238) can be used to determine the time interval to wait before responding to a request with a local cache entry and managed by the response scheduler 249a.

One embodiment of the cache policy manager 245 includes a poll schedule generator 247 which can generate a polling schedule for one or more applications on the mobile device 250. The polling schedule can specify a polling interval that can be employed by an entity which is physically distinct and/or separate from the mobile device 250 in monitoring the content source for one or more applications (such that cached responses can be verified periodically by polling a host server (host server 110 or 310) to which the request is directed) on behalf of the mobile device. One example of such an external entity which can monitor the content at the source for the mobile device 250 is a proxy server (e.g., proxy server 125 or 325 shown in the examples of FIG. 1B and FIG. 3A-C).

The polling schedule, including a rate/frequency of polling) can be determined, for example, based on the interval between the polling requests directed to the content source from the mobile device. The polling schedule or rate of polling may be determined at the mobile device 250 (by the local proxy). In one embodiment, the poll interval detector 238 of the application behavior detector 236 can monitor polling requests directed to a content source from the mobile device 250 in order to determine an interval between the polling requests made from any or all application (e.g., mobile application).

For example, the poll interval detector 238 can track requests and responses for applications or clients on the device 250. In one embodiment, consecutive requests are tracked prior to detection of an outgoing request initiated from the application (e.g., mobile application) on the mobile device 250 by the same mobile client or application (e.g., mobile application). The polling rate can be determined using request information collected for the request for which the response is cached. In one embodiment, the rate is determined from averages of time intervals between previous requests generated by the same client which generated the request. For example, a first interval may be computed between the current request and a previous request, and a second interval can be computed between the two previous requests. The polling rate can be set from the average of the first interval and the second interval and sent to the proxy server in setting up the caching strategy.

Alternate intervals may be computed in generating an average; for example, multiple previous requests in addition to two previous requests may be used, and more than two intervals may be used in computing an average. In general, in computing intervals, a given request need not have resulted in a response to be received from the host server/content source in order to use it for interval computation. In other words, the timing characteristics of a given request may be used in interval computation, as long as the request has been detected, even if the request failed in sending, or if the response retrieval failed.

One embodiment of the poll schedule generator 247 includes a schedule update engine 247a and/or a time adjustment engine 247b. The schedule update engine 247a can determine a need to update a rate or polling interval with which a given application server/content host from a previously set value, based on a detected interval change in the actual requests generated from a client or application (e.g., mobile application) on the mobile device 250.

For example, a request for which a monitoring rate was determined may now be sent from the application (e.g., mobile application) or client at a different request interval. The scheduled update engine 247a can determine the updated polling interval of the actual requests and generate a new rate, different from the previously set rate to poll the host at on behalf of the mobile device 250. The updated polling rate can be communicated to the remote proxy (proxy server 325) over the cellular network for the remote proxy to monitor the given host. In some instances, the updated polling rate may be determined at the remote proxy or remote entity which monitors the host.

In one embodiment, the time adjustment engine 247b can further optimize the poll schedule generated to monitor the application server/content source (110 or 310). For example, the time adjustment engine 247b can optionally specify a time to start polling to the proxy server. For example, in addition to setting the polling interval at which the proxy server is to monitor the application, server/content host can also specify the time at which an actual request was generated at the mobile client/application.

However, in some cases, due to inherent transmission delay or added network delays or other types of latencies, the remote proxy server receives the poll setup from the local proxy with some delay (e.g., a few minutes, or a few seconds). This has the effect of detecting response change at the source after a request is generated by the mobile client/application causing the invalidate of the cached response to occur after it has once again been served to the application after the response is no longer current or valid. This discrepancy is further illustrated diagrammatically in the data timing diagram of FIG. 21.

To resolve this non-optimal result of serving the out-dated content once again before invalidating it, the time adjustment engine 247b can specify the time (t0) at which polling should begin in addition to the rate, where the specified initial time t0 can be specified to the proxy server 325 as a time that is less than the actual time when the request was generated by the mobile app/client. This way, the server polls the resource slightly before the generation of an actual request by the mobile client such that any content change can be detected prior to an actual application request. This prevents invalid or irrelevant out-dated content/response from being served once again before fresh content is served.

In one embodiment, an outgoing request from a mobile device 250 is detected to be for a persistent connection (e.g., a long poll, COMET style push, and long-held (HTTP) request) based on timing characteristics of prior requests from the same application or client on the mobile device 250. For example, requests and/or corresponding responses can be tracked by the request/response tracking engine 238b of the long poll detector 238a of the poll interval detector 238.

The timing characteristics of the consecutive requests can be determined to set up a polling schedule for the application or client. The polling schedule can be used to monitor the content source (content source/application server) for content changes such that cached content stored on the local cache in the mobile device 250 can be appropriately managed (e.g., updated or discarded). In one embodiment, the timing characteristics can include, for example, a response delay time ('D') and/or an idle time ('IT').

In one embodiment, the response/request tracking engine 238b can track requests and responses to determine, compute, and/or estimate, the timing diagrams for applicant or client requests.

For example, the response/request tracking engine 238b detects a first request (Request 0) initiated by a client on the mobile device and a second request (Request 1) initiated by the client on the mobile device after a response is received at the mobile device responsive to the first request. The second request is one that is subsequent to the first request.

In one embodiment, the response/request tracking engine 238b can track requests and responses to determine, compute, and/or estimate the timing diagrams for applicant or client requests. The response/request tracking engine 238b can detect a first request initiated by a client on the mobile device and a second request initiated by the client on the mobile device after a response is received at the mobile device responsive to the first request. The second request is one that is subsequent to the first request.

The response/request tracking engine 238b further determines relative timings between the first, second requests, and the response received in response to the first request. In general, the relative timings can be used by the long poll detector 238a to determine whether requests generated by the application are long poll requests.

Note that in general, the first and second requests that are used by the response/request tracking engine 238b in computing the relative timings are selected for use after a long poll hunting period has settled or in the event when long poll hunting does not occur.

In one embodiment, the long poll hunting detector 238c can identify or detect hunting mode, by identifying increasing request intervals (e.g., increasing delays). The long poll hunting detector 238a can also detect hunting mode by detecting increasing request intervals, followed by a request with no response (e.g., connection timed out), or by detecting increasing request intervals followed by a decrease in the interval. In addition, the long poll hunting detector 238c can apply a filter value or a threshold value to request-response time delay value (e.g., an absolute value) above which the detected delay can be considered to be a long poll request-response delay. The filter value can be any suitable value characteristic of long polls and/or network conditions (e.g., 2 s, 5 s, 10 s, 15 s, 20 s., etc.) and can be used as a filter or threshold value.

The response delay time ('D') refers to the start time to receive a response after a request has been sent and the idle refers to time to send a subsequent request after the response has been received. In one embodiment, the outgoing request is detected to be for a persistent connection based on a comparison (e.g., performed by the tracking engine 238b) of the response delay time relative ('D') or average of ('D') (e.g., any average over any period of time) to the idle time ('IT'), for example, by the long poll detector 238a. The number of averages used can be fixed, dynamically adjusted, or changed over a longer period of time. For example, the requests initiated by the client are determined to be long poll requests if the response delay time interval is greater than the idle time interval (D>IT or D>>IT). In one embodiment, the tracking engine 238b of the long poll detector computes, determines, or estimates the response delay time interval as the amount of time elapsed between time of the first request and initial detection or full receipt of the response.

In one embodiment, a request is detected to be for a persistent connection when the idle time ('IT') is short since persistent connections, established in response to long poll requests or long poll HTTP requests for example, can also be characterized in detecting immediate or near-immediate issuance of a subsequent request after receipt of a response to a previous request (e.g., IT ~0). As such, the idle time ('IT') can also be used to detect such immediate or near-immediate re-request to identify long poll requests. The absolute or relative timings determined by the tracking engine 238b are used to determine whether the second request is immediately or near-immediately re-requested after the response to the first request is received. For example, a request may be categorized as a long poll request if D+RT+IT~D+RT since IT is small for this to hold true. IT may be determined to be small if it is less than a threshold value. Note that the threshold value could be fixed or calculated over a limited time period (a session, a day, a month, etc.), or calculated over a longer time period (e.g., several months or the life of the analysis). For example, for every request, the average IT can be determined, and the threshold can be determined using this average IT (e.g., the average IT less a certain percentage may be used as the threshold). This can allow the threshold to automatically adapt over time to network conditions and changes in server capability, resource availability or server response. A fixed threshold can take upon any value including by way of example but not limitation (e.g., 1 s. 2 s. 3 s. . . . etc.).

In one embodiment, the long poll detector 238a can compare the relative timings (e.g., determined by the tracker engine 238b) to request-response timing characteristics for other applications to determine whether the requests of the application are long poll requests. For example, the requests initiated by a client or application can be determined to be long poll requests if the response delay interval time ('D') or the average response delay interval time (e.g., averaged over x number of requests or any number of delay interval times averaged over x amount of time) is greater than a threshold value.

The threshold value can be determined using response delay interval times for requests generated by other clients, for example by the request/response tracking engine 238*b* and/or by the application profile generator 239 (e.g., the response delay interval tracker 239*a*). The other clients may reside on the same mobile device and the threshold value is determined locally by components on the mobile device. The threshold value can be determined for all requests over all resources server over all networks, for example. The threshold value can be set to a specific constant value (e.g., 30 seconds, for example) to be used for all requests, or any request which does not have an applicable threshold value (e.g., long poll is detected if D>30 seconds).

In some instances, the other clients reside on different mobile devices and the threshold can be determined by a proxy server (e.g., proxy server 325 of the host 300 shown in the example of FIG. 3A-B) which is external to the mobile device and able to communicate over a wireless network with the multiple different mobile devices, as will be further described with reference to FIG. 3B.

In one embodiment, the cache policy manager 245 sends the polling schedule to the proxy server (e.g., proxy server 125 or 325 shown in the examples of FIG. 1B and FIG. 3A) and can be used by the proxy server in monitoring the content source, for example, for changed or new content (updated response different from the cached response associated with a request or application). A polling schedule sent to the proxy can include multiple timing parameters including but not limited to interval (time from request 1 to request 2) or a time out interval (time to wait for response, used in long polls, for example). The timing intervals 'RI', 'D', 'RT', and/or 'IT', or some statistical manipulation of the above values (e.g., average, standard deviation, etc.) may all or in part be sent to the proxy server.

For example, in the case when the local proxy 275 detects a long poll, the various timing intervals in a request/response timing sequence (e.g., 'D', 'RT', and/or 'IT') can be sent to the proxy server 325 for use in polling the content source (e.g., application server/content host 110). The local proxy 275 can also identify to the proxy server 325 that a given application or request to be monitored is a long poll request (e.g., instructing the proxy server to set a 'long poll flag', for example). In addition, the proxy server uses the various timing intervals to determine when to send keep-alive indications on behalf of mobile devices.

The local cache invalidator 244 of the caching policy manager 245 can invalidate cache elements in the local cache (e.g., cache 185 or 285) when new or changed data (e.g., updated response) is detected from the application server/content source for a given request. The cached response can be determined to be invalid for the outgoing request based on a notification received from the proxy server (e.g., proxy 325 or the host server 300). The source which provides responses to requests of the mobile client can be monitored to determine relevancy of the cached response stored in the cache of the mobile device 250 for the request. For example, the cache invalidator 244 can further remove/delete the cached response from the cache of the mobile device when the cached response is no longer valid for a given request or a given application.

In one embodiment, the cached response is removed from the cache after it is provided once again to an application which generated the outgoing request after determining that the cached response is no longer valid. The cached response can be provided again without waiting for the time interval or provided again after waiting for a time interval (e.g., the time interval determined to be specific to emulate the response delay in a long poll). In one embodiment, the time interval is the response delay 'D' or an average value of the response delay 'D' over two or more values.

The new or changed data can be, for example, detected by the proxy server (e.g., proxy server 125 or 325 shown in the examples of FIG. 1B and FIG. 3A). When a cache entry for a given request/poll has been invalidated, the use of the radio on the mobile device 250 can be enabled (e.g., by the local proxy 275 or the cache policy manager 245) to satisfy the subsequent polling requests, as further described with reference to the interaction diagram of FIG. 4B.

One embodiment of the cache policy manager 245 includes a cache or connect selection engine 249 which can decide whether to use a locally cached entry to satisfy a poll/content request generated at the mobile device 250 by an application or widget. For example, the local proxy 275 or the cache policy manger 245 can intercept a polling request, made by an application (e.g., mobile application) on the mobile device, to contact the application server/content provider. The selection engine 249 can determine whether the content received for the intercepted request has been locally stored as cache elements for deciding whether the radio of the mobile device needs to be activated to satisfy the request made by the application (e.g., mobile application) and also determine whether the cached response is still valid for the outgoing request prior to responding to the outgoing request using the cached response.

In one embodiment, the local proxy 275, in response to determining that relevant cached content exists and is still valid, can retrieve the cached elements from the local cache to provide a response to the application (e.g., mobile application) which made the polling request such that a radio of the mobile device is not activated to provide the response to the application (e.g., mobile application). In general, the local proxy 275 continues to provide the cached response each time the outgoing request is received until the updated response different from the cached response is detected.

When it is determined that the cached response is no longer valid, a new request for a given request is transmitted over the wireless network for an updated response. The request can be transmitted to the application server/content provider (e.g., server/host 110) or the proxy server on the host server (e.g., proxy 325 on the host 300) for a new and updated response. In one embodiment the cached response can be provided again as a response to the outgoing request if a new response is not received within the time interval, prior to removal of the cached response from the cache on the mobile device.

Figure 2C:
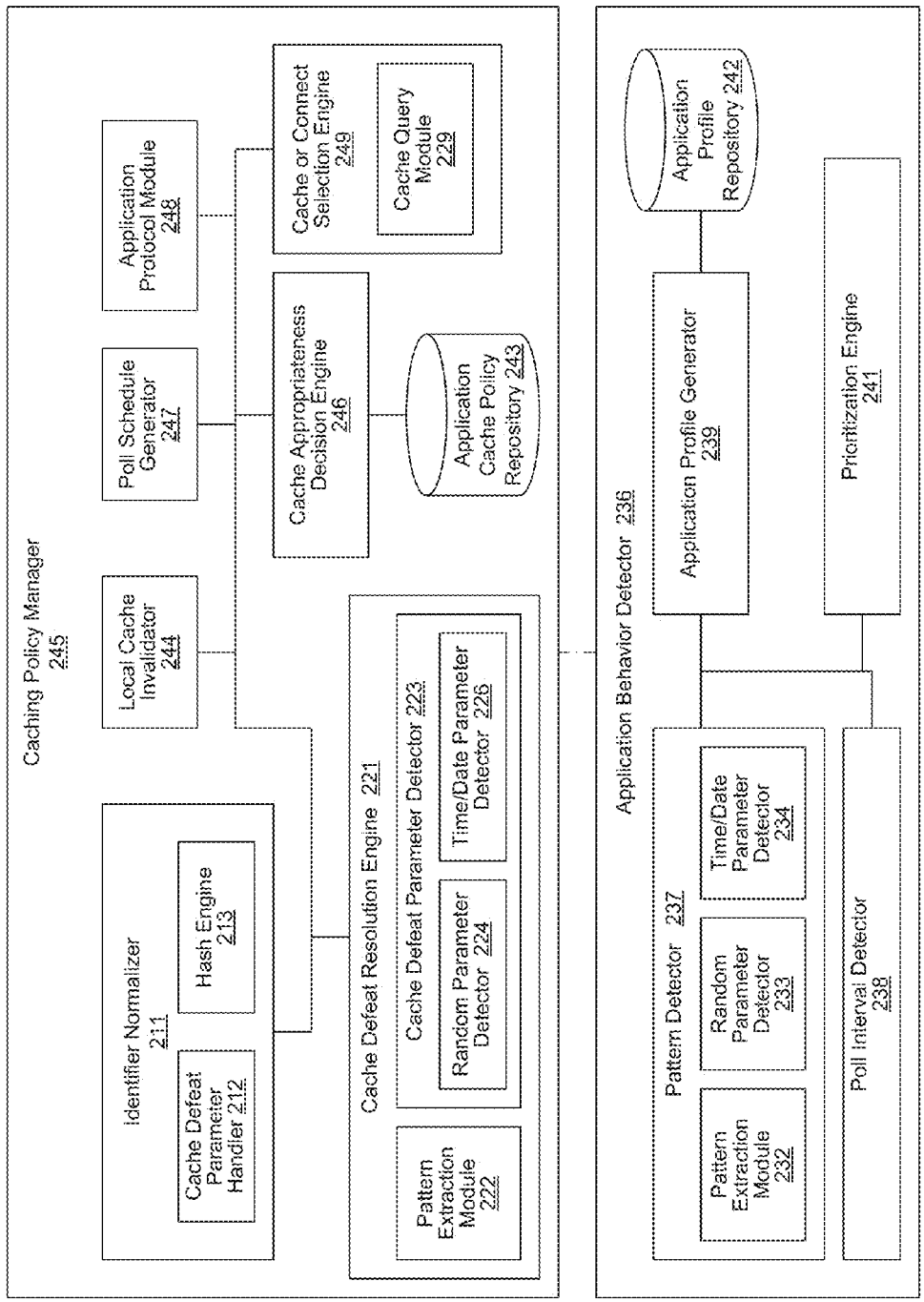
FIG. 2C depicts a block diagram illustrating additional components in the application behavior detector and the caching policy manager in the cache system shown in the example of FIG. 2A which is further capable of detecting cache defeat and perform caching of content addressed by identifiers intended to defeat cache.

FIG. 2C depicts a block diagram illustrating another example of components in the application behavior detector 236 and the caching policy manager 245 in the local proxy 275 on the client-side of the distributed proxy system shown in the example of FIG. 2A. The illustrated application behavior detector 236 and the caching policy manager 245 can, for example, enable the local proxy 275 to detect cache defeat and perform caching of content addressed by identifiers intended to defeat cache.

In one embodiment, the caching policy manager 245 includes a cache defeat resolution engine 221, an identifier formalizer 211, a cache appropriateness decision engine 246, a poll schedule generator 247, an application protocol module 248, a cache or connect selection engine 249 having a cache query module 229, and/or a local cache invalidator 244. The cache defeat resolution engine 221 can further include a pattern extraction module 222 and/or a cache defeat parameter detector 223. The cache defeat parameter detector 223 can further include a random parameter detector 224 and/or a time/date parameter detector 226. One embodiment further includes an application cache policy repository 243 coupled to the decision engine 246.

In one embodiment, the application behavior detector 236 includes a pattern detector 237, a poll interval detector 238, an application profile generator 239, and/or a priority engine 241. The pattern detector 237 can further include a cache defeat parameter detector 223 having also, for example, a random parameter detector 233 and/or a time/date parameter detector 234. One embodiment further includes an application profile repository 242 coupled to the application profile generator 239. The application profile generator 239, and the priority engine 241 have been described in association with the description of the application behavior detector 236 in the example of FIG. 2A.

The cache defeat resolution engine 221 can detect, identify, track, manage, and/or monitor content or content sources (e.g., servers or hosts) which employ identifiers and/or are addressed by identifiers (e.g., resource identifiers such as URLs and/or URIs) with one or more mechanisms that defeat cache or are intended to defeat cache. The cache defeat resolution engine 221 can, for example, detect from a given data request generated by an application or client that the identifier defeats or potentially defeats cache, where the data request otherwise addresses content or responses from a host or server (e.g., application server/content host 110 or 310) that is cacheable.

In one embodiment, the cache defeat resolution engine 221 detects or identifies cache defeat mechanisms used by content sources (e.g., application server/content host 110 or 310) using the identifier of a data request detected at the mobile device 250. The cache defeat resolution engine 221 can detect or identify a parameter in the identifier which can indicate that cache defeat mechanism is used. For example, a format, syntax, or pattern of the parameter can be used to identify cache defeat (e.g., a pattern, format, or syntax as determined or extracted by the pattern extraction module 222).

The pattern extraction module 222 can parse an identifier into multiple parameters or components and perform a matching algorithm on each parameter to identify any of which match one or more predetermined formats (e.g., a date and/or time format, as illustrated in parameters 702 shown in FIG. 7). For example, the results of the matching or the parsed out parameters from an identifier can be used (e.g., by the cache defeat parameter detector 223) to identify cache defeating parameters which can include one or more changing parameters.

The cache defeat parameter detector 223, in one embodiment can detect random parameters (e.g., by the random parameter detector 224) and/or time and/or date parameters which are typically used for cache defeat. The cache defeat parameter detector 223 can detect random parameters (e.g., as illustrated in parameters 752 shown in FIG. 7) and/or time/dates using commonly employed formats for these parameters and performing pattern matching algorithms and tests.

In addition to detecting patterns, formats, and/or syntaxes, the cache defeat parameter detector 223 further determines or confirms whether a given parameter is defeating cache and whether the addressed content can be cached by the distributed caching system. The cache defeat parameter detector 223 can detect this by analyzing responses received for the identifiers utilized by a given data request. In general, a changing parameter in the identifier is identified to indicate cache defeat when responses corresponding to multiple data requests are the same even when the multiple data requests uses identifiers with the changing parameter being different for each of the multiple data requests.

For example, at least two same responses may be required to identify the changing parameter as indicating cache defeat. In some instances, at least three same responses may be required. The requirement for the number of same responses needed to determine that a given parameter with a varying value between requests is cache defeating may be application specific, context dependent, and/or user dependent/user specified, or a combination of the above. Such a requirement may also be static or dynamically adjusted by the distributed cache system to meet certain performance thresholds and/or either explicit/implicit feedback regarding user experience (e.g., whether the user or application is receiving relevant/fresh content responsive to requests). More of the same responses may be required to confirm cache defeat, or for the system to treat a given parameter as intended for cache defeat if an application begins to malfunction due to response caching and/or if the user expresses dissatisfaction (explicit user feedback) or the system detects user frustration (implicit user cues).

The cache appropriateness decision engine 246 can detect, assess, or determine whether content from a content source (e.g., application server/content provider 110 in the example of FIG. 1B) with which a mobile device 250 interacts, has content that may be suitable for caching. In some instances, content from a given application server/content provider (e.g., the server/provider 110 of FIG. 1B) is determined to be suitable for caching based on a set of criteria (for example, criteria specifying time criticality of the content that is being requested from the content source). In one embodiment, the local proxy (e.g., the local proxy 175 or 275 of FIG. 1B and FIG. 2A) applies a selection criteria to store the content from the host server which is requested by an application as cached elements in a local cache on the mobile device to satisfy subsequent requests made by the application.

The selection criteria can also include, by way of example, but not limitation, state of the mobile device indicating whether the mobile device is active or inactive, network conditions, and/or radio coverage statistics. The cache appropriateness decision engine 246 can any one or any combination of the criteria, and in any order, in identifying sources for which caching may be suitable.

Once application servers/content providers having identified or detected content that is potentially suitable for local caching on the mobile device 250, the cache policy manager 245 can proceed to cache the associated content received from the identified sources by storing content received from the content source as cache elements in a local cache (e.g., local cache 185 or 285 shown in the examples of FIG. 1B and FIG. 2A, respectively) on the mobile device 250. The content source can also be identified to a proxy server (e.g., proxy server 125 or 325 shown in the examples of FIG. 1B and FIG. 3A, respectively) remote from and in wireless communication with the mobile device 250 such that the proxy server can monitor the content source (e.g., application server/content provider 110) for new or changed data.

Similarly, the local proxy (e.g., the local proxy 175 or 275 of FIG. 1B and FIG. 2A, respectively) can identify to the proxy server that content received from a specific application server/content provider is being stored as cached elements in the local cache.

In one embodiment, cache elements are stored in the local cache 285 as being associated with a normalized version of an identifier for an identifier employing one or more parameters intended to defeat cache. The identifier can be normalized by the identifier normalizer module 211 and the normalization process can include, by way of example, one or more of: converting the URI scheme and host to lower-case, capitalizing letters in percent-encoded escape sequences, removing a default port, and removing duplicate slashes.

In another embodiment, the identifier is normalized by removing the parameter for cache defeat and/or replacing the parameter with a static value which can be used to address or be associated with the cached response received responsive to a request utilizing the identifier by the normalizer 211 or the cache defeat parameter handler 212. For example, the cached elements stored in the local cache 285 (shown in FIG. 2A) can be identified using the normalized version of the identifier or a hash value of the normalized version of the identifier. The hash value of an identifier or of the normalized identifier may be generated by the hash engine 213.

Once content has been locally cached, the cache policy manager 245 can, upon receiving future polling requests to contact the content server, retrieve the cached elements from the local cache to respond to the polling request made at the mobile device 250 such that a radio of the mobile device is not activated to service the polling request. Such servicing and fulfilling application (e.g., mobile application) requests locally via local cache entries allow for more efficient resource and mobile network traffic utilization and management since network bandwidth and other resources need not be used to request/receive poll responses which may have not changed from a response that has already been received at the mobile device 250.

One embodiment of the cache policy manager 245 includes a poll schedule generator 247 which can generate a polling schedule for one or more applications on the mobile device 250. The polling schedule can specify a polling interval that can be employed by the proxy server (e.g., proxy server 125 or 325 shown in the examples of FIG. 1B and FIG. 3A) in monitoring the content source for one or more applications. The polling schedule can be determined, for example, based on the interval between the polling requests directed to the content source from the mobile device. In one embodiment, the poll interval detector 238 of the application behavior detector can monitor polling requests directed to a content source from the mobile device 250 in order to determine an interval between the polling requests made from any or all application (e.g., mobile application).

In one embodiment, the cache policy manager 245 sends the polling schedule is sent to the proxy server (e.g., proxy server 125 or 325 shown in the examples of FIG. 1B and FIG. 3A) and can be used by the proxy server in monitoring the content source, for example, for changed or new content. The local cache invalidator 244 of the caching policy manager 245 can invalidate cache elements in the local cache (e.g., cache 185 or 285) when new or changed data is detected from the application server/content source for a given request. The new or changed data can be, for example, detected by the proxy server. When a cache entry for a given request/poll has been invalidated and/or removed (e.g., deleted from cache) after invalidation, the use of the radio on the mobile device 250 can be enabled (e.g., by the local proxy or the cache policy manager 245) to satisfy the subsequent polling requests, as further described with reference to the interaction diagram of FIG. 4B.

In another embodiment, the proxy server (e.g., proxy server 125 or 325 shown in the examples of FIG. 1B and FIG. 3A) uses a modified version of a resource identifier used in a data request to monitor a given content source (the application server/content host 110 of FIG. 1A and FIG. 1B to which the data request is addressed) for new or changed data. For example, in the instance where the content source or identifier is detected to employ cache defeat mechanisms, a modified (e.g., normalized) identifier can be used instead to poll the content source. The modified or normalized version of the identifier can be communicated to the proxy server by the caching policy manager 245, or more specifically the cache defeat parameter handler 212 of the identifier normalizer 211.

The modified identifier used by the proxy server to poll the content source on behalf of the mobile device/application (e.g., mobile application) may or may not be the same as the normalized identifier. For example, the normalized identifier may be the original identifier with the changing cache defeating parameter removed whereas the modified identifier uses a substitute parameter in place of the parameter that is used to defeat cache (e.g., the changing parameter replaced with a static value or other predetermined value known to the local proxy and/or proxy server). The modified parameter can be determined by the local proxy 275 and communicated to the proxy server. The modified parameter may also be generated by the proxy server (e.g., by the identifier modifier module 353 shown in the example of FIG. 3C).

One embodiment of the cache policy manager 245 includes a cache or connect selection engine 249 which can decide whether to use a locally cached entry to satisfy a poll/content request generated at the mobile device 250 by an application or widget. For example, the local proxy 275 or the cache policy manger 245 can intercept a polling request made by an application (e.g., mobile application) on the mobile device, to contact the application server/content provider. The selection engine 249 can determine whether the content received for the intercepted request has been locally stored as cache elements for deciding whether the a radio of the mobile device needs to be activated to satisfy the request made by the application (e.g., mobile application). In one embodiment, the local proxy 275, in response to determining that relevant cached content exists and is still valid, can retrieve the cached elements from the local cache to provide a response to the application (e.g., mobile application) which made the polling request such that a radio of the mobile device is not activated to provide the response to the application (e.g., mobile application).

In one embodiment, the cached elements stored in the local cache 285 (shown in FIG. 2A) can be identified using a normalized version of the identifier or a hash value of the normalized version of the identifier, for example, using the cache query module 229. Cached elements can be stored with normalized identifiers which have cache defeating parameters removed or otherwise replaced such that the relevant cached elements can be identified and retrieved in the future to satisfy other requests employing the same type of cache defeat. For example, when an identifier utilized in a subsequent request is determined to be utilizing the same cache defeating parameter, the normalized version of this identifier can be generated and used to identify a cached response stored in the mobile device cache to satisfy the data request. The hash value of an identifier or of the normalized identifier may be generated by the hash engine 213 of the identifier normalizer 211.

Figure 2D:
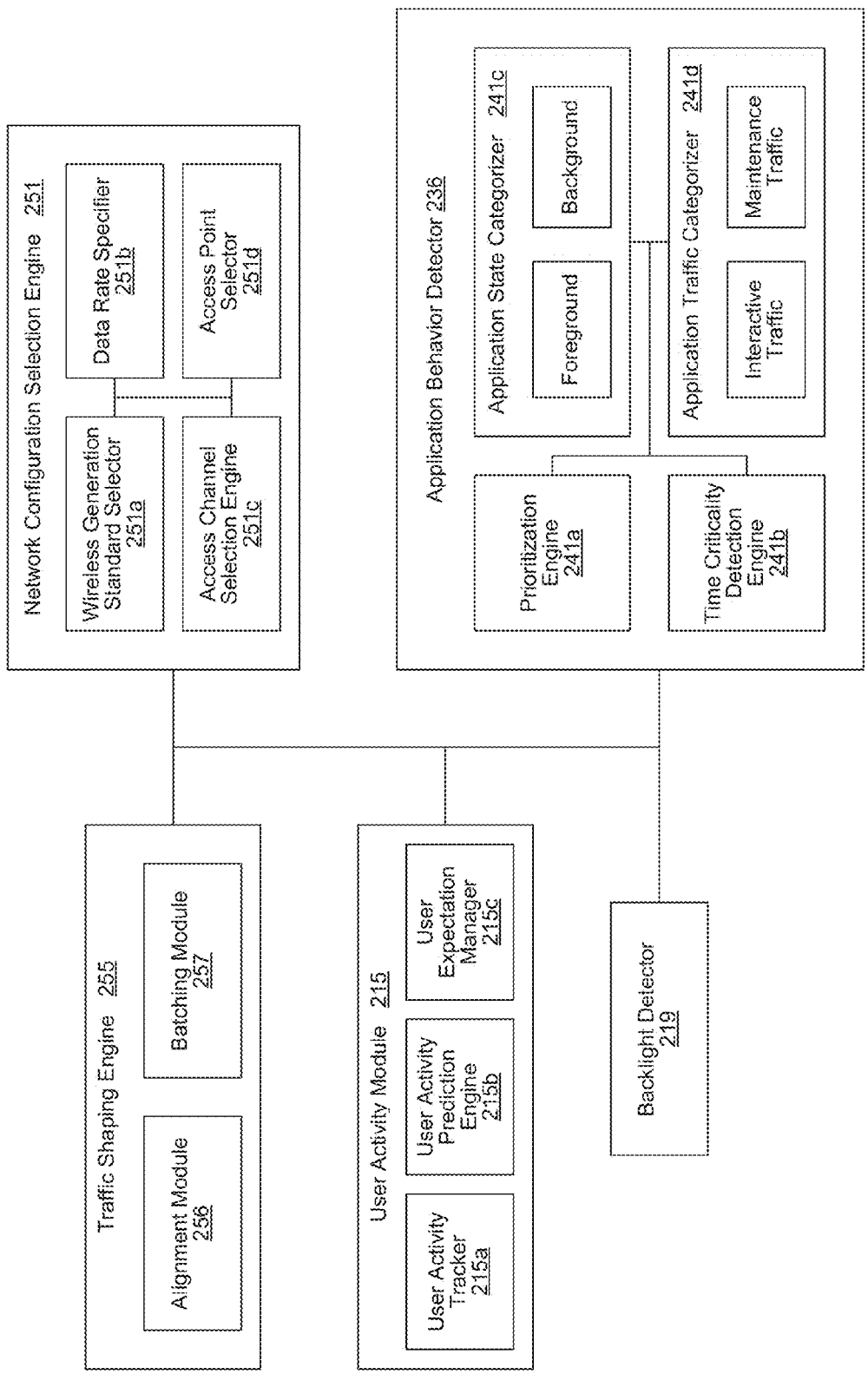
FIG. 2D depicts a block diagram illustrating examples of additional components in the local cache shown in the example of FIG. 2A which is further capable of performing mobile traffic categorization and policy implementation based on application behavior and/or user activity.
Figure 2E:
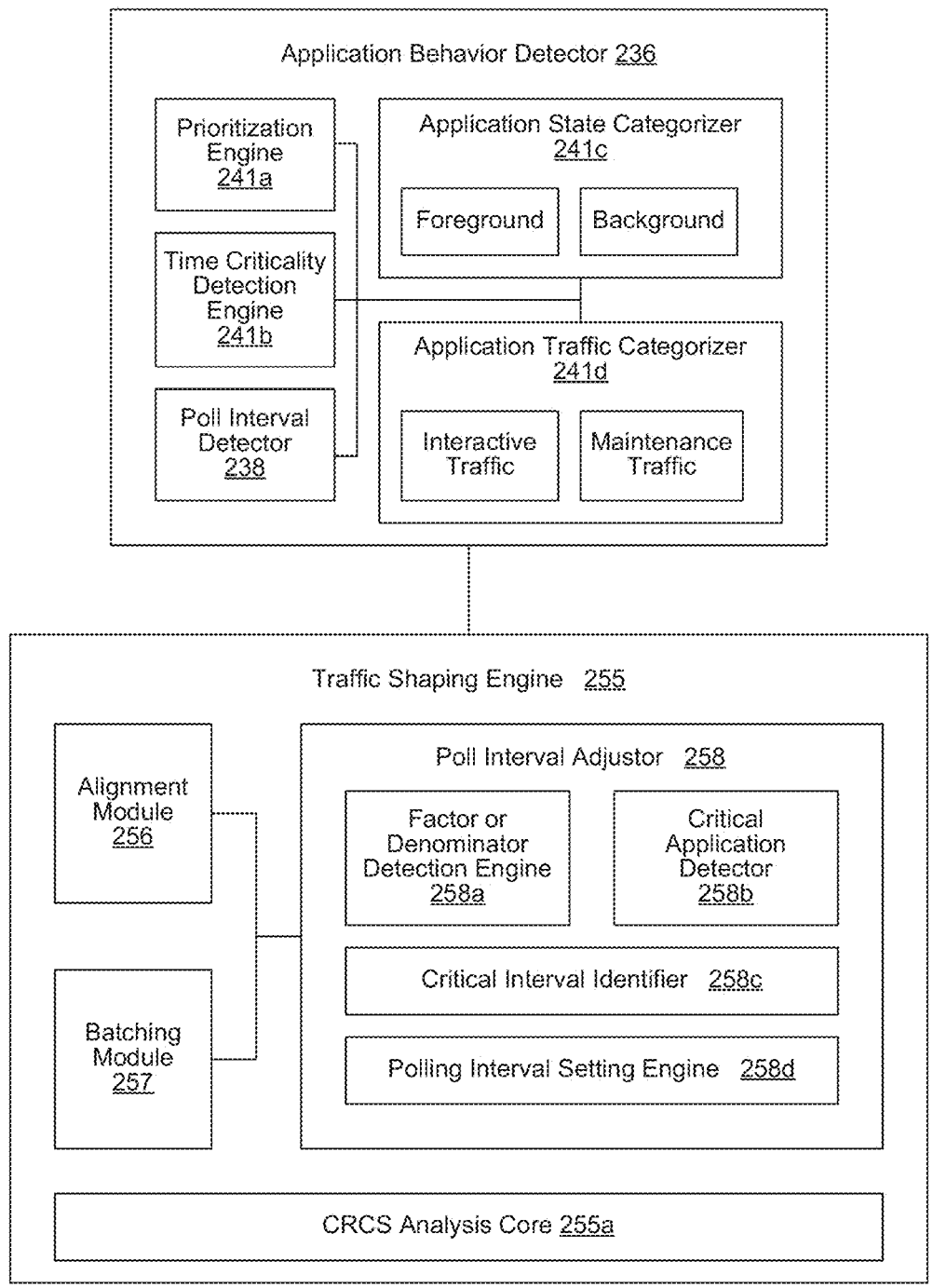
FIG. 2E depicts a block diagram illustrating examples of additional components in the traffic shaping engine and the application behavior detector shown in the example of FIG. 2A which are further capable of facilitating alignment of incoming data transfer to a mobile or broadband device, or its user, to optimize the number of connections that need to be established for receiving data over the wireless network or broadband network.

FIG. 2D depicts a block diagram illustrating examples of additional components in the local proxy 275 shown in the example of FIG. 2A which is further capable of performing mobile traffic categorization and policy implementation based on application behavior and/or user activity.

In this embodiment of the local proxy 275, the user activity module 215 further includes one or more of, a user activity tracker 215*a*, a user activity prediction engine 215*b*, and/or a user expectation manager 215*c*. The application behavior detect 236 can further include a prioritization engine 241*a*, a time criticality detection engine 241*b*, an application state categorizer 241*c*, and/or an application traffic categorizer 241*d*. The local proxy 275 can further include a backlight detector 219 and/or a network configuration selection engine 251. The network configuration selection engine 251 can further include, one or more of, a wireless generation standard selector 251*a*, a data rate specifier 251*b*, an access channel selection engine 251*c*, and/or an access point selector.

In one embodiment, the application behavior detector 236 is able to detect, determined, identify, or infer, the activity state of an application on the mobile device 250 to which traffic has originated from or is directed to, for example, via the application state categorizer 241*c* and/or the traffic categorizer 241*d*. The activity state can be determined by whether the application is in a foreground or background state on the mobile device (via the application state categorizer 241*c*) since the traffic for a foreground application vs. a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241*a*) and/or is not time-critical (e.g., by the time criticality detection engine 214*b*).

Contrastingly, a mail 'read' or message 'read' request initiated by a user a the mobile device 250, can be categorized as 'interactive traffic' since the user generally is waiting to access content or data when they request to read a message or mail. Similarly, such a request can be categorized as having higher priority (e.g., by the prioritization engine 241*a*) and/or as being time critical/time sensitive (e.g., by the time criticality detection engine 241*b*).

The time criticality detection engine 241*b* can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g, using the alignment module 256 and/or the batching module 257). The alignment module 256 can also align polling requests occurring close in time directed to the same host server, since these request are likely to be responded to with the same data.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215*a*. The traffic resulting therefrom can then be categorized appropriately for subsequent processing to determine the policy for handling. Furthermore, user activity can be predicted or anticipated by the user activity prediction engine 215*b*. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215*c* and/or in conjunction with the activity tracker 215 and/or the prediction engine 215*b*) to ensure that traffic is categorized appropriately such that user expectations are generally met. For example, a user-initiated action should be analyzed (e.g., by the expectation manager 215) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standards such as the 3G, 3.5G, 3G+, 4G, or LTE network can be selected for handling traffic generated as a result of user interaction, user activity, or traffic containing data that the user is expecting or waiting for. Advanced generation wireless standard network can also be selected for to transmit data contained in traffic directed to the mobile device which responds to foreground activities.

In categorizing traffic and defining a transmission policy for mobile traffic, a network configuration can be selected for use (e.g., by the network configuration selection engine 251) on the mobile device 250 in sending traffic between the mobile device and a proxy server (325) and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

The network configuration selection engine 251 can select or specify one or more of, a generation standard (e.g., via wireless generation standard selector 251*a*), a data rate (e.g., via data rate specifier 251*b*), an access channel (e.g., access channel selection engine 251*c*), and/or an access point (e.g., via the access point selector 251*d*), in any combination.

For example, a more advanced generation (e.g, 3G, LTE, or 4G or later) can be selected or specified for traffic when the activity state is in interaction with a user or in a foreground on the mobile device. Contrastingly, an older generation standard (e.g., 2G, 2.5G, or 3G or older) can be specified for traffic when one or more of the following is detected, the application is not interacting with the user, the application is running in the background on the mobile device, or the data contained in the traffic is not time critical, or is otherwise determined to have lower priority.

Similarly, a network configuration with a slower data rate can be specified for traffic when one or more of the following is detected, the application is not interacting with the user, the application is running in the background on the mobile device, or the data contained in the traffic is not time critical. The access channel (e.g., Forward access channel or dedicated channel) can be specified.

FIG. 2E depicts a block diagram illustrating examples of additional components in the traffic shaping engine 255 and the application behavior detector 236 shown in the example of FIG. 2A which are further capable of facilitating alignment of incoming data transfer to a mobile or broadband device, or its user, to optimize the number of connections that need to be established for receiving data over the wireless network or broadband network.

In one embodiment of the local proxy 275, the traffic shaping engine 255, in addition to the alignment module 256, batching module 257, further includes a poll interval adjuster 258. The poll interval adjuster 258 can include a factor or denominator detection engine 258*a*, a critical application detector 258*b*, a critical interval identifier 258*c*, and/or a polling interval setting engine 258*d*. Further in one embodiment, the application behavior detector 236 of the local proxy 275 further includes a poll interval detector 238.

In facilitating alignment of data bursts across various services or hosts to the mobile device 250, the local proxy 275 can initially determine, detect, identify, compute, infer, extract the an original or default polling interval for applications or mobile clients on the mobile device 250 (e.g., by the poll interval detector 238). The original or default polling interval is typically that characteristic of the mobile application itself and/or its host (e.g., its corresponding application server/content host 110 shown in FIG. 1A-1B). The poll interval detector 238 can detect the original or default poll interval for any number or all of the mobile applications which regularly poll their application servers or hosts for use by the proxy 275 in generating or adjusting the polling intervals suitable for use for the device 250 based on the applications installed thereon and their respective poll timing characteristics.

For example, the poll intervals (original or default) of the mobile clients or applications on device 250 can be used by the poll interval adjuster 258. In general, an adjusted polling interval for a first service is generated based on a polling interval of a second service, which may be serviced by a distinct host from the first service (e.g., Twitter=service 1; ESPN.com=service 2). The adjusted polling interval computed for the first service and/or the second service, can be used in aligning at least some traffic received from the distinct hosts due to access on a mobile device of first and second services.

For example, in one embodiment, the adjusted polling interval of the first service can be a factor or denominator that the original polling interval of the first service has in common with the original polling interval of the second service (e.g., as determined by the factor or denominator detection engine 258*a*), and can further be determined based on an original polling interval of the first service. Note that the adjusted polling interval of the first service need not be different from the original polling interval of the first service when the original polling interval of the first service and the polling interval of the second service are factors or denominators of each other.

In one embodiment, the detection engine 258*a* is able to further determine multiples of a factor or denominator of the polling interval of the second service and the adjusted polling interval of the first service is a multiple of a factor or a multiple of a denominator of the polling interval of the second service. In addition, the engine 258*a* can determine multiples of a common factor or a common denominator of a majority number of the default polling intervals for multiple applications on the device 250.

In addition, the adjusted polling interval of the first service can be further determined, adjusted, or reconfigured (e.g., by the polling interval setting engine 258*d*), based on time criticality of traffic from the first service relative to time criticality of traffic from the second service, or additional services on the mobile device 250. For example, the critical application detector 258*b* can identify, detect, or receive input identifying or specifying one or more applications on the device 250 as being more critical than others (e.g., higher priority, time sensitive content/traffic, user preferred application, OS sponsored application, operator-sponsored content, etc.) and further adjust the polling intervals of the first and/or second services if need.

For example, the critical application detector 258*b* can identify a critical application as being the most time critical of all applications on the mobile device, or a set of applications for which data burst alignment is being applied or attempted on. For the critical application (s), the polling interval of the critical application is identified as a minimum critical interval (e.g., by the critical interval identifier 258*c*), which is not to be exceeded in assigning an updated polling interval for the critical application such that the priority in data needs (e.g., whether it is a user-need, device-need, or application-need) for prompt and timely delivery of data from the application server or content host.

High priority information/data or application can include, for example, financial data, sporting data or other data constantly changing in nature, any data whose previous values have little to no relevancy, any data (e.g., subscriptions or feeds) that a user wishes to be immediately notified of in real time or near real time, any specific feature indicated as a real time or near real time feature by the application server/content host (e.g., real-time status updates, or real-time notifications, high priority email or other messages, IM messages, etc.) or applications servicing any type of high priority/time sensitive content.

Once the polling intervals of one or more applications on the mobile device 250 have been set, the local proxy 275 communicates a polling schedule including the adjusted polling interval (s) to a proxy server (eg., remote proxy 325 of FIG. 3A-3E) for use in aligning, in time, at least some traffic received from the distinct hosts due to access on the mobile device of first and second services, and any additional services.

In one embodiment, the poll interval setting engine 258d also selecting a common starting point in time for an initial poll of the content hosts servicing the multiple applications. The poll interval setting engine 258d can set the start time to be anchored to the same absolute point in time across the multiple applications on the device 250. In general, the application servers/content hosts are typically in UTC and use NTP to stay at the same time. For example, the interval setting engine 258d can pick any minute mark, second mark, hour mark, or other time indicators, and communicate this to the remote proxy server (e.g., proxy 325) as part of the adjusted polling parameter. The mark can be selected randomly used by all applications as the common 'initial time t0."

Note that while the above description uses an example of two applications, the same process can be performed for any number of applications or all applications/clients on the mobile device 250. In some instances, some or all of the functions performed by one or more of the components poll interval adjustor 258 can be performed remotely, for example, at a remote proxy server (e.g., proxy 325) using the poll intervals detected locally at the mobile device 250 (e.g., by the poll interval detector 238). Note that the remote proxy (e.g., proxy 325) can receive poll intervals for applications across multiple devices and track adjusted intervals for applications on multiple devices, as will be further described with the example of FIG. 3E.

FIG. 3A depicts a block diagram illustrating an example of server-side components in a distributed proxy and cache system residing on a host server 300 that manages traffic in a wireless network for resource conservation. The server-side proxy (or proxy server 325) can further categorize mobile traffic and/or implement delivery policies based on application behavior, content priority, user activity, and/or user expectations.

The host server 300 generally includes, for example, a network interface 308 and/or one or more repositories 312, 314, and 316. Note that server 300 may be any portable/mobile or non-portable device, server, cluster of computers and/or other types of processing units (e.g., any number of a machine shown in the example of FIG. 11) able to receive or transmit signals to satisfy data requests over a network including any wired or wireless networks (e.g., WiFi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 300 to communicate with multiple devices including mobile phone devices 350 and/or one or more application servers/content providers 310.

The host server 300 can store information about connections (e.g., network characteristics, conditions, types of connections, etc.) with devices in the connection metadata repository 312. Additionally, any information about third party application or content providers can also be stored in the repository 312. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by network interface 308 allows for simultaneous connections (e.g., including cellular connections) with devices 350 and/or connections (e.g., including wired/wireless, HTTP, Internet connections, LAN, WiFi, etc.) with content servers/providers 310 to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, WiFi interface, interfaces for various generations of mobile communication standards including but not limited to 1G, 2G, 3G, 3.5G, 4G type networks such as LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 300 can further include server-side components of the distributed proxy and cache system which can include a proxy server 325 and a server cache 335. In one embodiment, the proxy server 325 can include an HTTP access engine 345, a caching policy manager 355, a proxy controller 365, a traffic shaping engine 375, a new data detector 347 and/or a connection manager 395.

The HTTP access engine 345 may further include a heartbeat manager 398; the proxy controller 365 may further include a data invalidator module 368; the traffic shaping engine 375 may further include a control protocol 376 and a batching module 377. Additional or less components/modules/engines can be included in the proxy server 325 and each illustrated component.

As used herein, a "module," a "manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an application server or content provider 310, the request may be intercepted and routed to the proxy server 325 which is coupled to the device 350 and the application server/content provider 310. Specifically, the proxy server is able to communicate with the local proxy (e.g., proxy 175 and 275 of the examples of FIG. 1 and FIG. 2 respectively) of the mobile device 350, the local proxy forwards the data request to the proxy server 325 in some instances for further processing and, if needed, for transmission to the application server/content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The characteristics of user activity can be determined by, for example, the activity/behavior awareness module 366 in the proxy controller 365 via information collected by the local proxy on the device 350.

In one embodiment, communication frequency can be controlled by the connection manager 395 of the proxy server 325, for example, to adjust push frequency of content or updates to the device 350. For instance, push frequency can be decreased by the connection manager 395 when characteristics of the user activity indicate that the user is inactive. In one embodiment, when the characteristics of the user activity indicate that the user is subsequently active after a period of inactivity, the connection manager 395 can adjust the communication frequency with the device 350 to send data that was buffered as a result of decreased communication frequency to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness as tracked by modules 367 and/or 366. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 325 can order the each messages/packets in a batch for transmission based on event/transaction priority such that higher priority content can be sent first in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example, in the server cache 335 for subsequent retrieval or batch sending to the device 350 to potentially decrease the need to turn on the device 350 radio. The server cache 335 can be partially or wholly internal to the host server 300, although in the example of FIG. 3A it is shown as being external to the host 300. In some instances, the server cache 335 may be the same as and/or integrated in part or in whole with another cache managed by another entity (e.g., the optional caching proxy server 199 shown in the example of FIG. 1B), such as being managed by an application server/content provider 310, a network service provider, or another third party.

In one embodiment, content caching is performed locally on the device 350 with the assistance of host server 300. For example, proxy server 325 in the host server 300 can query the application server/provider 310 with requests and monitor changes in responses. When changed or new responses are detected (e.g., by the new data detector 347), the proxy server 325 can notify the mobile device 350 such that the local proxy on the device 350 can make the decision to invalidate (e.g., indicated as out-dated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated data. This can be performed when the host server 300 detects that the radio on the mobile device is already in use, or when the server 300 has additional content/data to be sent to the device 350.

One or more the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, through the activity/behavior awareness module 366, is able to identify or detect user activity at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new or updated content is sent to the mobile device 350, or eliminate all communication for as long as the user is detected to be using another device for access. Such frequency decrease may be application specific (e.g., for the application with which the user is interacting with on another device), or it may be a general frequency decrease (E.g., since the user is detected to be interacting with one server or one application via another device, he/she could also use it to access other services.) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350 that would otherwise be performed by the device 350 through a wireless (e.g., including cellular connectivity). The host server can poll the sources 310 for new or changed data by way of the HTTP access engine 345 to establish HTTP connection or by way of radio controller 396 to connect to the source 310 over the cellular network. When new or changed data is detected, the new data detector 347 can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance, via the SMSC shown in the example of FIG. 1B. SMS is used to transmit invalidation messages, batches of invalidation messages, or even content in the case where the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350 to maintain a backend connection with a provider 310 for applications running on devices 350.

For example, in the distributed proxy system, local cache on the device 350 can prevent any or all heartbeat messages needed to maintain TCP/IP connections required for applications from being sent over the cellular, or other, network and instead rely on the proxy server 325 on the host server 300 to generate and/or send the heartbeat messages to maintain a connection with the backend (e.g., application server/provider 110 in the example of FIG. 1A). The proxy server can generate the keep-alive (heartbeat) messages independent of the operations of the local proxy on the mobile device.

The repositories 312, 314, and/or 316 can additionally store software, descriptive data, images, system information, drivers, and/or any other data item utilized by other components of the host server 300 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via text files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 3B:
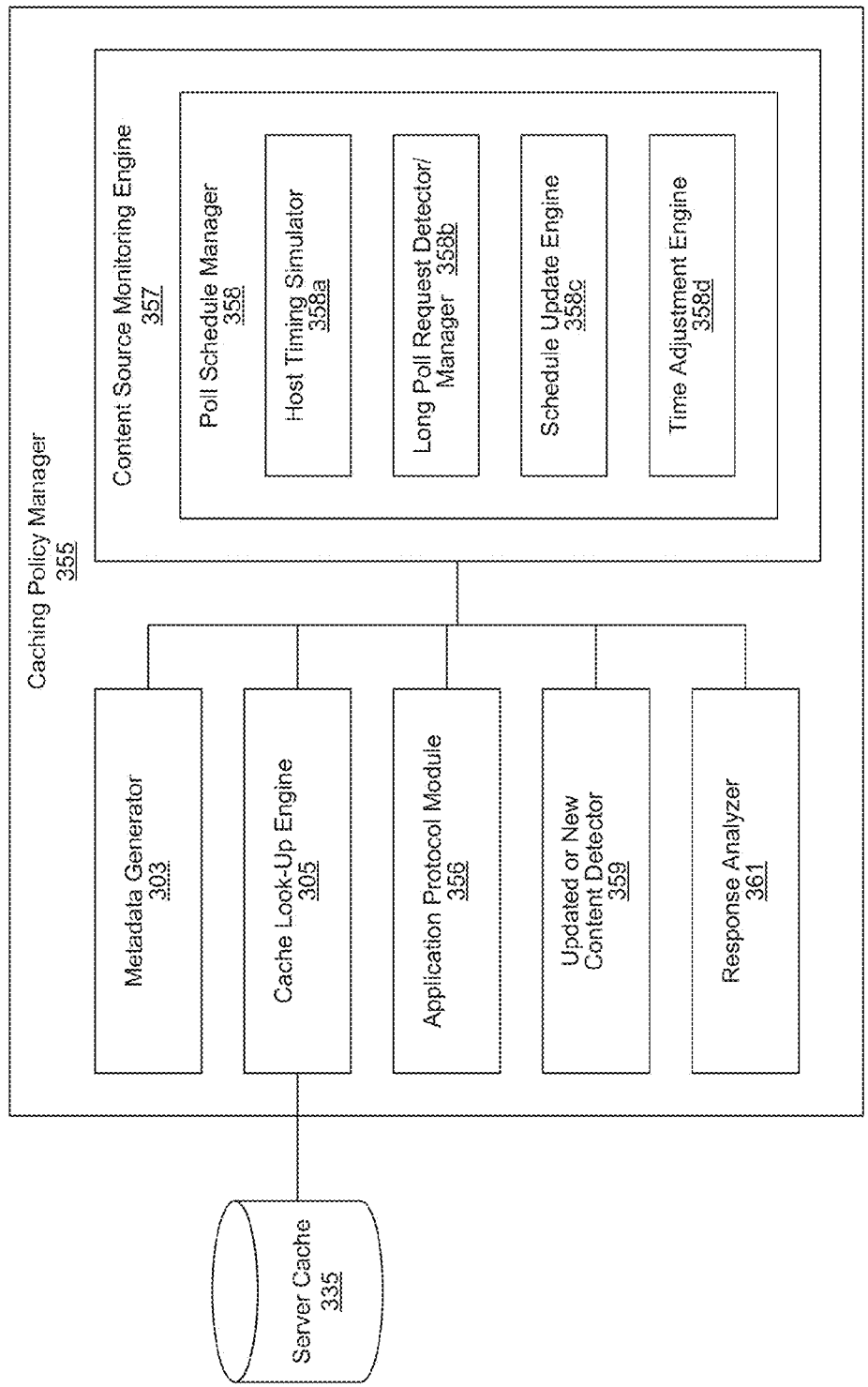
FIG. 3B depicts a block diagram illustrating a further example of components in the caching policy manager in the cache system shown in the example of FIG. 3A which is capable of caching and adapting caching strategies for mobile application behavior and/or network conditions. Components capable of detecting long poll requests and managing caching of long polls are also illustrated.

FIG. 3B depicts a block diagram illustrating a further example of components in the caching policy manager 355 in the cache system shown in the example of FIG. 3A which is capable of caching and adapting caching strategies for application (e.g., mobile application) behavior and/or network conditions.

The caching policy manager 355, in one embodiment, can further include a metadata generator 303, a cache look-up engine 305, an application protocol module 356, a content source monitoring engine 357 having a poll schedule manager 358, a response analyzer 361, and/or an updated or new content detector 359. In one embodiment, the poll schedule manager 358 further includes a host timing simulator 358a, a long poll request detector/manager 358b, a schedule update engine 358c, and/or a time adjustment engine 358d. The metadata generator 303 and/or the cache look-up engine 305 can be coupled to the cache 335 (or, server cache) for modification or addition to cache entries or querying thereof.

In one embodiment, the proxy server (e.g., the proxy server 125 or 325 of the examples of FIG. 1B and FIG. 3A) can monitor a content source for new or changed data via the monitoring engine 357. The proxy server, as shown, is an entity external to the mobile device 250 of FIG. 2A-B. The content source (e.g., application server/content provider 110 of FIG. 1B) can be one that has been identified to the proxy server (e.g., by the local proxy) as having content that is being locally cached on a mobile device (e.g., mobile device 150 or 250). The content source can be monitored, for example, by the monitoring engine 357 at a frequency that is based on polling frequency of the content source at the mobile device. The poll schedule can be generated, for example, by the local proxy and sent to the proxy server. The poll frequency can be tracked and/or managed by the poll schedule manager 358.

For example, the proxy server can poll the host (e.g., content provider/application server) on behalf of the mobile device and simulate the polling behavior of the client to the host via the host timing simulator 358a. The polling behavior can be simulated to include characteristics of a long poll request-response sequences experienced in a persistent connection with the host (e.g., by the long poll request detector/manager 358b). Note that once a polling interval/behavior is set, the local proxy 275 on the device-side and/or the proxy server 325 on the server-side can verify whether application and application server/content host behavior match or can be represented by this predicted pattern. In general, the local proxy and/or the proxy server can detect deviations and, when appropriate, re-evaluate and compute, determine, or estimate another polling interval.

In one embodiment, the caching policy manager 355 on the server-side of the distribute proxy can, in conjunction with or independent of the proxy server 275 on the mobile device, identify or detect long poll requests. For example, the caching policy manager 355 can determine a threshold value to be used in comparison with a response delay interval time (interval time 'D' shown in the example timing diagram of FIG. 17A-B) in a request-response sequence for an application request to identify or detect long poll requests, possible long poll requests (e.g., requests for a persistent connection with a host with which the client communicates including, but not limited to, a long-held HTTP request, a persistent connection enabling COMET style push, request for HTTP streaming, etc.), or other requests which can otherwise be treated as a long poll request.

For example, the threshold value can be determined by the proxy 325 using response delay interval times for requests generated by clients/applications across mobile devices which may be serviced by multiple different cellular or wireless networks. Since the proxy 325 resides on host 300 is able to communicate with multiple mobile devices via multiple networks, the caching policy manager 355 has access to application/client information at a global level which can be used in setting threshold values to categorize and detect long polls.

By tracking response delay interval times across applications across devices over different or same networks, the caching policy manager 355 can set one or more threshold values to be used in comparison with response delay interval times for long poll detection. Threshold values set by the proxy server 325 can be static or dynamic, and can be associated with conditions and/or a time-to-live (an expiration time/date in relative or absolute terms).

In addition, the caching policy manager 355 of the proxy 325 can further determine the threshold value, in whole or in part, based on network delays of a given wireless network, networks serviced by a given carrier (service provider), or multiple wireless networks. The proxy 325 can also determine the threshold value for identification of long poll requests based on delays of one or more application server/content provider (e.g., 110) to which application (e.g., mobile application) or mobile client requests are directed.

The proxy server can detect new or changed data at a monitored content source and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 355) upon detecting new or changed data can also store the new or changed data in its cache (e.g., the server cache 135 or 335 of the examples of FIG. 1B and FIG. 3A, respectively). The new/updated data stored in the server cache 335 can be used in some instances to satisfy content requests at the mobile device; for example, it can be used after the proxy server has notified the mobile device of the new/changed content and that the locally cached content has been invalidated.

The metadata generator 303, similar to the metadata generator 203 shown in the example of FIG. 2B, can generate metadata for responses cached for requests at the mobile device 250. The metadata generator 303 can generate metadata for cache entries stored in the server cache 335. Similarly, the cache look-up engine 305 can include the same or similar functions are those described for the cache look-up engine 205 shown in the example of FIG. 2B.

The response analyzer 361 can perform any or all of the functionalities related to analyzing responses received for requests generated at the mobile device 250 in the same or similar fashion to the response analyzer 246d of the local proxy shown in the example of FIG. 2B. Since the proxy server 325 is able to receive responses from the application server/content source 310 directed to the mobile device 250, the proxy server 325 (e.g., the response analyzer 361) can perform similar response analysis steps to determine cacheability, as described for the response analyzer of the local proxy. Examples of response analysis procedures are also described in conjunction with the flow charts shown in the examples of FIG. 11-13. The responses can be analyzed in addition to or in lieu of the analysis that can be performed at the local proxy 275 on the mobile device 250.

Furthermore, the schedule update engine 358c can update the polling interval of a given application server/content host based on application request interval changes of the application at the mobile device 250 as described for the schedule update engine in the local proxy 275. The time adjustment engine 358d can set an initial time at which polls of the application server/content host is to begin to prevent the serving of out of date content once again before serving fresh content as described for the schedule update engine in the local proxy 275. Both the schedule updating and the time adjustment algorithms can be performed in conjunction with or in lieu of the similar processes performed at the local proxy 275 on the mobile device 250.

Figure 3C:
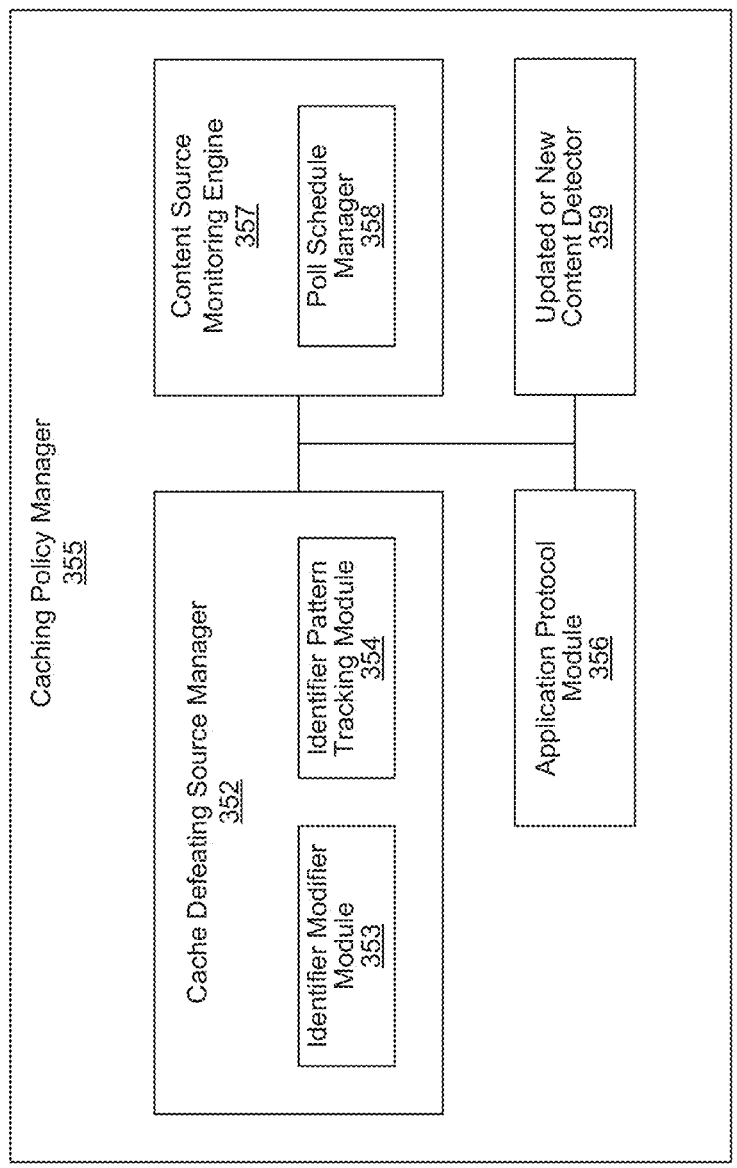
FIG. 3C depicts a block diagram illustrating another example of components in the proxy system shown in the example of FIG. 3A which is further capable of managing and detecting cache defeating mechanisms and monitoring content sources.

FIG. 3C depicts a block diagram illustrating another example of components in the caching policy manager 355 in the proxy server 375 on the server-side of the distributed proxy system shown in the example of FIG. 3A which is capable of managing and detecting cache defeating mechanisms and monitoring content sources.

The caching policy manager 355, in one embodiment, can further include a cache defeating source manager 352, a content source monitoring engine 357 having a poll schedule manager 358, and/or an updated or new content detector 359. The cache defeating source manager 352 can further include an identifier modifier module 353 and/or an identifier pattern tracking module 354.

In one embodiment, the proxy server (e.g., the proxy server 125 or 325 of the examples of FIG. 1B and FIG. 3A) can monitor a content source for new or changed data via the monitoring engine 357. The content source (e.g., application server/content provider 110 of FIG. 1B or 310 of FIG. 3A) can be one that has been identified to the proxy server (e.g., by the local proxy) as having content that is being locally cached on a mobile device (e.g., mobile device 150 or 250). The content source 310 can be monitored, for example, by the monitoring engine 357 at a frequency that is based on polling frequency of the content source at the mobile device.

The poll schedule can be generated, for example, by the local proxy and sent to the proxy server 325. The poll frequency can be tracked and/or managed by the poll schedule manager 358.

In one embodiment, the proxy server 325 uses a normalized identifier or modified identifier in polling the content source 310 to detect new or changed data (responses). The normalized identifier or modified identifier can also be used by the proxy server 325 in storing responses on the server cache 335. In general, the normalized or modified identifiers can be used when cache defeat mechanisms are employed for cacheable content. Cache defeat mechanisms can be in the form of a changing parameter in an identifier such as a URI or URL and can include a changing time/data parameter, a randomly varying parameter, or other types parameters.

The normalized identifier or modified identifier removes or otherwise replaces the changing parameter for association with subsequent requests and identification of associated responses and can also be used to poll the content source. In one embodiment, the modified identifier is generated by the cache defeating source manager 352 (e.g., the identifier modifier module 353) of the caching policy manager 355 on the proxy server 325 (server-side component of the distributed proxy system). The modified identifier can utilize a substitute parameter (which is generally static over a period of time) in place of the changing parameter that is used to defeat cache.

The cache defeating source manager 352 optionally includes the identifier pattern tracking module 354 to track, store, and monitor the various modifications of an identifier or identifiers that address content for one or more content sources (e.g., application server/content host 110 or 310) to continuously verify that the modified identifiers and/or normalized identifiers used by the proxy server 325 to poll the content sources work as predicted or intended (e.g., receive the same responses or responses that are otherwise still relevant compared to the original, unmodified identifier).

In the event that the pattern tracking module 354 detects a modification or normalization of an identifier that causes erratic or unpredictable behavior (e.g., unexpected responses to be sent) on the content source, the tracking module 354 can log the modification and instruct the cache defeating source manager 352 to generate another modification/normalization, or notify the local proxy (e.g., local proxy 275) to generate another modification/normalization for use in polling the content source. In the alternative or in parallel, the requests from the given mobile application/client on the mobile device (e.g., mobile device 250) can temporarily be sent across the network to the content source for direct responses to be provided to the mobile device and/or until a modification of an identifier which works can be generated.

In one embodiment, responses are stored as server cache elements in the server cache when new or changed data is detected for a response that is already stored on a local cache (e.g., cache 285) of the mobile device (e.g., mobile device 250). Therefore, the mobile device or local proxy 275 can connect to the proxy server 325 to retrieve the new or changed data for a response to a request which was previously cached locally in the local cache 285 (now invalid, out-dated, or otherwise determined to be irrelevant).

The proxy server 325 can detect new or changed data at a monitored application server/content host 310 and transmits a message to the mobile device notifying it of such a change such that the mobile device (or the local proxy on the mobile device) can take appropriate action (e.g., to invalidate the cache elements in the local cache). In some instances, the proxy server (e.g., the caching policy manager 355), upon detecting new or changed data, can also store the new or changed data in its cache (e.g., the server cache 135 or 335 of the examples of FIG. 1B and FIG. 3A, respectively). The updated/new data stored in the server cache can be used, in some instances, to satisfy content requests at the mobile device; for example, it can be used after the proxy server has notified the mobile device of the new/changed content and that the locally cached content has been invalidated.

Figure 3D:
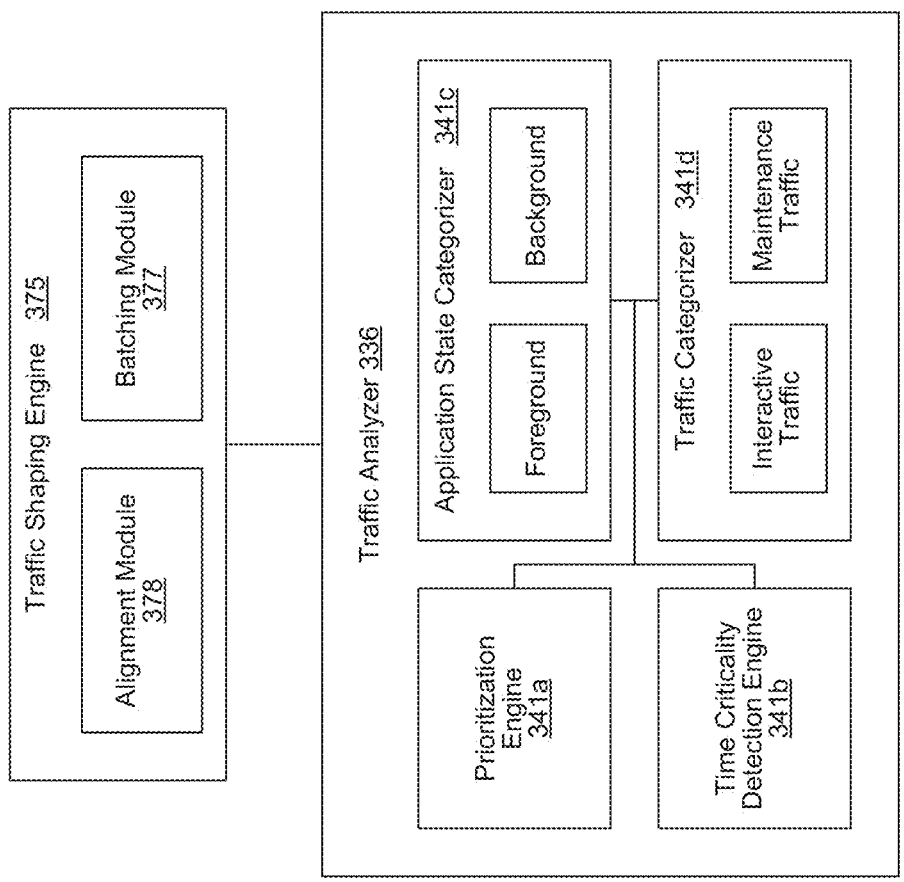
FIG. 3D depicts a block diagram illustrating examples of additional components in proxy server shown in the example of FIG. 3A which is further capable of performing mobile traffic categorization and policy implementation based on application behavior and/or traffic priority.
Figure 3E:
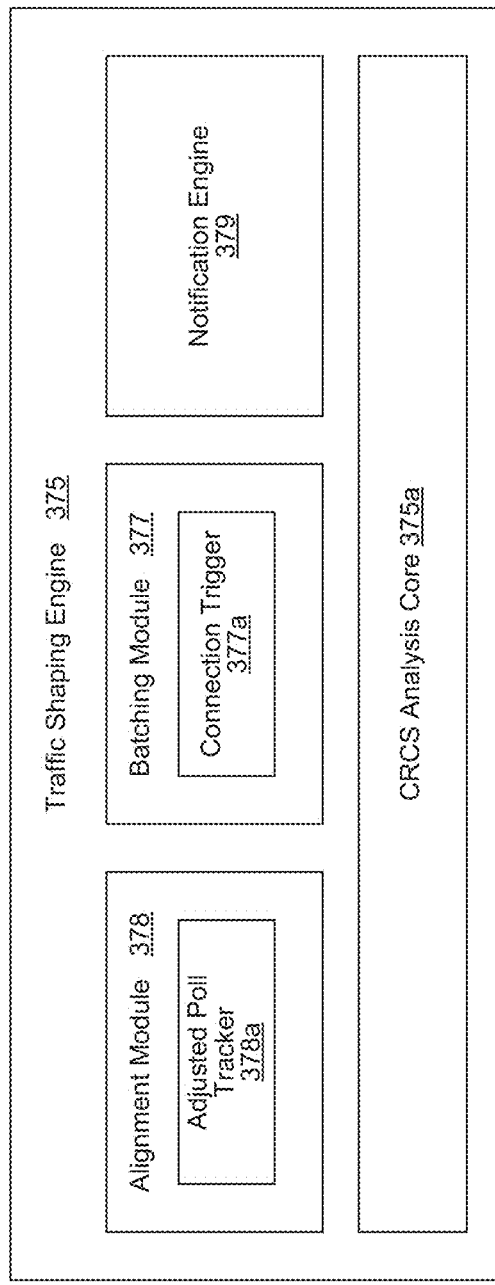
FIG. 3E depicts a block diagram illustrating examples of additional components in the traffic shaping engine of the example of FIG. 3A which is further capable of aligning data transfer to a mobile or broadband device, or other recipient, to optimize connections established for transmission in a wireless network or broadband network.

FIG. 3D depicts a block diagram illustrating examples of additional components in proxy server 325 shown in the example of FIG. 3A which is further capable of performing mobile traffic categorization and policy implementation based on application behavior and/or traffic priority.

In one embodiment of the proxy server 325, the traffic shaping engine 375 is further coupled to a traffic analyzer 336 for categorizing mobile traffic for policy definition and implementation for mobile traffic and transactions directed to one or more mobile devices (e.g., mobile device 250 of FIG. 2A-2D) or to an application server/content host (e.g., 110 of FIG. 1A-1B). In general, the proxy server 325 is remote from the mobile devices and remote from the host server, as shown in the examples of FIG. 1A-1B. The proxy server 325 or the host server 300 can monitor the traffic for multiple mobile devices and is capable of categorizing traffic and devising traffic policies for different mobile devices.

In addition, the proxy server 325 or host server 300 can operate with multiple carriers or network operators and can implement carrier-specific policies relating to categorization of traffic and implementation of traffic policies for the various categories. For example, the traffic analyzer 336 of the proxy server 325 or host server 300 can include one or more of, a prioritization engine 341a, a time criticality detection engine 341b, an application state categorizer 341c, and/or an application traffic categorizer 341d.

Each of these engines or modules can track different criterion for what is considered priority, time critical, background/foreground, or interactive/maintenance based on different wireless carriers. Different criterion may also exist for different mobile device types (e.g., device model, manufacturer, operating system, etc.). In some instances, the user of the mobile devices can adjust the settings or criterion regarding traffic category and the proxy server 325 is able to track and implement these user adjusted/configured settings.

In one embodiment, the traffic analyzer 336 is able to detect, determined, identify, or infer, the activity state of an application on one or more mobile devices (e.g., mobile device 150 or 250) which traffic has originated from or is directed to, for example, via the application state categorizer 341c and/or the traffic categorizer 341d. The activity state can be determined based on whether the application is in a foreground or background state on one or more of the mobile devices (via the application state categorizer 341c) since the traffic for a foreground application vs. a background application may be handled differently to optimize network use.

In the alternate or in combination, the activity state of an application can be determined by the wirelessly connected mobile devices (e.g, via the application behavior detectors in the local proxies) and communicated to the proxy server 325. For example, the activity state can be determined, detected, identified, or inferred with a level of certainty of heuristics, based on the backlight status at mobile devices (e.g., by a backlight detector) or other software agents or hardware sensors on the mobile device, including but not limited to, resistive sensors, capacitive sensors, ambient light sensors, motion sensors, touch sensors, etc. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

The activity state can be determined from assessing, determining, evaluating, inferring, identifying user activity at the mobile device 250 (e.g., via the user activity module 215) and communicated to the proxy server 325. In one embodiment, the activity state is determined based on whether the traffic is interactive traffic or maintenance traffic. Interactive traffic can include transactions from responses and requests generated directly from user activity/interaction with an application and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

The time criticality detection engine 341b can generally determine, identify, infer the time sensitivity of data contained in traffic sent from the mobile device 250 or to the mobile device from the host server 300 or proxy server 325, or the application server (e.g., app server/content source 110). For example, time sensitive data can include, status updates, stock information updates, IM presence information, email messages or other messages, actions generated from mobile gaming applications, webpage requests, location updates, etc.

Data that is not time sensitive or time critical, by nature of the content or request, can include requests to delete messages, mark-as-read or edited actions, application-specific actions such as a add-friend or delete-friend request, certain types of messages, or other information which does not frequently changing by nature, etc. In some instances when the data is not time critical, the timing with which to allow the traffic to be sent to a mobile device is based on when there is additional data that needs to the sent to the same mobile device. For example, traffic shaping engine 375 can align the traffic with one or more subsequent transactions to be sent together in a single power-on event of the mobile device radio (e.g, using the alignment module 378 and/or the batching module 377). The alignment module 378 can also align polling requests occurring close in time directed to the same host server, since these request are likely to be responded to with the same data.

In general, whether new or changed data is sent from a host server to a mobile device can be determined based on whether an application on the mobile device to which the new or changed data is relevant, is running in a foreground (e.g., by the application state categorizer 341c), or the priority or time criticality of the new or changed data. The proxy server 325 can send the new or changed data to the mobile device if the application is in the foreground on the mobile device, or if the application is in the foreground and in an active state interacting with a user on the mobile device, and/or whether a user is waiting for a response that would be provided in the new or changed data. The proxy server 325 (or traffic shaping engine 375) can send the new or changed data that is of a high priority or is time critical.

Similarly, the proxy server 325 (or the traffic shaping engine 375) can suppressing the sending of the new or changed data if the application is in the background on the mobile device. The proxy server 325 can also suppress the sending of the new or changed data if the user is not waiting for the response provided in the new or changed data; wherein the suppressing is performed by a proxy server coupled to the host server and able to wirelessly connect to the mobile device.

In general, if data, including new or change data is of a low priority or is not time critical, the proxy server can waiting to transfer the data until after a time period, or until there is additional data to be sent (e.g. via the alignment module 378 and/or the batching module 377).

FIG. 3E depicts a block diagram illustrating examples of additional components in the traffic shaping engine 375 of the example of FIG. 3A which is further capable of aligning data transfer to a mobile or broadband device, or other recipient, to optimize connections established for transmission in a wireless network or broadband network.

In one embodiment of the proxy server 325, the traffic shaping engine 375 further includes a notification engine 379 and the alignment module 378 includes an adjusted poll tracker 378a and the batching module 377 further includes a connection trigger 377a.

In one embodiment, the proxy server 325 is able to poll distinct hosts servicing various applications (e.g., first and second services) on a given mobile device at a schedule. The polling schedule can be set by the local proxy (e.g., proxy 275 of FIG. 2A-2E) and can include assigned polling intervals for applications on a mobile device (e.g., device 250) which may have been adjusted. The polling schedules can be tracked by the adjusted poll tracker 378a in the alignment module 378 of the traffic shaping engine 375 in the proxy server 325, for example. The adjusted polling intervals of one service/one application can be determined based on the polling interval of another service on the mobile device, such that data received at the remote proxy 325 can be provided to the mobile device in batch, for example, by the batching module 377.

The polling schedule can also include an initial start time (t0) to start polling on behalf of multiple applications on a given mobile device. The initial start time (e.g., a mutual starting point in time) of a first poll of the distinct hosts servicing the first and second services can be selected, for example, by the local proxy 275 (e.g., proxy 275 of FIG. 2A-2E), and in some instances, by the proxy server 325. When determined by the local proxy, the local proxy communicates the mutual starting point in time for polls to the proxy server 325. In one embodiment, the mutual starting point in time is set to be in the future to compensate for communication delay.

In one embodiment, if a given mobile client/mobile application is not on or active, or if a given mobile device 250 is not connected to the wireless network, the connection trigger 377a can send a trigger (e.g., out of band) trigger to the mobile device or the local proxy on the mobile device to request that the radio be powered and/or to activate one or more relevant applications. For example, the batching module 377 may have batched various content or data to be sent for multiple applications on a given mobile device and if the mobile clients/applications are not on or active, the connection trigger 377a can send a trigger requesting the application to activate. Alternatively, the notification engine 379 can send the mobile device 250 an indication that there is data ready to be sent, requesting the mobile device 250 to power on the radio if currently in off-mode.

Note that the proxy server 325 monitors multiple mobile devices and tracks application characteristics and user behavior/characteristics across multiple devices, users, and networks. Thus, the above described features pertaining to adjusted poll interval trackers, although drawn to an example directed to multiple applications on a given device, note that the same is tracked for multiple devices, having installed thereon its own other set of applications, for which adjusted poll intervals or polling schedules are computed based on applications on each mobile device by, for example the local proxy residing there on (e.g., the components illustrated in FIG. 2E of a local proxy 275 which may be installed on one or more of the multiple mobile devices serviced by the proxy server 325).

Note that since the proxy server 325 manages the traffic to/from multiple mobile devices, in one network, across networks, in one geographical locale, across multiple geographical locales, for one network operator, or across multiple network operators, the proxy server 325 can align traffic and batch transfer of data based on overview or aggregate data of traffic conditions or network conditions. The proxy server 325 can prioritize data transfer to mobile devices, for example, when network congestion is detected. For example, the proxy server 325 can transfer data to mobile devices where the type or level of subscription of the device user, tiered or staggered based on highest priority of content to be transferred to be the mobile devices (e.g., a batch of data may be transferred first to mobile device A, compared to mobile device B, when the highest priority data for device A is of higher priority than device B).

Note that there may be one proxy server 325 for a geographical locale, or for a specific network operator, for a type of web service, or any combination of the above, for example. Based on the different servicing entities, the proxy server 325 can aggregate different types of information pertaining to network traffic, operator settings, application preferences/requirements, user preferences, subscription-related parameters, various combination of the above can be used by the proxy 325 in optimizing connections need to be established by receiving mobile devices. Multiple proxy servers 325 servicing different networks in a geographical locale, different operators can share traffic, subscription, user, or application level information there between, to further facilitate network resource utilization, traffic management, and in some instances to facilitate alignment of data transfer to mobile devices.

Figure 4:
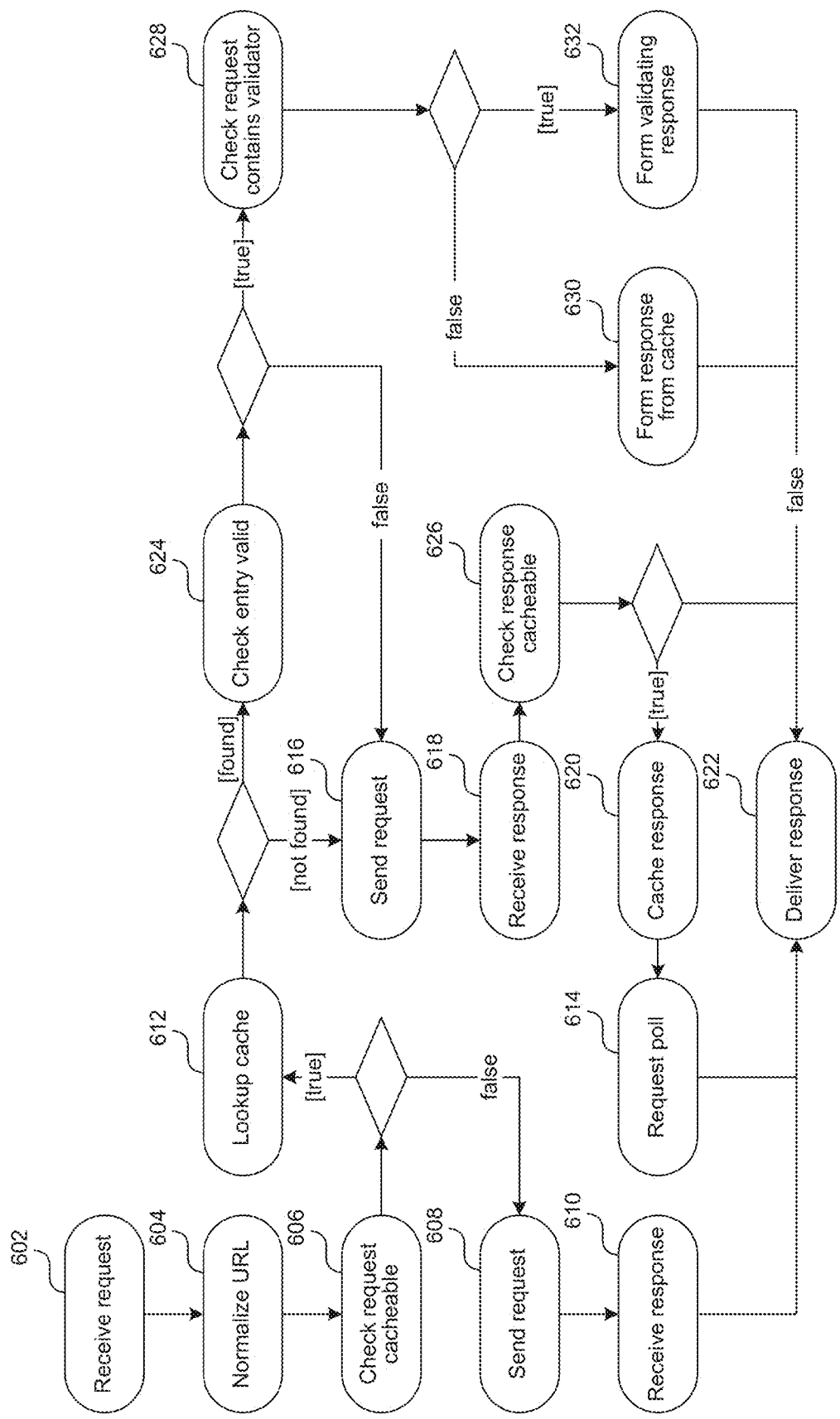
FIG. 4 depicts a flow diagram illustrating an example process for distributed content caching between a mobile device (e.g., any wireless device) and remote proxy and the distributed management of content caching.

FIG. 4 depicts another flow diagram illustrating an example process for distributed content caching between a mobile device and a proxy server and the distributed management of content caching. As shown herein, the disclosed technology is a distributed caching model with various aspects of caching tasks split between the client-side/mobile device side (e.g., local proxy 275 in the example of FIG. 2) and the server side (e.g., proxy server 325 of FIG. 3).

In general the device-side responsibilities can include deciding whether a response to a particular request can be and/or should be cached. The device-side of the proxy can make this decision based on information (e.g., timing characteristics, detected pattern, detected pattern with heuristics, indication of predictability or repeatability) collected from/during both request and response and cache it (e.g., storing it in a local cache on the mobile device). The device side can also notify the server-side in the distributed cache system of the local cache event and notify it monitor the content source (e.g., application server/content provider 110 of FIG. 1B-C).

The device side can further instruct the server side of the distributed proxy to periodically validate the cache response (e.g., by way of polling, or sending polling requests to the content source). The device side can further decide whether a response to a particular cache request should be returned from the local cache (e.g., whether a cache hit is detected). The decision can be made by the device side (e.g., the local proxy on the device) using information collected from/during request and/or responses received from the content source.

In general, the server-side responsibilities can include validating cached responses for relevancy (e.g., determine whether a cached response is still valid or relevant to its associated request). The server-side can send the mobile device an invalidation request to notify the device side when a cached response is detected to be no longer valid or no longer relevant (e.g., the server invalidates a given content source). The device side then can remove the response from the local cache.

The diagram of FIG. 4 illustrates caching logic processes performed for each detected or intercepted request (e.g., HTTP request) detected at a mobile device (e.g., client-side of the distributed proxy). In step 602, the client-side of the proxy (e.g., local proxy 275) receives a request (from an application (e.g., mobile application) or mobile client). In step 604, URL is normalized and in step 606 the client-side checks to determine if the request is cacheable. If the request is determined to be not cacheable in step 612, the request is sent to the source (application server/content provider) in step 608 and the response is received 610 and delivered to the requesting application 622, similar to a request-response sequence without interception by the client side proxy.

If the request is determined to be cacheable, in step 612, the client-side looks up the cache to determine whether a cache entry exists for the current request. If so, in step 624, the client-side can determine whether the entry is valid and if so, the client side can check the request to see if includes a validator (e.g., a modified header or an entity tag) in step 615. For example, the concept of validation is eluded to in section 13.3 of RFC 2616 which describes in possible types of headers (e.g., eTAG, Modified_Since, must_revlaidate, pragma no_cache) and forms a validating response 632 if so to be delivered to the requesting application in step 622. If the request does not include a validator as determined by step 615, a response is formed from the local cache in step 630 and delivered to the requesting application in step 622. This validation step can be used for content that would otherwise normally be considered un-cacheable.

If, instead, in step 624, the cache entry is found but determined to be no longer valid or invalid, the client side of the proxy sends the request 616 to the content source (application server/content host) and receives a response directly from the source in step 618. Similarly, if in step 612, a cache entry was not found during the look up, the request is also sent in step 616. Once the response is received, the client side checks the response to determine if it is cacheable in step 626. If so, the response is cached in step 620. The client then sends another poll in step 614 and then delivers the response to the requesting application in step 622.

Figure 5:
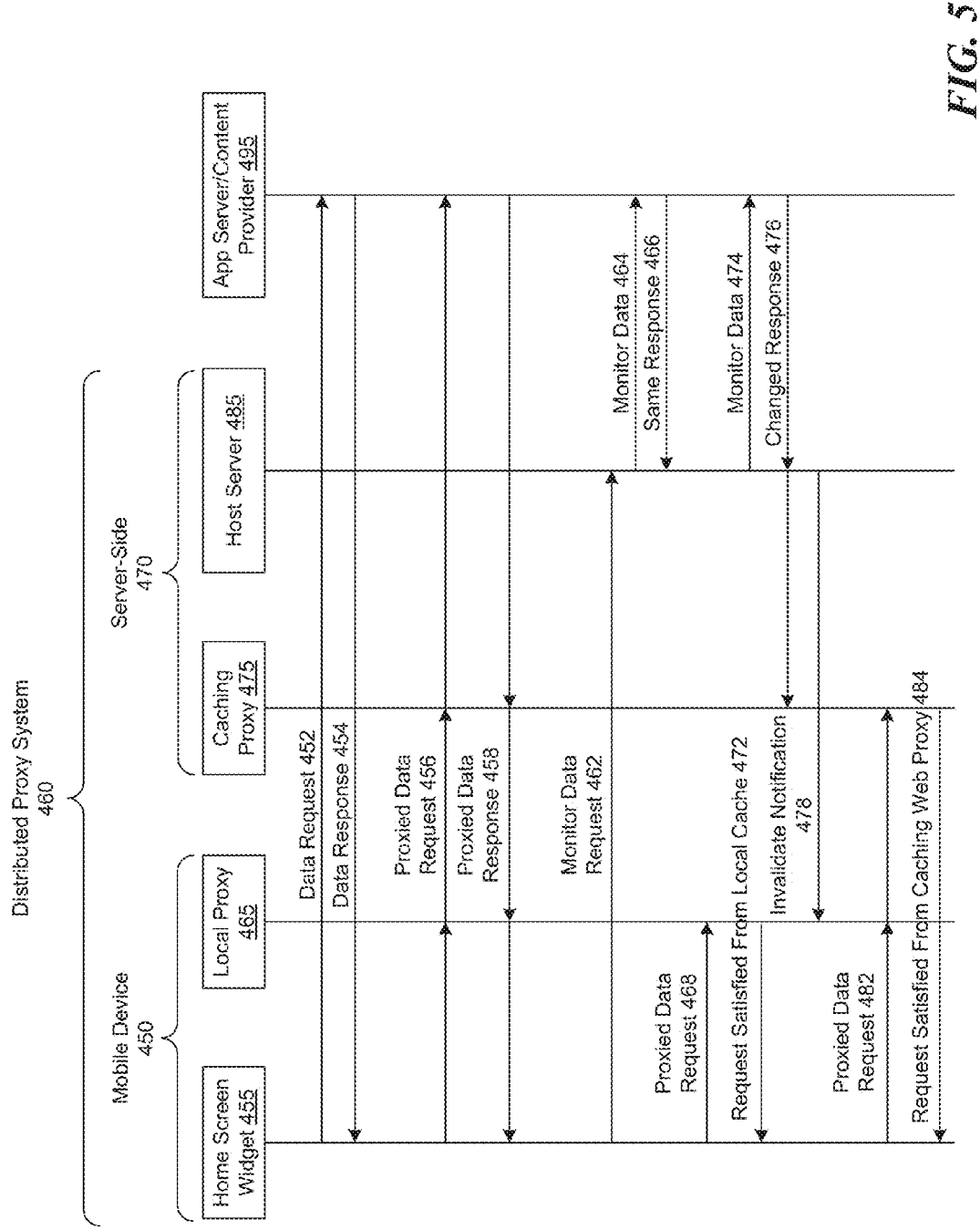
FIG. 5 depicts a timing diagram showing how data requests from a mobile device (e.g., any wireless device) to an application server/content provider in a wireless network (or broadband network) can be coordinated by a distributed proxy system in a manner such that network and battery resources are conserved through using content caching and monitoring performed by the distributed proxy system.

FIG. 5 depicts a sequence diagram showing how data requests from a mobile device 450 to an application server/content provider 495 in a wireless network can be coordinated by a distributed proxy system 460 in a manner such that network and battery resources are conserved through using content caching and monitoring performed by the distributed proxy system 460.

In satisfying application or client requests on a mobile device 450 without the distributed proxy system 460, the mobile device 450, or the software widget executing on the device 450, performs a data request 452 (e.g., an HTTP GET, POST, or other request) directly to the application server 495 and receives a response 404 directly from the server/provider 495. If the data has been updated, the widget 455 on the mobile device 450 can refreshes itself to reflect the update and waits for small period of time and initiates another data request to the server/provider 495.

In one embodiment, the requesting client or software widget 455 on the device 450 can utilize the distributed proxy system 460 in handling the data request made to server/provider 495. In general, the distributed proxy system 460 can include a local proxy 465 (which is typically considered a client-side component of the system 460 and can reside on the mobile device 450), a caching proxy 475 (considered a server-side component 470 of the system 460 and can reside on the host server 485 or be wholly or partially external to the host server 485), and a host server 485. The local proxy 465 can be connected to the caching proxy 475 and host server 485 via any network or combination of networks.

When the distributed proxy system 460 is used for data/application requests, the widget 455 can perform the data request 456 via the local proxy 465. The local proxy 465, can intercept the requests made by device applications, and can identify the connection type of the request (e.g., an HTTP get request or other types of requests). The local proxy 465 can then query the local cache for any previous information about the request (e.g., to determine whether a locally stored response is available and/or still valid). If a locally stored response is not available or if there is an invalid response stored, the local proxy 465 can update or store information about the request, the time it was made, and any additional data, in the local cache. The information can be updated for use in potentially satisfying subsequent requests.

The local proxy 465 can then send the request to the host server 485 and the host server 485 can perform the request 456 and returns the results in response 458. The local proxy 465 can store the result and, in addition, information about the result and returns the result to the requesting widget 455.

In one embodiment, if the same request has occurred multiple times (within a certain time period) and it has often yielded same results, the local proxy 465 can notify 460 the server 485 that the request should be monitored (e.g., steps 462 and 464) for result changes prior to returning a result to the local proxy 465 or requesting widget 455.

In one embodiment, if a request is marked for monitoring, the local proxy 465 can now store the results into the local cache. Now, when the data request 466, for which a locally response is available, is made by the widget 455 and intercepted at the local proxy 465, the local proxy 465 can return the response 468 from the local cache without needing to establish a connection communication over the wireless network.

In addition, the server proxy performs the requests marked for monitoring 470 to determine whether the response 472 for the given request has changed. In general, the host server 485 can perform this monitoring independently of the widget 455 or local proxy 465 operations. Whenever an unexpected response 472 is received for a request, the server 485 can notify the local proxy 465 that the response has changed (e.g., the invalidate notification in step 474) and that the locally stored response on the client should be erased or replaced with a new response.

In this case, a subsequent data request 476 by the widget 455 from the device 450 results in the data being returned from host server 485 (e.g., via the caching proxy 475), and in step 478, the request is satisfied from the caching proxy 475. Thus, through utilizing the distributed proxy system 460, the wireless (cellular) network is intelligently used when the content/data for the widget or software application 455 on the mobile device 450 has actually changed. As such, the traffic needed to check for the changes to application data is not performed over the wireless (cellular) network. This reduces the amount of generated network traffic and shortens the total time and the number of times the radio module is powered up on the mobile device 450, thus reducing battery consumption and, in addition, frees up network bandwidth.

FIG. 6 depicts a table 700 showing examples of different traffic or application category types which can be used in implementing network access and content delivery policies. For example, traffic/application categories can include interactive or background, whether a user is waiting for the response, foreground/background application, and whether the backlight is on or off.

FIG. 7 depicts a table 800 showing examples of different content category types which can be used in implementing network access and content delivery policies. For example, content category types can include content of high or low priority, and time critical or non-time critical content/data.

FIG. 8 depicts an interaction diagram showing how application (e.g., mobile application) 955 polls having data requests from a mobile device to an application server/content provider 995 over a wireless network can be can be cached on the local proxy 965 and managed by the distributed caching system (including local proxy 965 and the host server 985 (having server cache 935 or caching proxy server 975)).

In one example, when the mobile application/widget 955 polls an application server/provider 932, the poll can locally be intercepted 934 on the mobile device by local proxy 965. The local proxy 965 can detect that the cached content is available for the polled content in the request and can thus retrieve a response from the local cache to satisfy the intercepted poll 936 without requiring use of wireless network bandwidth or other wireless network resources. The mobile application/widget 955 can subsequently receive a response to the poll from a cache entry 938.

In another example, the mobile application widget 955 polls the application server/provider 940. The poll is intercepted 942 by the local proxy 965 and detects that cache content is unavailable in the local cache and decides to set up the polled source for caching 944. To satisfy the request, the poll is forwarded to the content source 946. The application server/provider 995 receives the poll request from the application and provides a response to satisfy the current request 948. In 950, the application (e.g., mobile application)/widget 955 receives the response from the application server/provider to satisfy the request.

In conjunction, in order to set up content caching, the local proxy 965 tracks the polling frequency of the application and can set up a polling schedule to be sent to the host server 952. The local proxy sends the cache set up to the host server 954. The host server 985 can use the cache set up which includes, for example, an identification of the application server/provider to be polled and optionally a polling schedule 956. The host server 985 can now poll the application server/provider 995 to monitor responses to the request 958 on behalf of the mobile device. The application server receives the poll from the host server and responds 960. The host server 985 determines that the same response has been received and polls the application server 995 according to the specified polling schedule 962. The application server/content provider 995 receives the poll and responds accordingly 964.

The host server 985 detects changed or new responses and notifies the local proxy 965. The host server 985 can additional store the changed or new response in the server cache or caching proxy 968. The local proxy 965 receives notification from the host server 985 that new or changed data is now available and can invalidate the affected cache entries 970. The next time the application (e.g., mobile application)/widget 955 generates the same request for the same server/content provider 972, the local proxy determines that no valid cache entry is available and instead retrieves a response from the server cache 974, for example, through an HTTP connection. The host server 985 receives the request for the new response and sends the response back 976 to the local proxy 965. The request is thus satisfied from the server cache or caching proxy 978 without the need for the mobile device to utilize its radio or to consume mobile network bandwidth thus conserving network resources.

Alternatively, when the application (e.g., mobile application) generates the same request in step 980, the local proxy 965, in response to determining that no valid cache entry is available, forwards the poll to the application server/provider in step 982 over the mobile network. The application server/provider 995 receives the poll and sends the response back to the mobile device in step 984 over the mobile network. The request is thus satisfied from the server/provider using the mobile network in step 986.

Example Signaling or Connection Modeling

Figure 9:
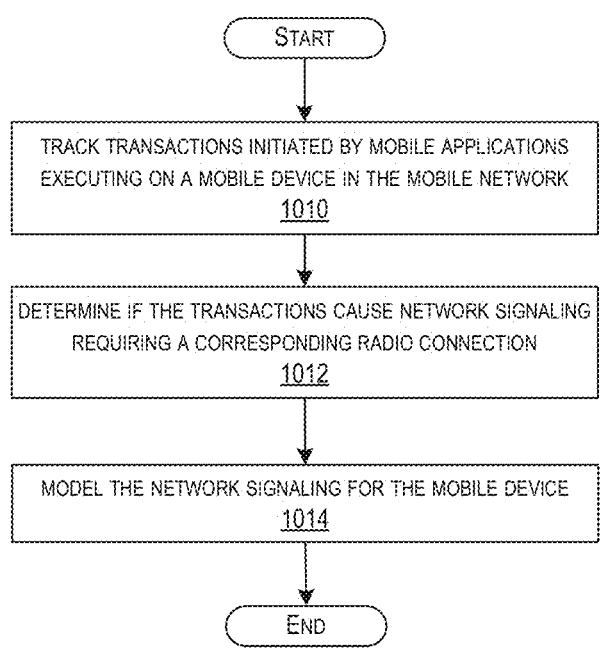
FIG. 9 depicts a flow diagram illustrating an example process for modeling signaling of a mobile device (e.g., any wireless device) in a mobile network.

FIG. 9 depicts a flow diagram illustrating an example process for modeling signaling of a mobile device (e.g., any wireless device) in a mobile network. The operations or steps illustrated with respect to FIG. 9 are discussed with performance by a mobile device. However, the operations or steps may be performed in various embodiments by any of the one or more components of the Open Channel architecture discussed herein. For example, the operations or steps may be performed by an OC client proxy of a mobile device (e.g., OC client proxy 175 of mobile device 150 of FIG. 1A-1), a mobile device (e.g., mobile device 150), an OC (host) server (e.g., OC (host) server 100), one or more processors, and/or other components, modules, engines, or tools discussed herein. Additional or fewer data flow operations are possible.

To begin, at step 1010, the mobile device tracks transactions initiated by mobile applications executing on the mobile device in the mobile network. At step 1012, the mobile device determines if the transactions cause network signaling requiring a corresponding radio connection. At step 1014, the mobile device models the network signaling for the mobile device.

Figure 10:
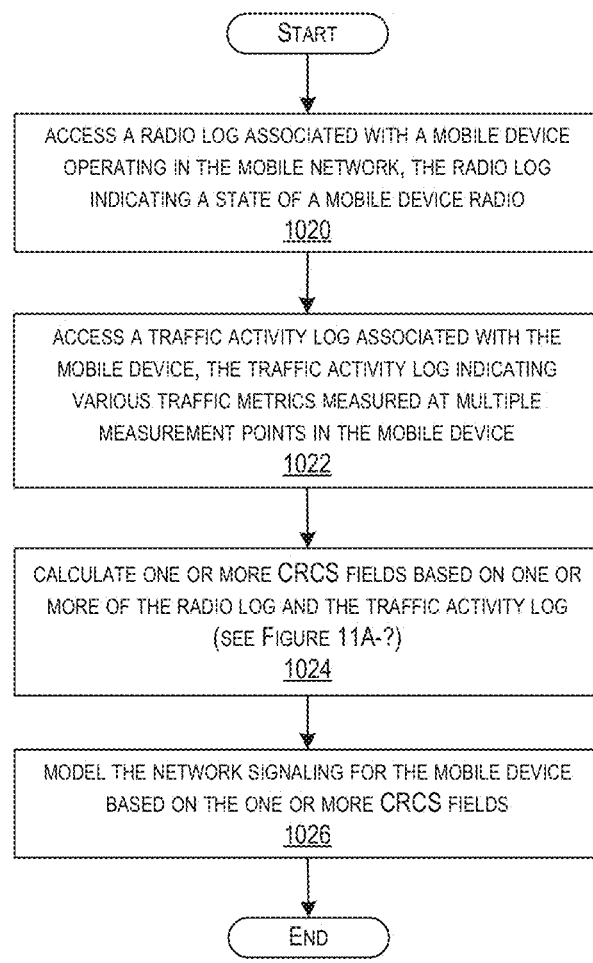
FIG. 10 depicts another flow diagram illustrating an example process for modeling signaling of a mobile device (e.g., any wireless device) in a mobile network.

FIG. 10 depicts a flow diagram illustrating an example process for modeling signaling of a mobile device (e.g., any wireless device) in a mobile network. The operations or steps illustrated with respect to FIG. 9 are discussed with performance by a mobile device. However, the operations or steps may be performed in various embodiments by one or more components of the Open Channel architecture discussed herein. For example, the operations or steps may be performed by an OC client proxy of a mobile device (e.g., OC client proxy 175 of mobile device 150 of FIG. 1A-1), a mobile device (e.g., mobile device 150), an OC (host) server (e.g., OC (host) server 100), one or more processors, and/or other components, modules, engines, or tools discussed herein. Additional or fewer data flow operations are possible.

To begin, at step 1020, the mobile device accesses a radio log associated with the mobile device. The radio log can indicate a state of a mobile device radio. At step 1022, the mobile device access a traffic activity log associated with the mobile device. The traffic activity log can indicate various traffic metrics measured at multiple measurement points in the mobile device. At step 1024, the mobile device calculates one or more fields based on one or more of the radio log and the traffic activity log. At step 1026, the mobile device models the network signaling for the mobile device based on the one or more fields.

Example General Connection and Time Calculations

FIG. 11A-FIG. 16D depict example field calculations for use in determining general connection and time calculations. As discussed herein, the various field calculations can be used to model the signaling in a mobile network. Importantly, the example field calculations discussed below include the following notations:

Short time stamp form (e.g., 07:26:00.000 is used instead of full form 2012-10-30 07:26:00.000);
Only required fields for calculations are shown in input logs;
An example default value for network delay is used (e.g., 15 000 milliseconds);
An example default value for request delay is used (e.g., 1 000 milliseconds);
An example default value for split ratio is used (e.g., 3000);
The terms "dormancy" and "network delay" are used synonymously.

The example connections and time calculations discussed herein are primarily based on two major data collections: radio up intervals and filtered netLogs (also referred to as traffic activity logs).

As discussed above, the expanded fields can be divided into multiple types. For example, the expanded fields can include a connection flag type and a time connected counts type (see, e.g., Appendix A and B). Additionally, the expanded fields can be divided into several categories as illustrated above in Table 1.

Figure 12A:
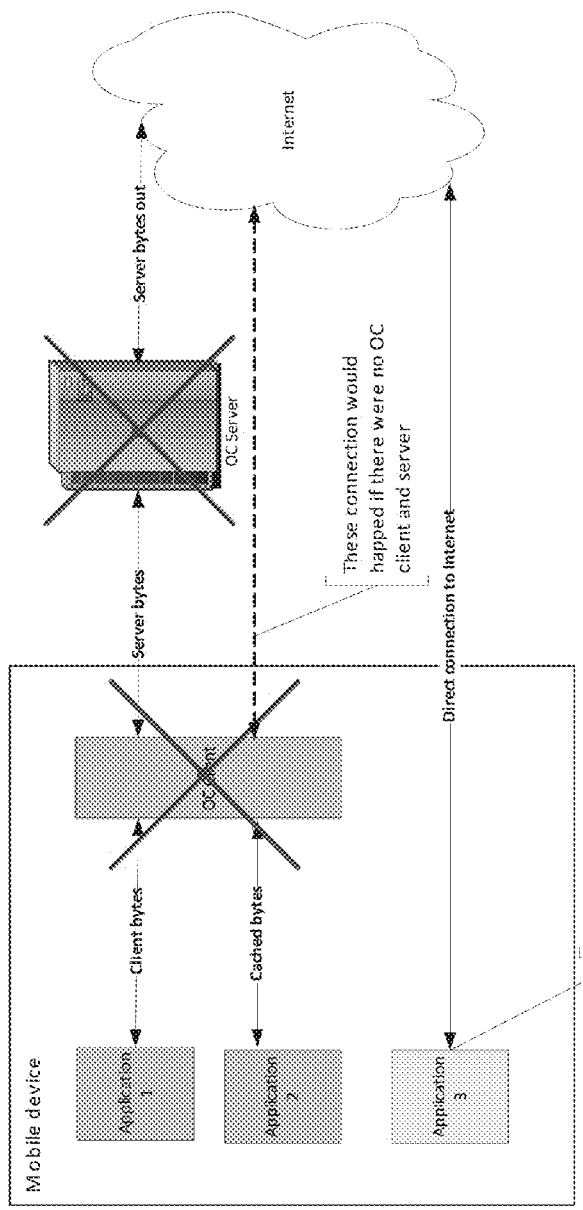
Figure 12B:
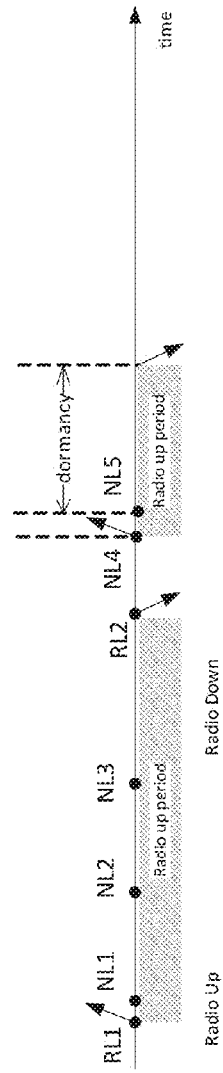
Figure 13A:
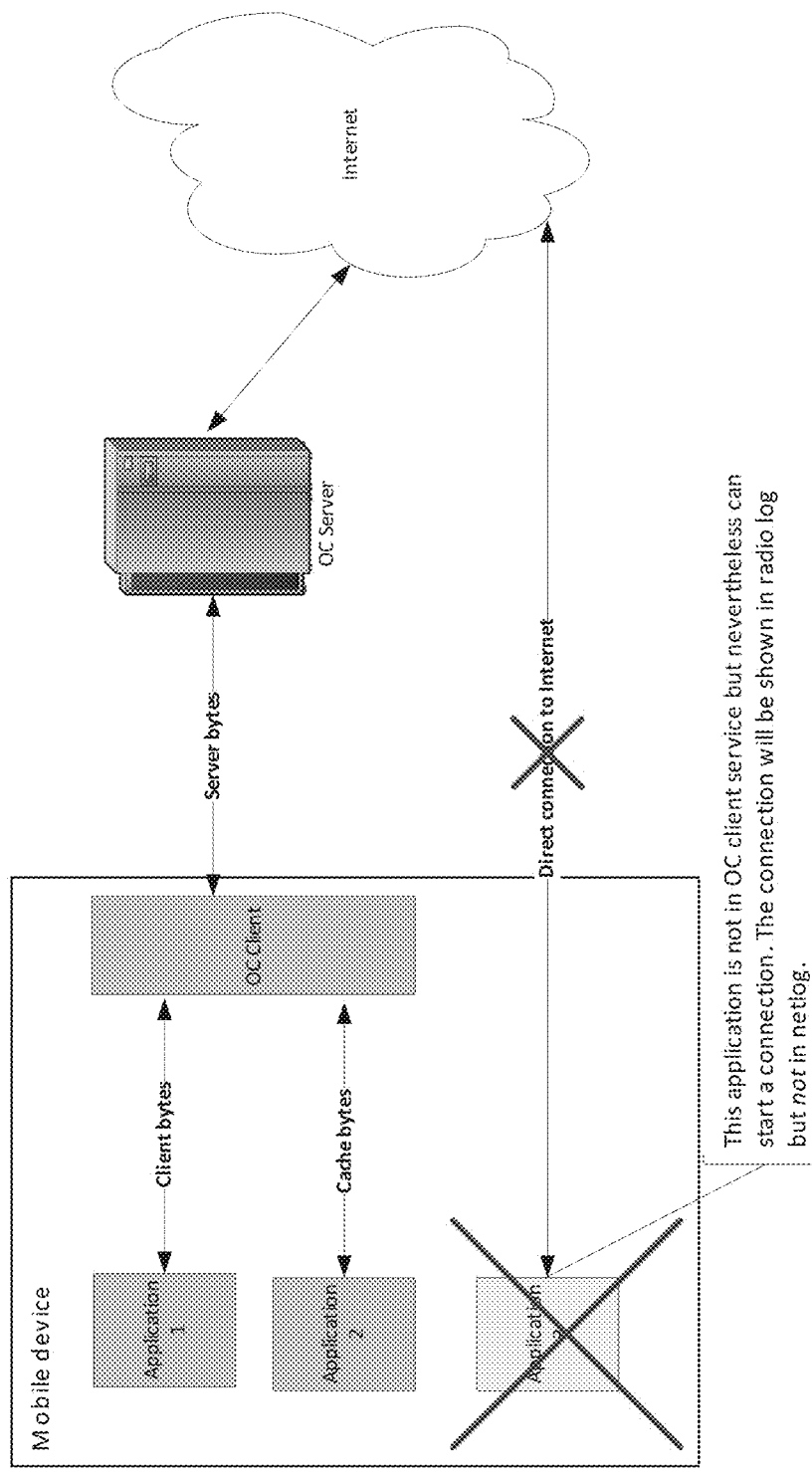
Figure 13B:
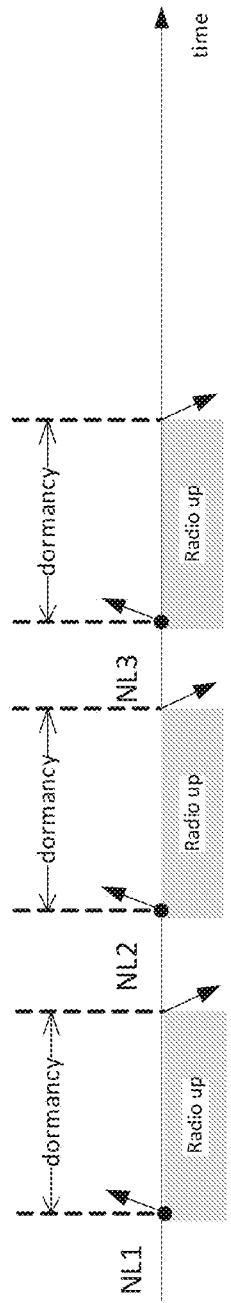
Figure 14A:
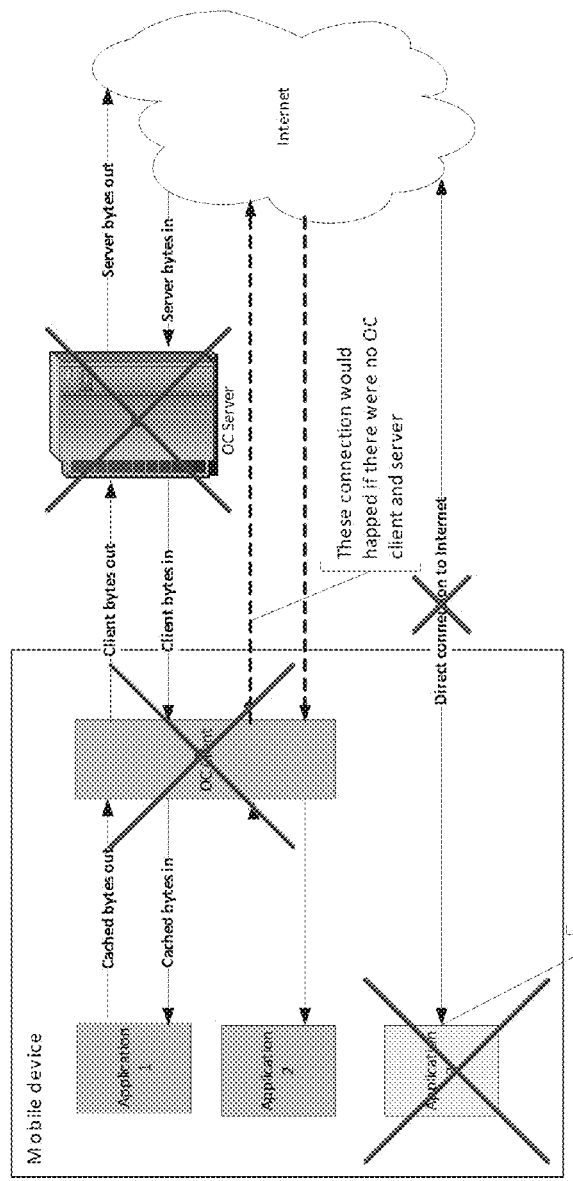
Figure 14B:
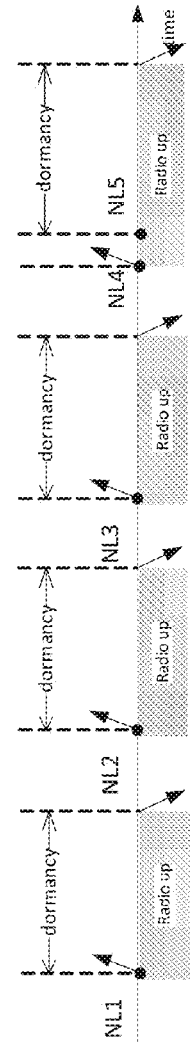

More specifically, FIGS. 11A and 11B illustrate calculation of example real (or actual) radio time intervals and corresponding fields, FIGS. 12A and 12B illustrate calculation of example virtual radio time intervals and corresponding fields. FIGS. 13A and 13B illustrate calculation of example simulated radio time intervals and corresponding fields. FIGS. 14A and 14B illustrate calculation of example simulated virtual radio time intervals and corresponding fields. FIGS. 15A-15D illustrate calculation of simulated per application radio up intervals. FIGS. 16A-16D illustrate calculation of virtual simulated per application radio up intervals and corresponding fields.

Example Real (or Actual) Fields Calculations

Referring first to FIGS. 11A and 11B which illustrate an example operation for calculation of a real (or actual) radio up interval and graphical illustration of an example real (or actual) radio time interval, respectively. The real (or actual) fields calculation includes calculation of an actual connection field and an actual time connected field.

The actual connection field indicates a real connection that occurs over the network. The radio log can indicate various states of a mobile device radio over a period of time and thus can be used to make the actual connection field calculation. That is, the state of the mobile device radio can be used to determine if the mobile device radio is/was up. For example, in some embodiments, if the current state of radio log indicates that the current state of the mobile device radio is set to a DATA_ACTIVITY_CONNECTED state or a WCDMA_DCH state then the mobile device radio is considered to be up (or active). Conversely, if the current state of the mobile device radio is set to a DATA_ACTIVITY_DORMANT state or an IDLE state then the mobile device radio is considered to be down (or inactive).

In one embodiment, an actual time field is calculated indicating a total time interval during which the radio channel was up for a mobile device. That is, the actual time field indicates the time during which the network channel was used to transfer data (e.g., to or from client). The actual time can be calculated as the sum of all time intervals between two nearest net log items when the net log items are in the radio up interval. Importantly, when calculating the actual time field, if a particular net log item is the first net log item in the log after a radio up log item, then its actual time of connection equals to the sum if two values:

time interval between this net log item and the nearest net log after it
  time interval between radio up and this net log item As discussed with reference to the example of FIG. 11B, the actual connection fields and the actual time fields can be calculated by first reading a radio access log and a traffic activity log (also referred to herein as a net log or network log) associated with a mobile device. Together the relevant portions of the radio access log and the traffic activity log can be referred to herein as an input log associated with a mobile device. In the example of FIG. 11A, table 3 below, indicates the relevant portions of the input net log and input radio log(collectively, input log).

TABLE 3

| | | Input Net log and Radio fields | | | | | | |
|---|---|---|---|---|---|---|---|---|
| RL1 | 07:26:00.000 | data_activity_connected | | data_activity_dormant | | | | Radio up ↑ |
| NL1 | 07:26:00.500 | 32 | 234 | 23 | 42 | 0 | 0 | mobile_gprs |
| NL2 | 07:26:20.000 | 43 | 23 | 342 | 424 | 0 | 0 | mobile_gprs |
| NL3 | 07:27:00.000 | 32 | 234 | 423 | 234 | 0 | 0 | mobile_gprs |
| RL2 | 07:30:00.000 | data_activity_dormant | | data_activity_connected | | | | Radio down ↓ |

As indicated above, the input net log and input radio log each include various net log items. The net log items are indicated by the connotation "NLx" while the radio log items are indicated using the "RLx" connotation.

The analysis core tool such as, for example, analysis core 255a of FIG. 2E or CRSC analysis core 375a of FIG. 3E process the input log(s) to, for example, calculate one or more additional fields based on the one or more input logs (e.g., radio log and the traffic activity log). This process can include utilizing one or more long poll techniques to split one net log item into two or more net log items. Use of the one of more long poll techniques is illustrated and discussed in greater detail with reference to FIGS. 19A and 19B. As shown in this example, the analysis core tool calculates an actual connection field (or flag) and actual time field for each net log item. An example output table 4 is illustrated below.

TABLE 4

| | Output Net log fields | | |
|---|---|---|---|
| | TimeStamp | Actual connection | Actual Time |
| NL1 | 07:26:00.500 | 1 | 20 000 |
| NL2 | 07:26:20.000 | 0 | 40 000 |
| NL3 | 07:27:00.000 | 0 | 180 000 |
| TOTAL | | 1 | 240 000 |

In this example, RL1 is radio up log because its "state" field is data_activity_connected and "prev_state" is data_activity_dormant. Similarly, RL2 is radio down log because its "state" field is data_activity_dormant and "prev_state" is data_activity_connected. Accordingly, the actual radio up interval is: 07:30:00.000–07:26:00.000=4 min=240 sec=240 000 ms.

With respect to the actual connection calculation, NL1 makes an actual connection because it is first net log after the radio up so this net log starts a new connection. NL2 and NL3 occurred when radio was already risen up, so they don't start a new connection. Therefore, actual connection NL1=1; actual connection NL2=0; and actual connection NL3=0. With respect to the actual time calculation:

actual time NL1=[RL1,NL1]+[NL1,NL2];

actual time NL2=[NL2,NL3]; and actual time NL3=[NL3,RL2].

where,

[RL1, NL1] is time interval between radio log item RL1 and net log item NL1;
  [NL1, NL2] is the same for net log item NL1 and net log item NL2;
  [NL2, NL3] is the same for NL2 and NL3;
  [NL3, RL2] is time interval between net log item NL3 and radio log item RL2;

Also,

[RL1,NL1]=07:26:00.500–07:26:00.000=0 500

[NL1,NL2]=07:26:20.000–07:26:00.500=19 500

[NL2,NL3]=07:27:00.000–07:26:20.000=20 000

[NL3,RL2]=07:30:00.000–07:27:00.000=180 000

Thus, actual time NL1=[07:26:00.500–07:26:00.000]+[07:26:20.000–07:26:00.500]=500+19 500=20 000;

actual time NL2=07:27:00.000–07:26:20.000=40 000;

actual time NL3=07:30:00.000–07:27:00.000=180 000;

Example Virtual Fields Calculations

Referring next to FIG. 12A and FIG. 12B which illustrate an example operation for calculation of a virtual radio up interval and graphical illustration of an example virtual radio up interval, respectively. More specifically, the virtual fields calculation includes calculation of a virtual connection field and a virtual time connected field.

As discussed above, a analysis core tool or module (not shown) can calculate expanded fields that are maintained and utilized by the analysis core tool to model signaling of a mobile device in a mobile network. More specifically, the analysis core tool can model the effects of the Open Channel architecture (e.g., the distributed caching techniques including the Signal Optimization and Extended Caching techniques discussed herein). For example, the analysis core tool or module such as, for example, analysis core 255*a* of FIG. 2E or CRSC analysis core 375*a* of FIG. 3E, can calculate the virtual radio up intervals. The calculation can include calculating one or more additional fields based on one or more input logs (e.g., radio log and a traffic activity log including cache hit information).

More specifically, as shown in the example of FIG. 12B, the analysis core tool or module utilizes the radio Logs and the cacheHit netLogs to calculate the virtual radio up intervals. The virtual fields illustrate which connections would happen 'but for' the Open Channel client on mobile device. FIG. 12A, illustrates an example architecture for calculation of virtual fields.

The virtual connection fields indicate a virtual connection that is made either through cache (no radio up) or through a real (actual) connection. That is, the virtual connections illustrate what connections would occur if no Open Channel client was operating on the mobile device. Similarly, the virtual time field indicates a time interval during which the radio channel would be up if no Open Channel client was installed on operating on the mobile device. Accordingly, the total virtual time is always equal to or greater than the actual time calculated with respect to the example of FIG. 11A and FIG. 11B.

With reference to the example of FIG. 12A and FIG. 12B, the table 5 below indicates the relevant portions of the example input net log and input radio log (collectively, input log).

TABLE 5

| | | | Input Net log fields | | | | | | |
|---|---|---|---|---|---|---|---|---|---|
| RL1 | 07:26:00.000 | data_activity_connected | | | | data_activity_dormant | | | Virtual Radio up ↑ |
| NL1 | 07:26:00.500 | 0 | 0 | 0 | 0 | 323 | 653 | mobile_gprs | |
| NL2 | 07:26:20.000 | 0 | 0 | 0 | 0 | 23 | 432 | mobile_gprs | |
| NL3 | 07:27:00.100 | 32 | 234 | 423 | 234 | 0 | 0 | mobile_gprs | |
| RL2 | 07:30:00.000 | data_activity_dormant | | | | data_activity_connected | | | Virtual Radio down ↓ |
| NL4 | 07:31:00.000 | 45 | 34 | 0 | 0 | 0 | 0 | mobile_gprs | Virtual radio up ↑ |
| NL5 | 07:31:01.500 | 45 | 234 | 0 | 0 | 0 | 0 | mobile_gprs | |
| DL | 07:31:16.500 | No this record in input. It is only for illustrating purpose here. | | | | | | | Virtual Radio down ↓ after dormancy (network) delay of 15 sec |

In some embodiments, the DL record is not a part of (an item in) the input log. As indicated above, the input net log and input radio log each include various net log items. As discussed herein, the net log items are indicated by the connotation "NLx" while the radio log items are indicated using the "RLx" connotation.

As shown in this example, the analysis core tool calculates an actual connection field (or flag) and actual time field for each net log item. An example output table 6 is illustrated below.

TABLE 6

| | Output Net log fields | | |
|---|---|---|---|
| | TimeStamp | Virtual connection | Virtual Time |
| NL1 | 07:26:00.500 | 1 | 20 000 |
| NL2 | 07:26:20.000 | 0 | 40 000 |
| NL3 | 07:27:00.000 | 0 | 180 000 |

TABLE 6-continued

| | Output Net log fields | | |
|---|---|---|---|
| | TimeStamp | Virtual connection | Virtual Time |
| NL4 | 07:31:00.000 | 1 | 1 500 |
| NL5 | 07:31:01.500 | 0 | 15 000 |
| TOTAL | | 2 | 256 500 |

In this example, RL1 is calculated to be the first virtual radio up log item or entry because real radio up actually occurs. RL2 is calculated to be the first radio down log because real radio down actually occurs. NL4 is calculated to be the second virtual radio up log because "CLIENT_BYTES_IN" or "CLIENT_BYTES_OUT" are greater than zero. That is, at NL4 data was transferred between OC client and the OC server. DL is calculated to be the second radio down log because exactly at DL, the network delay ends. Also, in this example, NL5 is not calculated to be a virtual radio up in the log because the time interval between NL4 and NL5 is less than dormancy.

With respect to the virtual connection field calculation, NL1 makes a virtual connection because it makes actual connection. NL4 makes a virtual connection because it makes virtual radio up. Therefore:

Virtual connection NL1=1
Virtual connection NL2=0
Virtual connection NL3=0
Virtual connection NL4=1
Virtual connection NL5=0

With respect to the virtual time field calculations:

Virtual time NL1=Actual time NL1
Virtual time NL2=Actual time NL2
Virtual time NL3=Actual time NL3
Virtual time NL4=[NL4, NL5]
Virtual time NL5=[NL5, DL]

where,

[NL4, NL5] is time interval between net log item NL4 and net log item NL5

[NL5, DL] is time interval between net log item NL5 and virtual radio down item DL and,

[NL4,NL5]=07:31:01.500−07:31:00.000=1 500

[NL1,NL2]=07:31:16.500−07:31:01.500=15 000

Here DL is time when network delay happens starting from virtual radio up. Thus, Virtual time NL1=20 000
Virtual time NL2=40 000
Virtual time NL3=180 000
Virtual time NL4=1 500
Virtual time NL5=15 000

Therefore,

Total Virtual Time=Total Actual Time+dormancy (network delay)

Total Virtual Time=240 000+16 500=256 500 no other application on phone instead of those which are under control of Open Channel client. Similarly, the simulated time fields indicate the time of connection that would happen through network if there were no other application on phone instead of those which are under control of Open Channel client.

With reference to the example of FIG. 13A and FIG. 13B, the table 7 below indicates the relevant portions of the input traffic activity log including network hits. In some embodiments, the real (actual) radio logs can be ignored when calculating the simulated radio up intervals. Accordingly, the real (actual) radio log items are not shown in the input table data below.

TABLE 7

| | | | | | | | | | |
|---|---|---|---|---|---|---|---|---|---|
| | | | | | Input Net log fields | | | | |
| NL1 | 07:26:00.500 | 32 | 234 | 23 | 42 | 0 | 0 | mobile_gprs | Simulated Radio up ↑ |
| DL1 | 07:26:15.500 | No this record in input. It is only for illustrating purpose here. | | | | | | | Simulated Radio down ↓ after dormancy (network) delay of 15 sec |
| NL2 | 07:26:20.000 | 43 | 23 | 342 | 424 | 0 | 0 | mobile_gprs | Simulated Radio up ↑ |
| DL2 | 07:26:35.000 | No this record in input. It is only for illustrating purpose here. | | | | | | | Simulated Radio down ↓ after dormancy (network) delay of 15 sec |
| NL3 | 07:27:00.000 | 32 | 234 | 423 | 234 | 0 | 0 | mobile_gprs | Simulated Radio up ↑ |
| DL3 | 07:27:15.000 | No this record in input. It is only for illustrating purpose here. | | | | | | | Simulated Radio down ↓ after dormancy (network) delay of 15 sec |

Virtual time NL1=20 000
Virtual time NL2=40 000
Virtual time NL3=180 000
Virtual time NL4=1 500
Virtual time NL5=15 000

Example Simulated Fields Calculations

Referring next to FIG. 13A and FIG. 13B which illustrate example operation for calculation of a simulated radio up interval and graphical illustration of an example simulated radio up interval, respectively. More specifically, the simulated fields calculations include calculations of simulated connection fields and a simulated time connected fields.

In one embodiment, a analysis core tool or module (not shown) can calculate expanded fields that are maintained and utilized by the analysis core tool to model signaling of a mobile device in a mobile network. More specifically, the analysis core tool can model the effects of the Open Channel architecture (e.g., the distributed caching techniques including the Signal Optimization and Extended Caching techniques discussed herein). For example, the analysis core tool or module such as, for example, analysis core 255a of FIG. 2E or CRSC analysis core 375a of FIG. 3E, can calculate simulated radio up intervals. The calculation can include calculating one or more additional fields based on one or more input logs (e.g., traffic activity log including network hit information).

More specifically, as shown the example of FIG. 13B, the analysis core tool or module utilizes the networkHit netLogs to calculate the simulated radio up intervals.

To calculate simulated fields one the system assumes that all applications in mobile device use Open Channel client and there is no application that can start connection without Open Channel. Radio log for that situation is called simulated radio log. The simulated connection field indicates a connection that would happen through network if there were In this example, the DL1, DL2, and DL3 records (or items) are not inputs. Rather, the records are illustrated for clarity of description purposes. As discussed herein, the net log items are indicated by the connotation "NLx."

The analysis core tool such as, for example, analysis core 255a of FIG. 2E or CRSC analysis core 375a of FIG. 3E processes the input log(s) to, for example, calculate one or more additional fields based on the one or more input logs (e.g., the traffic activity log). This process can include utilizing one or more long poll techniques to split one net log item into two or more net log items. This process is illustrated and discussed in greater detail with reference to FIG. 19A. As shown in this example, the analysis core tool calculates simulated connection fields (or flags) and simulated time fields. An example output table 8 illustrating output net log fields is illustrated below

TABLE 8

| | Output Net log fields | | |
|---|---|---|---|
| | TimeStamp | Simulated connection | Simulated Time |
| NL1 | 07:26:00.500 | 1 | 15 000 |
| NL2 | 07:26:20.000 | 1 | 15 000 |
| NL3 | 07:27:00.000 | 1 | 15 000 |
| TOTAL | | 3 | 45 000 |

In this example, NL1 is the first simulated radio up log because net log item starts here. DL1 is the first simulated radio down log because exactly at that time network delay ends. NL2 is the second simulated radio up log for the same reason as NL1. DL2 is the second simulated radio down for the same reason as RL1. NL3 is the third simulated radio up log for the same reason as NL1. DL3 is the third simulated radio down log for the same reason as RL1.

With respect to the simulated connection fields calculations, NL1, NL2, and NL3 make a simulated connection because each causes a simulated radio up even. Therefore, Simulated connection NL1=1;
Simulated connection NL2=1;
Simulated connection NL3=1.

With respect to the simulated time fields calculations, if the time interval between two adjacent net log items is greater than dormancy, then the first net log item will have simulated time equal to dormancy. Otherwise, the time interval between the two adjacent net log items will be the actual time between the net log items. An example is illustrated in FIG. 13C.

Figure 13C:
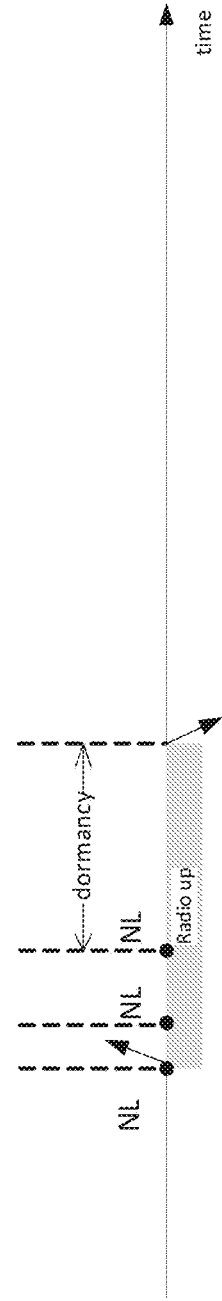

Therefore, in the example of FIG. 13A-13C
Simulated time NL1=dormancy (network delay)=15 000
Simulated time NL2=dormancy (network delay)=15 000
Simulated time NL3=dormancy (network delay)=15 000
Example Virtual Simulated Fields Calculations FIGS. 14A and 14B illustrate an example architecture for calculation of a virtual simulated radio up interval and illustration of an example virtual simulated radio time interval, respectively. More specifically, the virtual simulated fields calculation described below includes calculation of a virtual simulated field and a virtual simulated time connected field.

More specifically, as shown in the example of FIG. 14B, the analysis core tool or module utilizes a networkHit and a cacheHit netLogs to calculate the simulated virtual radio up intervals. As discussed herein, the radio up (or active) intervals The simulated virtual fields indicate the connections that happen in a simulated environment in which all applications on the mobile device that normally use the Open Channel client are simulated but there is no Open Channel on the mobile device.

The simulated virtual connection fields indicate the connection(s) that would occur through the network in a simulated environment in which all applications on the mobile device that normally use the Open Channel client are simulated but there is no Open Channel on the mobile device. Similarly, the simulated virtual time fields indicate the time connected from the connections that would occur through network in a simulated environment in which all applications on the mobile device that normally use the Open Channel client are simulated but there is no Open Channel on the mobile device.

With reference to the example of FIG. 14A and FIG. 14B, the table 9 below indicates the relevant portions of the input log including network hits. In a simulated environment in which all applications on the mobile device that normally use the Open Channel client are simulated but there is no Open Channel on the mobile device.

TABLE 9

| | | | | Input Net log fields | | | | | |
|---|---|---|---|---|---|---|---|---|---|
| NL1 | 07:26:00.500 | 32 | 234 | 23 | 42 | 0 | 0 | mobile_gprs | Simulated Radio up ↑ |
| DL1 | 07:26:16.000 | No this record in input. It is only for illustrating purpose here. | | | | | | | Simulated Radio down ↓ after dormancy (network) delay of 15 sec |
| NL2 | 07:26:20.000 | 43 | 23 | 342 | 424 | 0 | 0 | mobile_gprs | Simulated Radio up ↑ |
| DL2 | 07:26:35.000 | No this record in input. It is only for illustrating purpose here. | | | | | | | Simulated Radio down ↓ after dormancy (network) delay of 15 sec |
| NL3 | 07:27:00.000 | 32 | 234 | 423 | 234 | 0 | 0 | mobile_gprs | Simulated Radio up ↑ |
| DL3 | 07:27:15.000 | No this record in input. It is only for illustrating purpose here. | | | | | | | Simulated Radio down ↓ after dormancy (network) delay of 15 sec |
| NL4 | 07:31:00.000 | 45 | 34 | 0 | 0 | 0 | 0 | mobile_gprs | Simulated Virtual radio up ↑ |
| NL5 | 07:31:01.500 | 45 | 234 | 0 | 0 | 0 | 0 | mobile_gprs | |
| DL4 | 07:32:16.500 | No this record in input. It is only for illustrating purpose here. | | | | | | | Simulated Virtual Radio down ↓ after dormancy (network) delay of 15 sec |

In one embodiment, a analysis core tool or module (not shown) can calculate expanded fields that are maintained and utilized by the analysis core tool to model signaling of a mobile device in a mobile network. More specifically, the analysis core tool can model the effects of the Open Channel architecture (e.g., the distributed caching techniques including the Signal Optimization and Extended Caching techniques discussed herein). For example, the analysis core tool or module such as, for example, analysis core 255a of FIG. 2E or CRSC analysis core 375a of FIG. 3E, can calculate simulated virtual radio up intervals. The calculation can include calculating one or more additional fields based on one or more input logs (e.g., radio log and a traffic activity log including network hit and cache hit information).

In this example, the DL1, DL2, and DL3 records (or items) are not inputs. Rather, these records are illustrated for clarity of description purposes. As discussed herein, the net log items are indicated by the connotation "NLx."

The analysis core tool such as, for example, analysis core 255a of FIG. 2E or analysis core 375a of FIG. 3E processes the input log(s) to, for example, calculate one or more additional fields based on the one or more input logs (e.g., the traffic activity log). This process can include utilizing one or more long poll techniques to split one net log item into two or more net log items. This process is illustrated and discussed in greater detail with reference to FIG. 19A. As shown in this example, the analysis core tool calculates simulated connection fields (or flags) and simulated time fields. An example output table 10 illustrating output net log fields is illustrated below.

TABLE 10

Output Net log fields

|     | TimeStamp    | Simulated virtual connection | Simulated virtual Time |
| --- | ------------ | ---------------------------- | ---------------------- |
| NL1 | 07:26:00.500 | 1 | 15 000 |
| NL2 | 07:26:20.000 | 1 | 15 000 |
| NL3 | 07:27:00.000 | 1 | 15 000 |
| NL4 | 07:31:00.000 | 1 | 1 500  |
| NL5 | 07:31:01.500 | 0 | 15 000 |
| TOTAL |            | 4 | 61 500 |

In this example, NL4 is the fourth simulated virtual radio up log because "CLIENT_BYTES_IN" or "CLIENT_BYTES_OUT" are greater than zero indicating that data was transferred between OC client and OC server. Note that NL5 is not a simulated virtual radio up log item because time interval between NL4 and NL5 is less than dormancy.

Example Simulated Per Application Fields Calculations

Figures 15A, 15B:
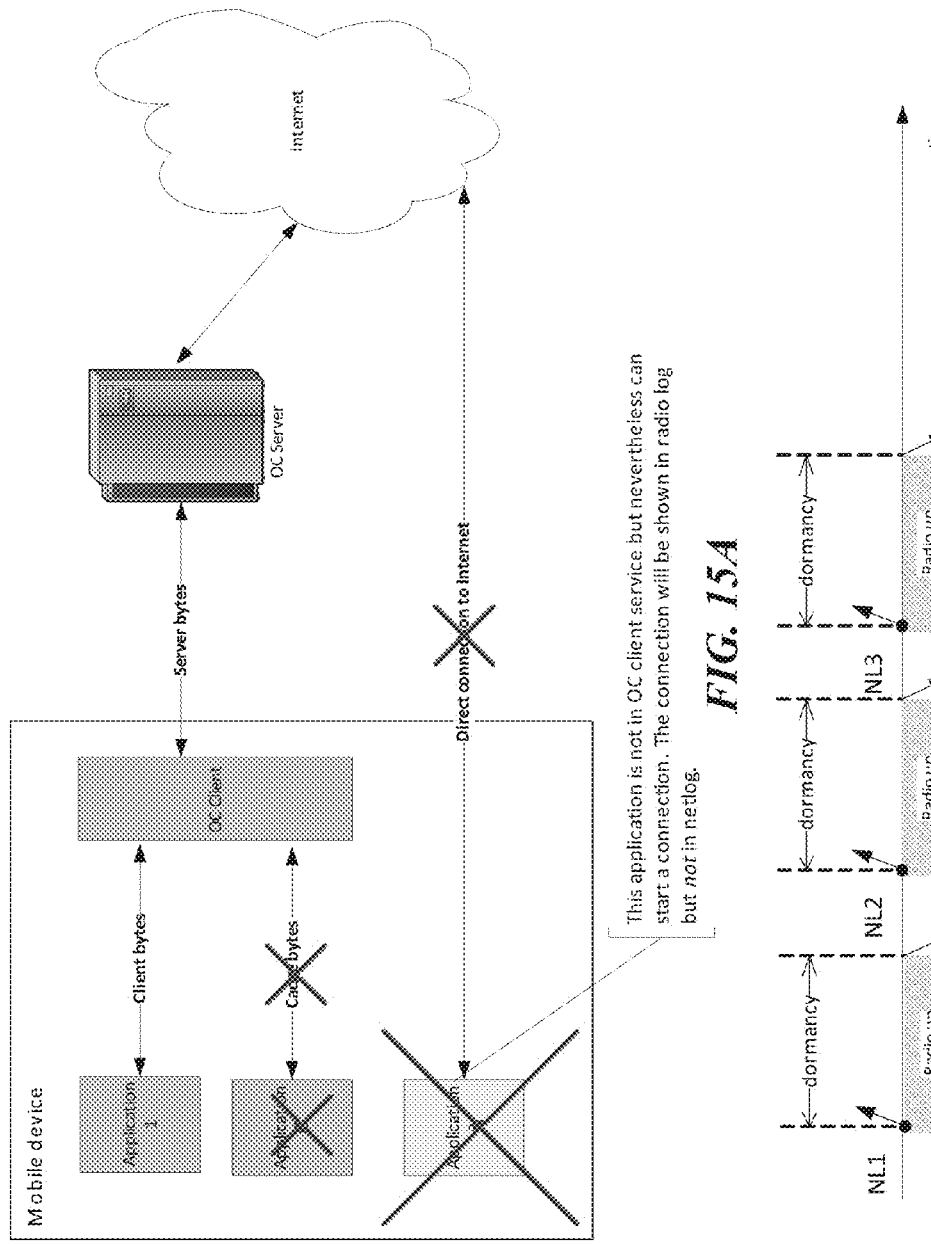

FIGS. 15A and 15B illustrate an example architecture for calculation of simulated radio up intervals and illustration of an example simulated radio time intervals, respectively. More specifically, the simulated fields calculation described below includes calculation of a virtual simulated field and a virtual simulated time connected field on a per application basis.

In one embodiment, a analysis core tool or module (not shown) can calculate expanded fields that are maintained and utilized by the analysis core tool to model signaling of a mobile device in a mobile network. More specifically, the analysis core tool can model the effects of the Open Channel architecture (e.g., the distributed caching techniques including the Signal Optimization and Extended Caching techniques discussed herein). For example, the analysis core tool or module such as, for example, analysis core 255a of FIG. 2E or CRSC analysis core 375a of FIG. 3E, can calculate simulated radio up intervals on a per application basis. The calculation can include calculating one or more additional fields based on one or more input logs (e.g., traffic activity log including network hit information).

More specifically, as shown in the example of FIG. 15B, the analysis core tool or module utilizes the netLogs of certain applications to calculate simulated per application radio up intervals. In the example of FIG. 15B, netlog NL1 is associated with a first application #1 and netlogs NL2 and NL3 are associated with a second application #2.

Figure 15C:
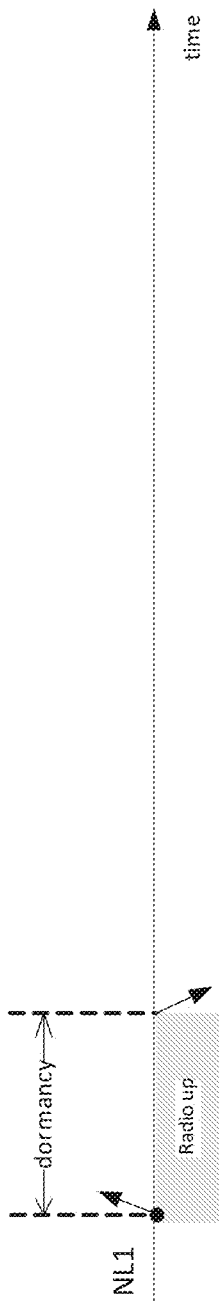
Figure 15D:
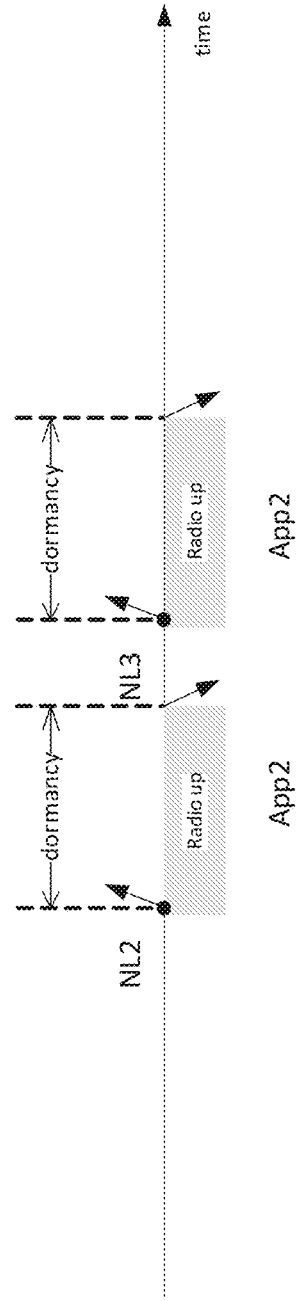

In the example of FIG. 15C, the simulated radio up interval per the first application #1 is illustrated. Similarly, the example of FIG. 15D illustrates the simulated radio up intervals per the second application #2.

The simulated per application fields indicate connections that happen in a simulated environment in which all applications on the mobile device that normally use the Open Channel client are simulated but there is no Open Channel on the mobile device. To calculate simulated per application fields the system contemplates only one application (e.g., Application #1) on the mobile device. The one application (e.g., Application #1) utilizes the Open Channel client and there is no application that can start connection without Open Channel. The radio log for this situation is called simulated per application radio log.

The simulated per application connection is a connection that would happen through the network if there were one application installed on a mobile device (under the control of Open Channel client) and no other applications on phone. Similarly, the simulated per application time is time of connection that would happen through network if there were one application installed on the mobile device (under control of Open Channel client) and no other applications on phone.

With reference to the example of FIG. 15A and FIG. 15B, the table 11 below indicates the relevant portions of the input log including network hits. While calculating simulated radio up intervals we ignore real (actual) radio logs, that is why they are not shown in input data. See example in table 11.

TABLE 11

Input Net log fields

| | | | | | | | | | | |
|---|---|---|---|---|---|---|---|---|---|---|
| NL1 | 07:26:00.500 | 32 | 234 | 23 | 42 | 0 | 0 | mobile_gprs | App1 | Simulated Radio up ↑ |
| DL1 | 07:26:15.500 | No this record in input. It is only for illustrating purpose here. | | | | | | | | Simulated Radio down ↓ after dormancy (network) delay of 15 sec |
| NL2 | 07:26:20.000 | 43 | 23 | 342 | 424 | 0 | 0 | mobile_gprs | App2 | Simulated Radio up ↑ |
| DL2 | 07:26:35.000 | No this record in input. It is only for illustrating purpose here. | | | | | | | | Simulated Radio down ↓ after dormancy (network) delay of 15 sec |
| NL3 | 07:27:00.000 | 32 | 234 | 423 | 234 | 0 | 0 | mobile_gprs | App2 | Simulated Radio up ↑ |
| DL3 | 07:27:15.000 | No this record in input. It is only for illustrating purpose here. | | | | | | | | Simulated Radio down ↓ after dormancy (network) delay of 15 sec |

In this example, the DL1, DL2, and DL3 records (or items) are not inputs. Rather, these records are illustrated for clarity of description purposes. As discussed herein, the net log items are indicated by the connotation "NLx."

The analysis core tool such as, for example, analysis core 255a of FIG. 2E or analysis core 375a of FIG. 3E processes the input log(s) to, for example, calculate one or more additional fields based on the one or more input logs (e.g., the traffic activity log). This process can include utilizing one or more long poll techniques to split one net log item into two or more net log items. This process is illustrated and discussed in greater detail with reference to FIG. 19A. As shown in this example, the analysis core tool calculates simulated per application connection fields (or flags) and simulated per application time fields. An example output table 12 illustrating output net log fields is illustrated below.

TABLE 12

Output Net log fields

|  | TimeStamp | Simulated per App connection | Simulated per App Time |
|---|---|---|---|
| NL1 | 07:26:00.500 | 1 | 15 000 |
| NL2 | 07:26:20.000 | 1 | 15 000 |
| NL3 | 07:27:00.000 | 1 | 15 000 |
| TOTAL |  | 3 | 45 000 |

In this example, NL1 is the first simulated radio up log because net log item starts here. DL1 is the first simulated radio down log because exactly at that time network delay ends. NL2 is the second simulated radio up log for the same reason as NL1. DL2 is the second simulated radio down for the same reason as RL1. NL3 is the third simulated radio up log for the same reason as NL1. DL3 is the third simulated radio down log for the same reason as RL1.

With respect to the simulated per application connection fields, NL1, NL2, and NL3 make a simulated connection because each causes a simulated radio up event. Therefore, Simulated connection NL1=1
Simulated connection NL2=1
Simulated connection NL3=1 and,

Simulated time NL1=dormancy (network delay)=15 000
Simulated time NL2=dormancy (network delay)=15 000
Simulated time NL3=dormancy (network delay)=15 000

Example Virtual Simulated Per Application Fields Calculations

FIGS. 16A and 16B illustrate an example architecture for calculation of a virtual simulated per application radio up interval and illustration of an example virtual simulated per application radio time interval, respectively. More specifically, the virtual simulated per application fields calculations described below include calculation of a virtual simulated per application field and a virtual simulated time connected per application field.

In one embodiment, a analysis core tool or module (not shown) can calculate expanded fields that are maintained and utilized by the analysis core tool to model signaling of a mobile device in a mobile network. More specifically, the analysis core tool can model the effects of the Open Channel architecture (e.g., the distributed caching techniques including the Signal Optimization and Extended Caching techniques discussed herein). For example, the analysis core tool or module such as, for example, analysis core 255a of FIG. 2E or CRSC analysis core 375a of FIG. 3E, can calculate simulated virtual radio up intervals. The calculation can include calculating one or more additional fields based on one or more input logs (e.g., radio log and a traffic activity log including network hit and cache hit information).

More specifically, as shown in the example of FIG. 16B, the analysis core tool or module utilizes a networkHit and a cacheHit netLogs to calculate the simulated virtual radio up intervals. As discussed herein, the radio up intervals indicate a period of time during which the mobile device radio is active.

In the example of FIG. 16C, the simulated virtual radio up interval associated with the first application #1 is illustrated. Similarly, the example of FIG. 16D illustrates the simulated virtual radio up intervals associated with the second application #2.

The simulated virtual per application fields indicate the connections that happen in a simulated environment in which a single application on the mobile device that normally uses the Open Channel client is simulated but there is no Open Channel on the mobile device.

The simulated virtual per application connection fields indicate the connection(s) that would occur through the network in a simulated environment in which a single application on the mobile device that normally uses the Open Channel client is simulated but there is no Open Channel on the mobile device. Similarly, the simulated virtual time fields indicate the time connected from the connections that would occur through network in a simulated environment in which a single application on the mobile device that normally uses the Open Channel client is simulated but there is no Open Channel on the mobile device.

With reference to the example of FIG. 16A and FIG. 16B, the table 13 below indicates the relevant portions of the input log including network hits. In a simulated environment in which all applications on the mobile device that normally use the Open Channel client are simulated but there is no Open Channel on the mobile device.

TABLE 13

Input Net log fields

| NL1 | 07:26:00.500 | 32 | 234 | 23 | 42 | 0 | 0 | mobile_gprs | App1 | Simulated Radio up ↑ |
| DL1 | 07:26:16.000 | No this record in input. It is only for illustrating purpose here. | | | | | | | | Simulated Radio down ↓ after dormancy (network) delay of 15 sec |
| NL2 | 07:26:20.000 | 43 | 23 | 342 | 424 | 0 | 0 | mobile_gprs | App2 | Simulated Radio up ↑ |
| DL2 | 07:26:35.000 | No this record in input. It is only for illustrating purpose here. | | | | | | | | Simulated Radio down ↓ after dormancy (network) delay of 15 sec |
| NL3 | 07:27:00.000 | 32 | 234 | 423 | 234 | 0 | 0 | mobile_gprs | App2 | Simulated Radio up ↑ |
| DL3 | 07:27:15.000 | No this record in input. It is only for illustrating purpose here. | | | | | | | | Simulated Radio down ↓ after dormancy (network) delay of 15 sec |
| NL4 | 07:31:00.000 | 45 | 34 | 0 | 0 | 0 | 0 | mobile_gprs | App2 | Simulated Virtual radio up ↑ |
| NL5 | 07:31:01.500 | 45 | 234 | 0 | 0 | 0 | 0 | mobile_gprs | App2 | |
| DL4 | 07:32:16.500 | No this record in input. It is only for illustrating purpose here. | | | | | | | | Simulated Virtual Radio down ↓ after dormancy (network) delay of 15 sec |

In this example, DL1, DL2, and DL3 records (or items) are not inputs. Rather, these records are illustrated for clarity of description purposes. As discussed herein, the net log items are indicated by the connotation "NLx."

The analysis core tool such as, for example, analysis core 255a of FIG. 2E or analysis core 375a of FIG. 3E processes the input log(s) to, for example, calculate one or more additional fields based on the one or more input logs (e.g., the traffic activity log). This process can include utilizing one or more long poll techniques to split one net log item into two or more net log items. This process is illustrated and discussed in greater detail with reference to FIG. 19A. As shown in this example, the analysis core tool calculates simulated per application connection fields (or flags) and simulated per application time fields. An example output table 14 illustrating output net log fields is illustrated below.

TABLE 14

Output Net log fields

|  | TimeStamp | Simulated virtual per app connection | Simulated virtual per app Time |
|---|---|---|---|
| NL1 | 07:26:00.500 | 1 | 15 000 |
| NL2 | 07:26:20.000 | 1 | 15 000 |
| NL3 | 07:27:00.000 | 1 | 15 000 |
| NL4 | 07:31:00.000 | 1 | 1 500 |
| NL5 | 07:31:01.500 | 0 | 15 000 |
| TOTAL |  | 4 | 61 500 |

Example Saved Values

As discussed herein, the various field calculations can be used to model the signaling in a mobile network. For example, the modeling can include calculating a saved connections and a saved time. The saved connections indicate the amount, number, or quantity of connections that were saved as a result of utilizing the Open Channel architecture. In one embodiment, the saved connections can be modeled as follows:

Saved connection=Virtual connection−Actual connection,

Saved simulated connection=Simulated virtual connection−Simulated connection,

Saved simulated per app connection=Simulated virtual per app connection−Simulated per app connection, Saved simulated per host connection=Simulated virtual per host connection−Simulated per host connection.

Similarly, the saved time is time interval of connection time that was saved as a result of utilizing the Open Channel architecture. In one embodiment, the saved time can be modeled as follows:

Saved time=Virtual time−Actual time,

Saved simulated time=Simulated virtual time−Simulated time,

Saved simulated per app time=Simulated virtual per app time−Simulated per app time, Saved simulated per host time=Simulated virtual per host time−Simulated per host time.

Connection Flags and Time

Figures 17A, 17B:
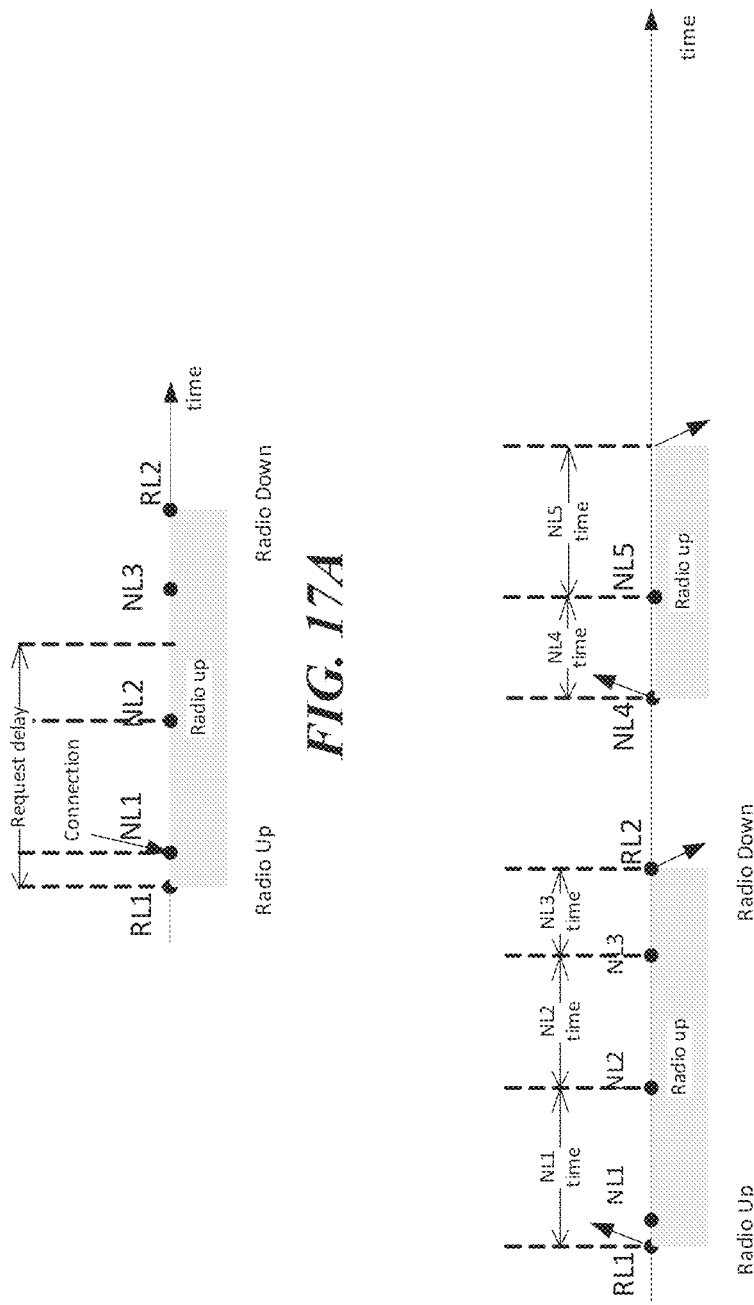
FIGS. 17A and 17B illustrate an example of calculating connection flags and connection time intervals and an example radio up interval, respectively.

FIG. 17A illustrates an example of calculating the connection flags and connection time intervals discussed above. Connection flags indicate whether a particular netLog caused radio up. In one embodiment, to determine the connection flag for each radio up interval the closest netLog to radio up log record is marked with connection flag. Importantly, only netlogs that are in Request Delay neighborhood to Radio Up log are marked with a connection flag.

FIG. 17B illustrates an example radio up interval. The radio up interval may be calculated, maintained, and/or otherwise obtained to calculate the time connected indicate impact of a particular netLog on radio up time. For each radio up interval, the radio up time equals to sum of time connected values for netLogs that belong to that particular interval.

Network Hits

A network hit is start point of data transfer at open channel server side. In one embodiment, a net log item is considered a network hit when at least one of these conditions of its associated fields are true:
SERVER_BYTES_IN>0;
SERVER_BYTES_OUT>0;
OPERATION=radio_up; and,
OPERATION!=proxy_tc_handshake Cache Hits A cache hit is start point of data transfer in cache. In one embodiment, a net log item is considered a cache hit when it is not net log hit and at least one of these conditions of its associated fields are true:
CLIENT_BYTES_IN>0
CLIENT_BYTES_OUT>0
OPERATION=deferred_app_close; and,
OPERATION!=proxy_https_handshake Detailed Example Calculation The following example illustrates another field calculation. To begin, suppose the following input netlog and radio log:

TABLE 15

Input Net log fields

| # | Timestamp | Client bytes in | Client bytes out | Server bytes in | Server bytes out | Cache bytes in | Cache bytes in | Interface |
|---|---|---|---|---|---|---|---|---|
| 1 | 07:26:00.000 | 111 | 111 | 0 | 0 | 0 | 0 | mobile_gprs |
| 2 | 07:26:20.000 | 111 | 111 | 0 | 0 | 0 | 0 | mobile_gprs |
| 3 | 07:27:00.100 | 32 | 234 | 423 | 234 | 0 | 0 | mobile_gprs |
| 4 | 07:29:00.000 | 432 | 63 | 476 | 73 | 0 | 0 | mobile_gprs |
| 5 | 07:29:00.500 | 234 | 32 | 23 | 261 | 0 | 0 | mobile_gprs |
| 6 | 07:31:00.000 | 111 | 111 | 0 | 0 | 0 | 0 | mobile_gprs |

TABLE 16

| | Input Radio log fields | | |
|---|---|---|---|
| # | Timestamp | State | Prev state |
| 1 | 07:27:00.000 | data_activity_connected | data_activity_dormant |
| 2 | 07:30:00.000 | data_activity_dormant | data_activity_connected |

Figure 18:
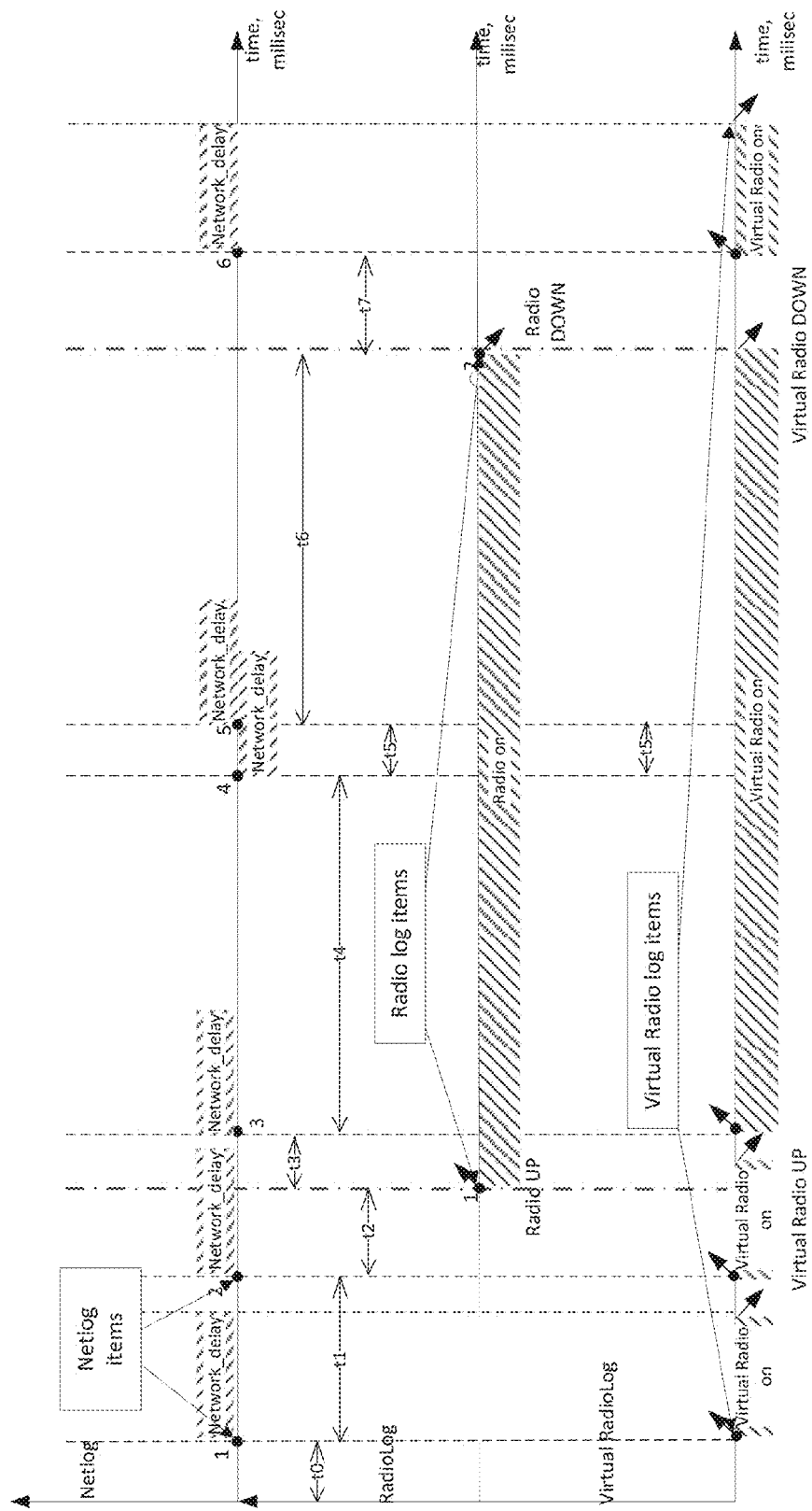
FIG. 18 depicts an example scheme illustrating logs over a period of time.

FIG. 18 depicts an example scheme illustrating logs over a period of time. For example, assume $t1=(07:26:20.000-07:26:00.000)=20\,000$ ms, $t2=(07:27:00.000-07:26:20.000)=40\,000$ ms, $t3=(07:27:00.100-07:27:00.000)=100$ ms, $t4=(07:29:00.000-07:27:00.100)=119\,000$ ms, $t5=(07:29:00.500-07:29:00.000)=500$ ms, $t6=(07:30:00.000-07:29:00.500)=59\,500$ ms, $t7=(07:31:00.000-07:30:00.000)=60\,000$ ms, and network delay=15 sec, thus,
t1, (t2+t3), t4, (t6+t7)>network delay; and
t5<network delay;
t3<request delay.
Table 17, below, illustrates the results of the calculation

TABLE 17

| | Result calculation | | | | | |
|---|---|---|---|---|---|---|
| Parameter, log-item | 1 | 2 | 3 | 4 | 5 | 6 |
| Actual conn | 0 | 0 | 1 | 0 | 0 | 0 |
| Virtual conn | 1 | 1 | 1 | 0 | 0 | 1 |
| Actual time | 0 | 0 | t3 + t4 | t5 | t6 | 0 |
| Virtual time | Network delay | Network delay | t3 + t4 | t5 | t6 | Network delay |

Table 18 indicates the output net log description. Note that the output time intervals are in milliseconds.

TABLE 18

| | | output net log | | | | | |
|---|---|---|---|---|---|---|---|
| # | Timestamp | Actual conn | Virtual conn | Actual time | Virtual time | Saved conn | Saved time |
| 1 | 07:26:00.000 | 0 | 1 | 0 | 15000 | 1 | 15000 |
| 2 | 07:26:20.000 | 0 | 1 | 0 | 15000 | 1 | 15000 |
| 3 | 07:28:00.000 | 1 | 1 | 120000 | 120000 | 0 | 0 |
| 4 | 07:29:00.000 | 0 | 0 | 500 | 500 | 0 | 0 |
| 5 | 07:29:01.000 | 0 | 0 | 59500 | 59500 | 0 | 0 |
| 6 | 07:31:00.000 | 0 | 1 | 0 | 15000 | 1 | 15000 |

Example Long Poll Procedure

Figure 19A:
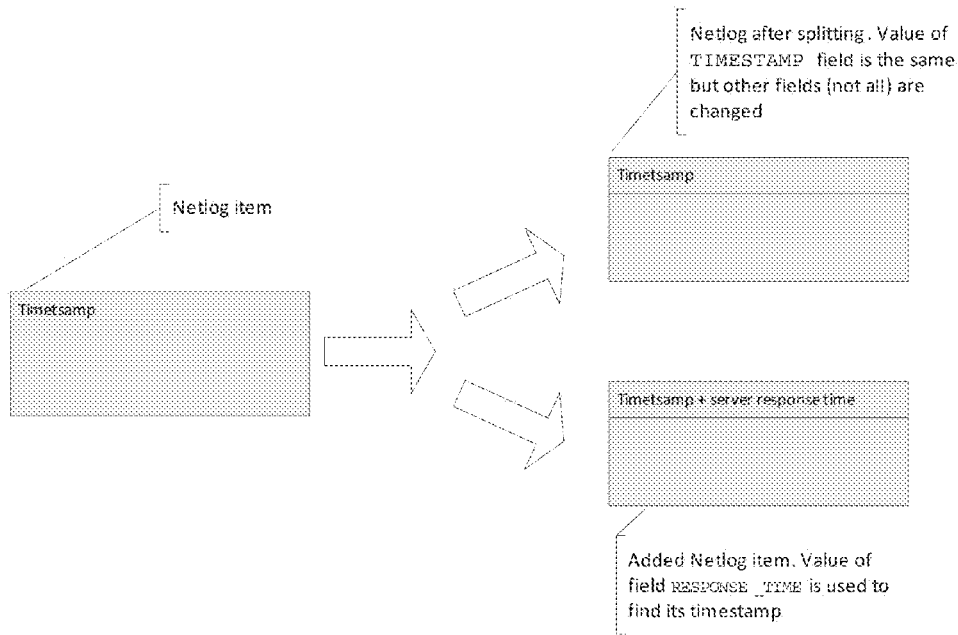
FIGS. 19A and 19B graphically illustrates a long poll procedure for splitting one netlog item into two netlog items and the conditions which must be true in order for the netlog to be split in two parts, respectively.

FIG. 19A graphically illustrates a long poll procedure for splitting one netlog item into two netlog items, according to an embodiment. More specifically, the Long poll procedure described herein is the process of splitting one netlog item into two netlog items. In one embodiment, the conditions for performing a long poll procedure for netlog item are:

RESPONSE_TIME is greater than or equals to network delay (default, e.g., 15 000 ms);

Netlog item is network hit or cache hit;

Value of SERVER_BYTES_IN/RESPONSE_TIME is less than or equals to split ratio (default, e.g., 3 000 ms).

Figure 19B:
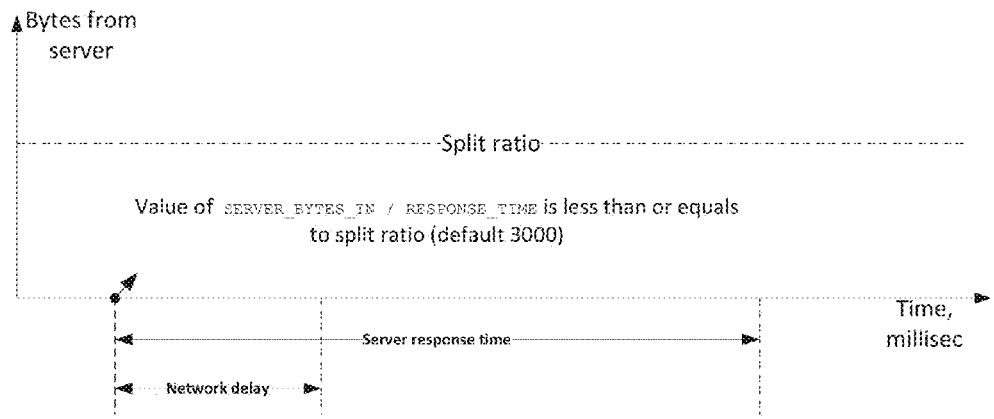

FIG. 19B graphically illustrates the conditions which must be true in order for the netlog to be split in two parts. More specifically, if the value of SERVER_BYTES_IN/RESPONSE_TIME is less than or equals to split ratio (default, e.g., 3 000 ms) then the netlog can be split in two parts. The table 19 below illustrates the field modifications occurring as a result of performing the long poll procedure.

TABLE 19

| fields changing after long poll procedure | | |
|---|---|---|
| Source netlog | Netlog after splitting | Added netlog |
| TIMESTAMP | => TIMESTAMP | TIMESTAMP + RESPONSE_TIME |
| CLIENT_BYTES_IN | CLIENT_BYTES_IN | 0 |
| CLIENT_BYTES_OUT | 0 | CLIENT_BYTES_OUT |
| SERVER_BYTES_IN | 0 | SERVER_BYTES_IN |
| SERVER_BYTES_OUT | SERVER_BYTES_OUT | 0 |
| CACHED_BYTES_IN | 0 | CACHED_BYTES_IN |
| CACHED_BYTES_OUT | 0 | CACHED_BYTES_OUT |
| RESPONSE_TIME | 0 | 0 |
| Other fields | The same as in source | The same as in source |

Example input and output net logs, pre- and post-split, respectively, are illustrated below.

TABLE 20

Input Net log and Radio fields

RL1 07:26:00.000 data_activity_connected   data_activity_dormant   Radio up ↑
NL1 07:26:00.500 32   234   23   42   0   0   mobile_gprs   27
RL2 07:30:00.000 data_activity_dormant   data_activity_connected   Radio down ↓

TABLE 21

Output Net log and Radio fields

RL1 07:26:00.000 data_activity_connected   data_activity_dormant   Radio up ↑
NL1 07:26:00.500 32   0   0   42   0   0   mobile_gprs   0
NL2 07:26:27.500 0   234   23   0   0   0   mobile_gprs   0
RL2 07:30:00.000 data_activity_dormant   data_activity_connected   Radio down ↓

Example Log Preprocessing

In some embodiments, log preprocessing is performed before the data in the calculated fields is populated. For example, the following procedures can be performed:
If
Operation is PROXY_HTTPS_HANDSHAKE; and
CLIENT_BYTES_IN>0 or CLIENT_BYTES_OUT>0; and
SERVER_BYTES_IN>0 or SERVER_BYTES_OUT>0;
Then replace CLIENT_BYTES_OUT with SERVER_BYTES_IN.
If
Operation is PROXY_CACHEABLE_APP_COMPRESSED; or
Operation is PROXY_UNCACHEABLE_APP_COMPRESSED; and
SERVER_BYTES_IN>0;
Then replace CLIENT_BYTES_OUT with SERVER_BYTES_IN.
If
Operation is PROXY_CACHEABLE_APP_COMPRESSED; or
Operation is PROXY_UNCACHEABLE_APP_COMPRESSED; and
SERVER_BYTES_OUT>0;
Then replace CLIENT_BYTES_IN with SERVER_BYTES_OUT.
If
CLIENT_BYTES_IN>0; and
CLIENT_BYTES_OUT==0; and
SERVER_BYTES_IN==0; and
SERVER_BYTES_OUT==0;
Then replace CLIENT_BYTES_IN with zero value.
If RESPONSE_TIME<0 then replace RESPONSE_TIME with zero value.

Report Processing

Various example field calculations are now described.

Example Time on not Charging Calculation

Figure 20:
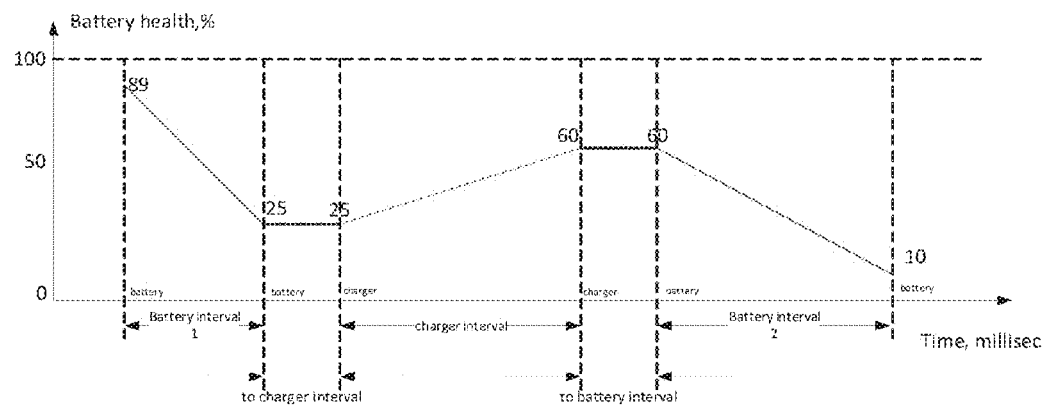
FIGS. 20 and 21 graphically illustrates examples calculations of the TIME_ON_NOT_CHARGING field and the TIME_ON_NOT_CHARGING fields, respectively.

FIG. 20 graphically illustrates an example calculation of the TIME_ON_NOT_CHARGING field. In some embodiments, a power log can be used to make the calculation. In some embodiments, the TIME_ON_NOT_CHARGING field represents a sum of intervals when a device's battery health was decreasing. For example, TIME_ON_NOT_CHARGING=[Battery interval 1]+[Battery interval 2].

Example Charge Drop Percent Calculation

Figure 21:
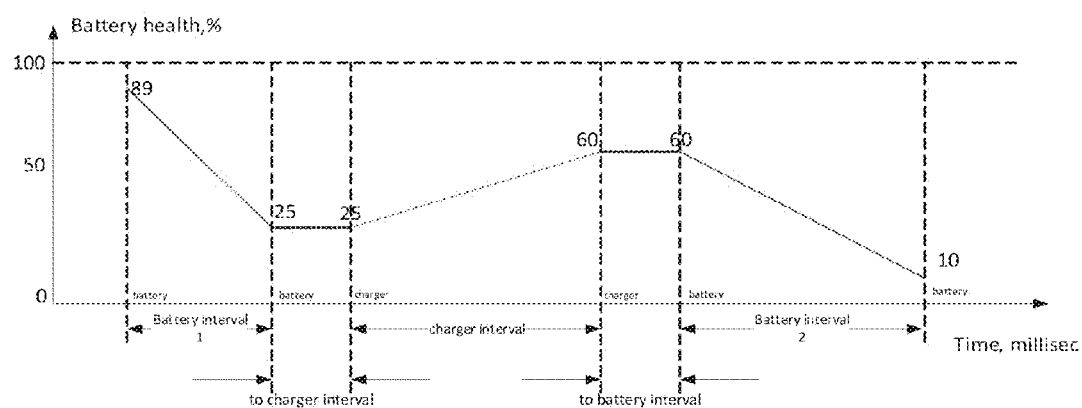

FIG. 21 graphically illustrates an example calculation of the CHARGE_DROP_PERCENT field. Again, a power log can be used to make the calculation. In some embodiments, the Drop percent represents a sum of changes of battery health when battery health is decreasing. For example, CHARGE_DROP_PERCENT=[89−25]+[60−10]=64+50=114 (percent).

Example Time Radio State Calculation

The table 22 below describes the relationship between various example previous radio states and corresponding report fields. More specifically, the table below describes the TIME_RADIO_STATE_n field calculation, where n runs from 1 to 10. In this example, a radio log is used and if the value of INTERVAL in the radio log is greater than zero, then the value of INTERVAL field is saved into one of the TIME_RADIO_STATE_n fields.

TABLE 22

Correspondence between previous radio states and report fields

| # | Previous radio state | Report field |
|---|---|---|
| 1 | DATA_ACTIVITY_CONNECTED | TIME_RADIO_STATE_1 |
| 2 | DATA_ACTIVITY_DORMANT | TIME_RADIO_STATE_2 |
| 3 | DATA_CONNECTED | TIME_RADIO_STATE_3 |
| 4 | DATA_CONNECTING | TIME_RADIO_STATE_4 |
| 5 | DATA_DISCONNECTED | TIME_RADIO_STATE_5 |
| 6 | DATA_SUSPENDED | TIME_RADIO_STATE_6 |
| 7 | STATE_EMERGENCY_ONLY | TIME_RADIO_STATE_7 |
| 8 | STATE_IN_SERVICE | TIME_RADIO_STATE_8 |
| 9 | STATE_OUT_OF_SERVICE | TIME_RADIO_STATE_9 |
| 10 | STATE_POWER_OFF | TIME_RADIO_STATE_10 |

Example Transition into Radio State Calculation

The table 23 below describes the TRANS_INTO_RADIO_STATE_n field, where n runs from 1 to 10. In this example, a radio log is used. The TRANS_INTO_RADIO_STATE_n field represents the number of times a radio log has transitioned into certain state.

TABLE 23

Correspondence between current radio states and report fields

| # | Current radio state | Report field (how many times radio was in this state) |
|---|---|---|
| 1 | DATA_ACTIVITY_CONNECTED | TRANS_INTO_RADIO_STATE_1 |
| 2 | DATA_ACTIVITY_DORMANT | TRANS_INTO_RADIO_STATE_2 |
| 3 | DATA_CONNECTED | TRANS_INTO_RADIO_STATE_3 |
| 4 | DATA_CONNECTING | TRANS_INTO_RADIO_STATE_4 |
| 5 | DATA_DISCONNECTED | TRANS_INTO_RADIO_STATE_5 |
| 6 | DATA_SUSPENDED | TRANS_INTO_RADIO_STATE_6 |
| 7 | STATE_EMERGENCY_ONLY | TRANS_INTO_RADIO_STATE_7 |
| 8 | STATE_IN_SERVICE | TRANS_INTO_RADIO_STATE_8 |
| 9 | STATE_OUT_OF_SERVICE | TRANS_INTO_RADIO_STATE_9 |
| 10 | STATE_POWER_OFF | TRANS_INTO_RADIO_STATE_10 |

Example WCDMA Time Calculation

The table 24 below describes the WCDMA_TIME_IN_DCH, WCDMA_TIME_IN_FACH, WCDMA_TIME_IN_PCH, and WCDMA_TIME_IN_IDLE fields. Again, a radio log is used in this example and if the value of INTERVAL in the radio log is greater than zero, then the value of the INTERVAL field is saved into one of fields WCDMA_TIME_< . . . > fields. The correspondence between previous radio states and report fields is shown in the table below.

TABLE 24

Correspondence between previous radio states and report fields

| # | Previous radio state | Report field |
|---|---|---|
| 1 | CELL_DCH | WCDMA_TIME_IN_DCH |
| 2 | CELL_PCH | WCDMA_TIME_IN_PCH |
| 3 | CELL_FACH | WCDMA_TIME_IN_FACH |
| 4 | IDLE | WCDMA_TIME_IN_IDLE |

Example WCDMA Transition into Radio State Calculation

The table 25 below describes the WCDMA_TRANS_INTO_DCH, WCDMA_TRANS_INTO_FACH, WCDMA_TRANS_INTO_PCH, WCDMA_TRANS_INTO_IDLE calculation fields. The radio log is used in this example. Field WCDMA_TRANS_INTO_< . . . > indicates how many times radio log has transition into certain state.

TABLE 25

Correspondence between current radio states and report fields

| # | Current radio state | Report field (how many times radio was in this state) |
|---|---|---|
| 1 | CELL_DCH | WCDMA_TRANS_INTO_DCH |
| 2 | CELL_PCH | WCDMA_TRANS_INTO_PCH |
| 3 | CELL_FACH | WCDMA_TRANS_INTO_FACH |
| 4 | IDLE | WCDMA_TRANS_INTO_IDLE |

Example Total Bytes Calculation

The table 26 below describes the TOTAL_BYTES_FROM_APP, TOTAL_BYTES_TO_APP, TOTAL_BYTES_FROM_NET, TOTAL_BYTES_TO_NET, TOTAL_BYTES_FROM_CACHE, TOTAL_BYTES_TO_CACHE calculation fields.

TABLE 26

Bytes calculation

| # | Field in report | Field from net log used for | Comment |
|---|---|---|---|
| 1 | TOTAL_BYTES_FROM_APP | CLIENT_BYTES_IN | Just copy value from net log |
| 2 | TOTAL_BYTES_TO_APP | CLIENT_BYTES_OUT | |
| 3 | TOTAL_BYTES_FROM_NET | SERVER_BYTES_IN | |
| 4 | TOTAL_BYTES_TO_NET | SERVER_BYTES_OUT | |
| 5 | TOTAL_BYTES_FROM_CACHE | CACHED_BYTES_IN | |
| 6 | TOTAL_BYTES_TO_CACHE | CACHED_BYTES_OUT | |

Example Total Hits Calculation

The table below 27 describes the TOTAL_HITS_FROM_APP, TOTAL_HITS_TO_APP, TOTAL_HITS_FROM_NET, TOTAL_HITS_TO_NET, TOTAL_HITS_FROM_CACHE, and TOTAL_HITS_TO_CACHE calculation fields.

TABLE 27

Hits calculation

| # | Field in report | Field from net log used for | Comment |
|---|---|---|---|
| 1 | TOTAL_HITS_FROM_APP | CLIENT_BYTES_IN | 1 if CLIENT_BYTES_IN > 0, 0 |
| 2 | TOTAL_HITS_TO_APP | CLIENT_BYTES_OUT | 1 if CLIENT_BYTES_OUT > 0, 0 |
| 3 | TOTAL_HITS_FROM_NET | SERVER_BYTES_IN, | 1 if SERVER_BYTES_IN > 0 or |
| 4 | TOTAL_HITS_TO_NET | SERVER_BYTES_OUT | 1 if SERVER_BYTES_OUT > 0, 0 |
| 5 | TOTAL_HITS_FROM_CACHE | CACHED_BYTES_IN | 1 if CACHED_BYTES_IN > 0, 0 |
| 6 | TOTAL_HITS_TO_CACHE | CACHED_BYTES_OUT | 1 if CACHED_BYTES_OUT > 0, 0 |

Example Cache Requests. Bytes and Hits.

Table 28 below describes the TOTAL_BYTES_CACHE_REQ and TOTAL_HITS_CACHE_REQ calculation fields.

TABLE 28

Cache request calculation

| # | Field in report | Field from net log used for | Comment |
|---|---|---|---|
| 1 | TOTAL_BYTES_CACHE_REQ | CLIENT_BYTES_IN, | CLIENT_BYTES_IN if |
| 2 | TOTAL_HITS_CACHE_REQ | CLIENT_BYTES_IN, | 1 if CLIENT_BYTES_IN > 0 and |

Example Connections Calculation

Table 29 below describes the SIM_RADIO_STATE_CHANGES_ACTUAL and SIM_RADIO_STATE_CHANGES_SAVED calculation fields. In some embodiments, the net log fields can be used to calculate these report fields. There are two cases in calculation:

Report key category is "Application";
Report key category is other (not "Application")

Example Report Key Category is "Application"

TABLE 30

Connections calculation

| # | Field in report | Field from net log used for | Comment |
|---|---|---|---|
| 1 | SIM_RADIO_STATE_CHANGES_ACTUAL | SIM_ACTUAL_CONN_PER_APP | Just copy value |
| 2 | SIM_RADIO_STATE_CHANGES_SAVED | SIM_SAVED_CONN_PER_APP | |

Example Report Key Category is Other (not "Application")

TABLE 31

Connections calculation

| # | Field in report | Field from net log used | Comment |
|---|---|---|---|
| 1 | SIM_RADIO_STATE_CHANGES_ACTUAL | ACTUAL_CONN | Just copy value from net |
| 2 | SIM_RADIO_STATE_CHANGES_SAVED | SAVED_CONN | |

Example Time Calculation

Table 32 below describes the SIM_RADIO_TIME_CONN_ACTUAL and SIM_RADIO_TIME_CONN_SAVED calculation fields. In some embodiments, the net log fields are used to calculate these report fields. There are two cases in calculation:

Report key category is "Application";

Report key category is other (not "Application")

Example Report Key Category is "Application"

TABLE 33

Time calculation

| # | Field in report | Field from net log used for | Comment |
|---|---|---|---|
| 1 | SIM_RADIO_TIME_CONN_ACTUAL | SIM_ACTUAL_TIME_PER_APP | Just copy value from net |
| 2 | SIM_RADIO_TIME_CONN_SAVED | SIM_SAVED_TIME_PER_APP | |

Example Report Key Category is Other (not "Application")

TABLE 34

Time calculation

| # | Field in report | Field from net log used | Comment |
|---|---|---|---|
| 1 | SIM_RADIO_TIME_CONN_ACTUAL | ACTUAL_TIME | Just copy value from net log |
| 2 | SIM_RADIO_TIME_CONN_SAVED | SAVED_TIME | |

Example Netlog Fields

TABLE 35

Net Log format

| # | Name | Type | Derived |
|---|---|---|---|
| 1 | TIMESTAMP | TIMEST | N |
| 2 | CLIENT_Z7TP_ADDRESS | STRING | N |
| 3 | TRANSACTION_TYPE | STRING | N |
| 4 | VERSION_ID | INT | N |
| 5 | CLIENT_BYTES_IN | LONG | N |
| 6 | CLIENT_BYTES_OUT | LONG | N |
| 7 | SERVER_BYTES_IN | LONG | N |
| 8 | SERVER_BYTES_OUT | LONG | N |
| 9 | CACHE_BYTES_IN | LONG | N |
| 10 | CACHE_BYTES_OUT | LONG | N |
| 11 | HOST | STRING | N |
| 12 | APPLICATION | STRING | N |
| 13 | APP_STATUS | STRING | N |
| 14 | OPERATION | STRING | N |
| 15 | PROTOCOL | STRING | N |
| 16 | INTERFACE | STRING | N |
| 17 | RESPONSE_TIME | LONG | N |
| 18 | REQUEST_ID | LONG | N |
| 19 | STATUS_CODE | INT | N |
| 20 | ERROR_CODE | INT | N |
| 21 | CONTENT_TYPE | STRING | N |
| 22 | HEADER_LENGTH | INT | N |
| 23 | CONTENT_LENGTH | LONG | N |
| 24 | REQUEST_HASH | STRING | N |
| 25 | RESPONSE_HASH | STRING | N |
| 26 | ANALYSIS | STRING | N |
| 27 | OPTIMIZATION | INT | N |

TABLE 35-continued

Net Log format

| # | Name | Type | Derived |
|---|---|---|---|
| 28 | DESTINATION_PORT | INT | N |
| 29 | SUBSCRIPTION_ID | INT | N |
| 30 | PAYLOAD | STRING | N |
| 31 | VIRTUAL_CONN | INT | Y |
| 32 | ACTUAL_CONN | INT | Y |
| 33 | SAVED_CONN | INT | Y |
| 34 | VIRTUAL_TIME | LONG | Y |
| 35 | ACTUAL_TIME | LONG | Y |
| 36 | SAVED_TIME | LONG | Y |
| 37 | SIM_VIRTUAL_CONN | INT | Y |
| 38 | SIM_ACTUAL_CONN | INT | Y |
| 39 | SIM_SAVED_CONN | INT | Y |
| 40 | SIM_VIRTUAL_TIME | LONG | Y |
| 41 | SIM_ACTUAL_TIME | LONG | Y |
| 42 | SIM_SAVED_TIME | LONG | Y |
| 43 | SIM_VIRTUAL_CONN_PER_ | INT | Y |
| 44 | SIM_ACTUAL_CONN_PER_ | INT | Y |
| 45 | SIM_SAVED_CONN_PER_AP | INT | Y |
| 46 | SIM_VIRTUAL_TIME_PER_ | LONG | Y |
| 47 | SIM_ACTUAL_TIME_PER_A | LONG | Y |
| 48 | SIM_SAVED_TIME_PER_AP | LONG | Y |
| 49 | SIM_VIRTUAL_CONN_PER_ | INT | Y |
| 50 | SIM_ACTUAL_CONNECTIO | INT | Y |
| 51 | SIM_SAVED_CONN_PER_H | INT | Y |
| 52 | SIM_VIRTUAL_TIME_PER_ | LONG | Y |
| 53 | SIM_ACTUAL_TIME_PER_H | LONG | Y |
| 54 | SIM_SAVED_TIME_PER_HO | LONG | Y |

Example Report Format Fields

TABLE 36 report format

| # | Name | Type | Derived |
|---|---|---|---|
| 1 | TIMESTAMP | TIMESTAMP | N |
| 2 | LOCAL_TIMESTAMP | TIMESTAMP | N |
| 3 | ENTITY_ID | STRING | N |
| 4 | BEARER_TYPE | INT | N |
| 5 | CATEGORY_TYPE | INT | N |
| 6 | CATEGORY_VALUE | STRING | N |
| 7 | TOTAL_BYTES_TO_APP | LONG | Y |
| 8 | TOTAL_BYTES_FROM_APP | LONG | Y |
| 9 | TOTAL_BYTES_TO_CACHE | LONG | Y |

TABLE 36-continued report format

| # | Name | Type | Derived |
|---|------|------|---------|
| 10 | TOTAL_BYTES_FROM_CACHE | LONG | Y |
| 11 | TOTAL_BYTES_TO_NET | LONG | Y |
| 12 | TOTAL_BYTES_FROM_NET | LONG | Y |
| 13 | TOTAL_BYTES_CACHE_REQ | LONG | Y |
| 14 | TOTAL_HITS_TO_APP | INT | Y |
| 15 | TOTAL_HITS_FROM_APP | INT | Y |
| 16 | TOTAL_HITS_TO_CACHE | INT | Y |
| 17 | TOTAL_HITS_FROM_CACHE | INT | Y |
| 18 | TOTAL_HITS_TO_NET | INT | Y |
| 19 | TOTAL_HITS_FROM_NET | INT | Y |
| 20 | TOTAL_HITS_CACHE_REQ | INT | Y |
| 21 | CHARGE_DROP_PERCENT | INT | Y |
| 22 | TIME_ON_NOT_CHARGING | LONG | Y |
| 23 | TIME_RADIO_STATE_1 | LONG | Y |
| 24 | TIME_RADIO_STATE_2 | LONG | Y |
| 25 | TIME_RADIO_STATE_3 | LONG | Y |
| 26 | TIME_RADIO_STATE_4 | LONG | Y |
| 27 | TIME_RADIO_STATE_5 | LONG | Y |
| 28 | TIME_RADIO_STATE_6 | LONG | Y |
| 29 | TIME_RADIO_STATE_7 | LONG | Y |
| 30 | TIME_RADIO_STATE_8 | LONG | Y |
| 31 | TIME_RADIO_STATE_9 | LONG | Y |
| 32 | TIME_RADIO_STATE_10 | LONG | Y |
| 33 | TRANS_INTO_RADIO_STATE_1 | INT | Y |
| 34 | TRANS_INTO_RADIO_STATE_2 | INT | Y |
| 35 | TRANS_INTO_RADIO_STATE_3 | INT | Y |
| 36 | TRANS_INTO_RADIO_STATE_4 | INT | Y |
| 37 | TRANS_INTO_RADIO_STATE_5 | INT | Y |
| 38 | TRANS_INTO_RADIO_STATE_6 | INT | Y |
| 39 | TRANS_INTO_RADIO_STATE_7 | INT | Y |
| 40 | TRANS_INTO_RADIO_STATE_8 | INT | Y |
| 41 | TRANS_INTO_RADIO_STATE_9 | INT | Y |
| 42 | TRANS_INTO_RADIO_STATE_10 | INT | Y |
| 43 | RADIO_STATE_CHANGES_ACTUAL | INT | Y |
| 44 | RADIO_TIME_CONN_ACTUAL | LONG | Y |
| 45 | RADIO_STATE_CHANGES_SAVED | INT | Y |
| 46 | RADIO_TIME_CONN_SAVED | LONG | Y |
| 47 | SIM_RADIO_STATE_CHANGES_ACTUAL | INT | Y |
| 48 | SIM_RADIO_TIME_CONN_ACTUAL | LONG | Y |
| 49 | SIM_RADIO_STATE_CHANGES_SAVED | INT | Y |
| 50 | SIM_RADIO_TIME_CONN_SAVED | LONG | Y |
| 51 | WCDMA_TRANS_INTO_DCH | INT | Y |
| 52 | WCDMA_TRANS_INTO_FACH | INT | Y |
| 53 | WCDMA_TRANS_INTO_PCH | INT | Y |
| 54 | WCDMA_TRANS_INTO_IDLE | INT | Y |
| 55 | WCDMA_TIME_IN_DCH | LONG | Y |
| 56 | WCDMA_TIME_IN_FACH | LONG | Y |
| 57 | WCDMA_TIME_IN_PCH | LONG | Y |
| 58 | WCDMA_TIME_IN_IDLE | LONG | Y |
| 59 | NEW_SUBSCRIBER_COUNT | INT | Y |
| 60 | ACTIVE_SUBSCRIBER_COUNT | INT | Y |
| 61 | RECURRING_HASH | LONG | Y |

Figure 22:
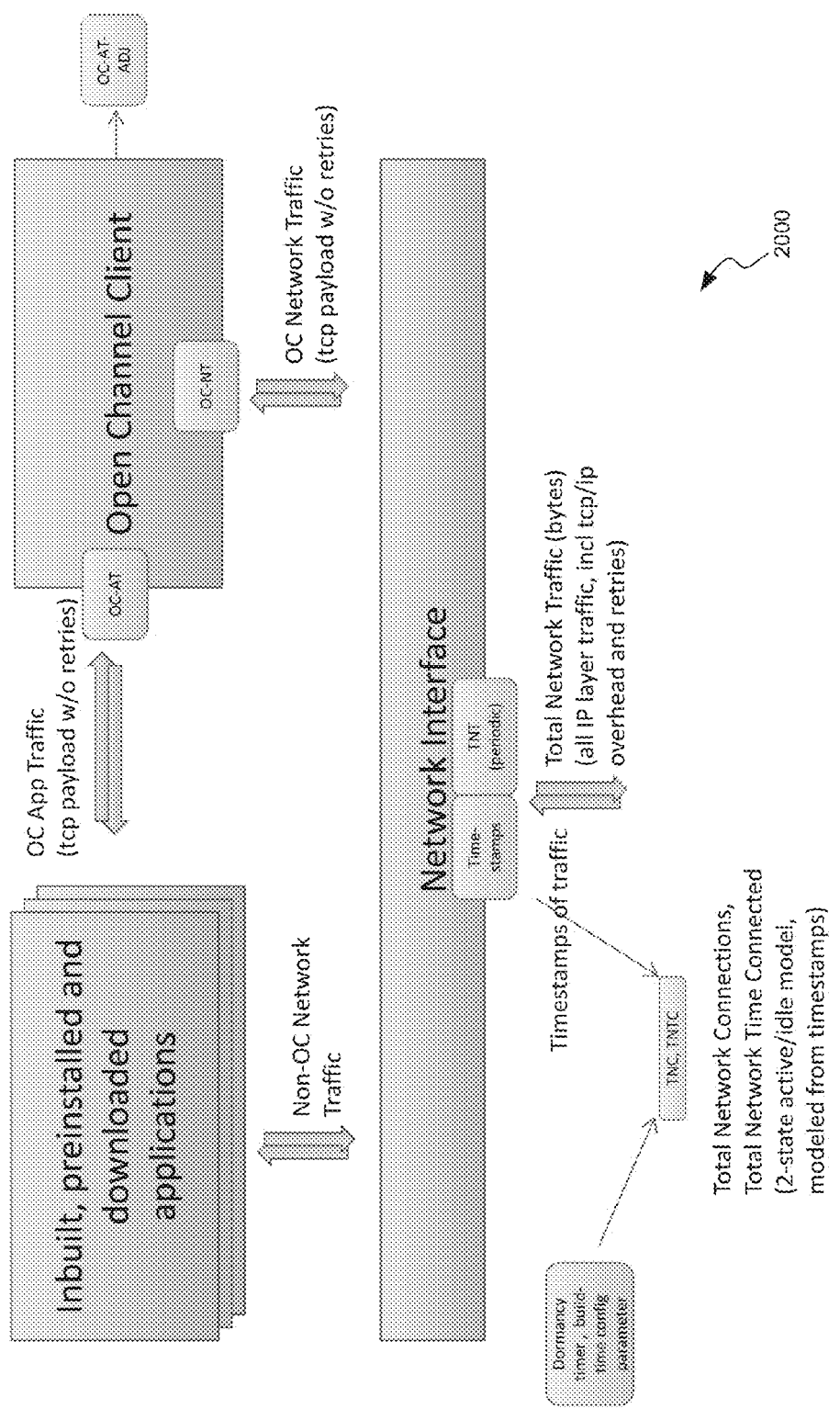
FIG. 22 depicts example measurement points from which a analysis core module can perform measurements for modeling signals in a data network.
Figure 24A:
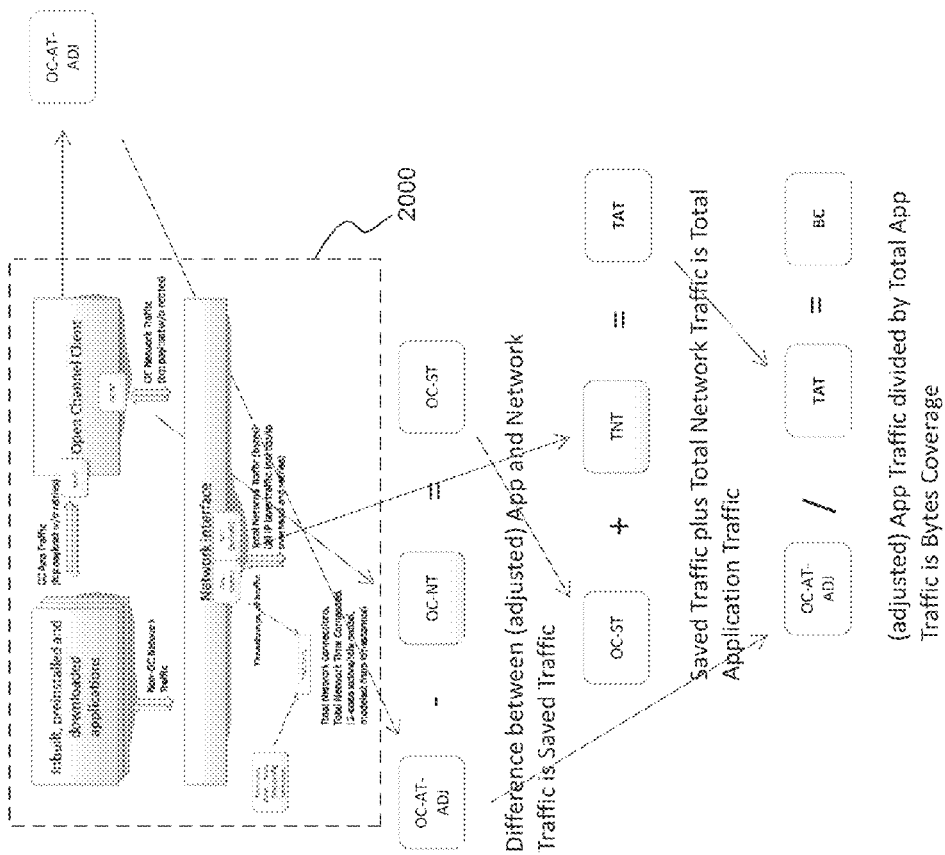
FIGS. 24A-24J graphically illustrate various calculations of example output metrics that can be used in embodiments of the analysis core module.
Figure 24B:
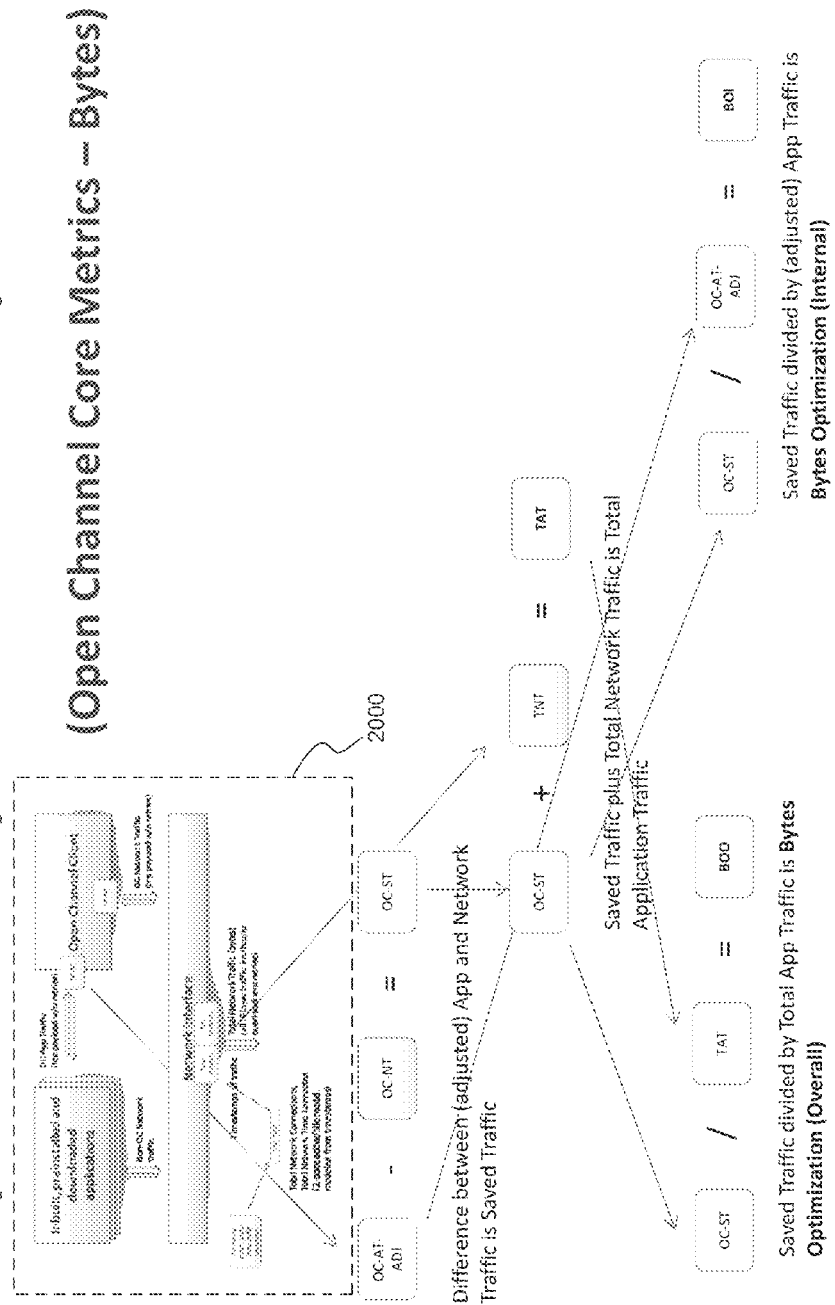
Figure 24C:
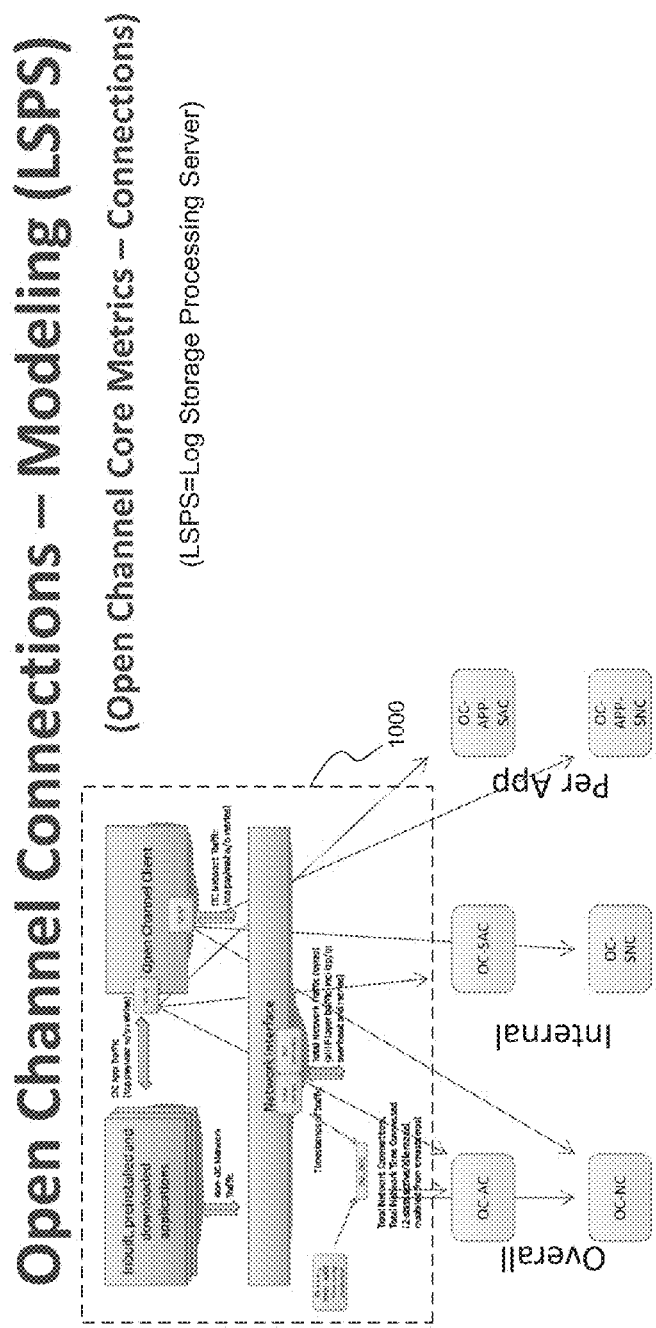
Figure 24D:
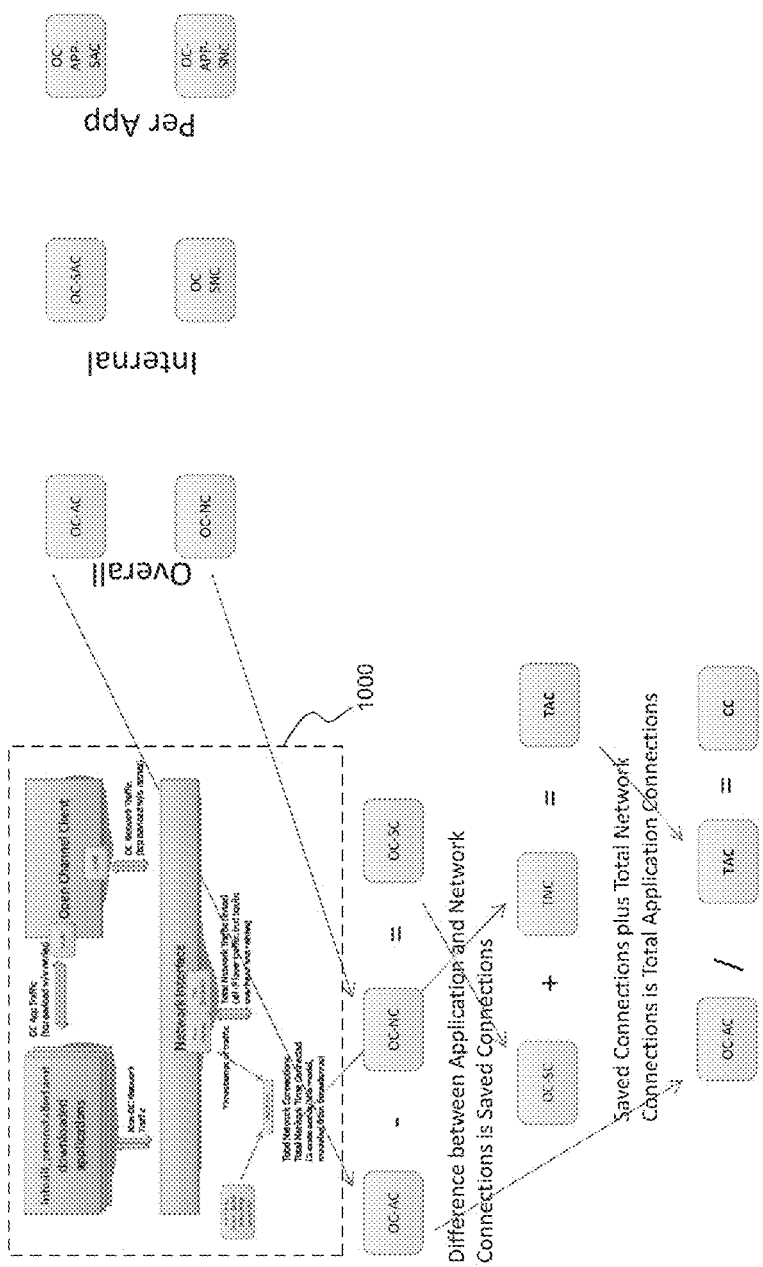
Figure 24E:
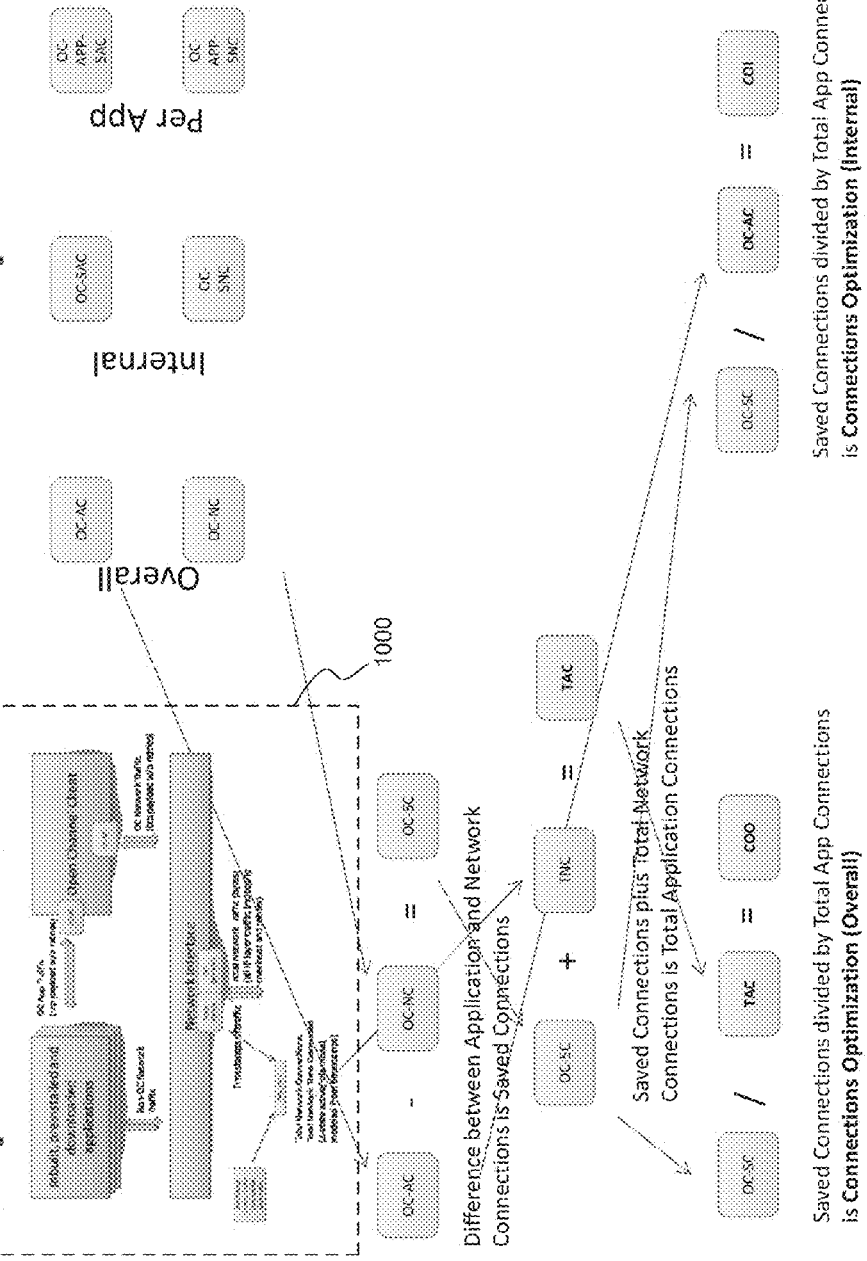
Figure 24F:
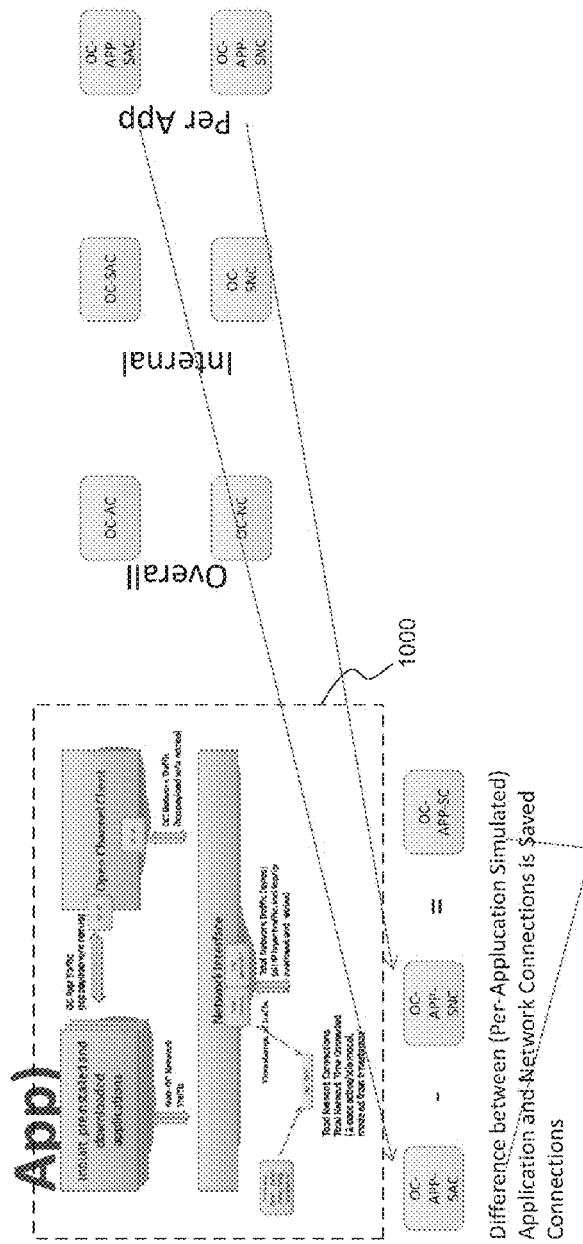
Figure 24G:
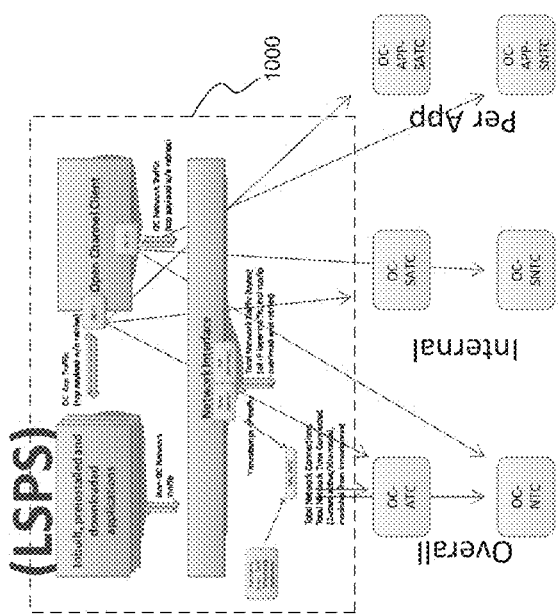
Figure 24H:
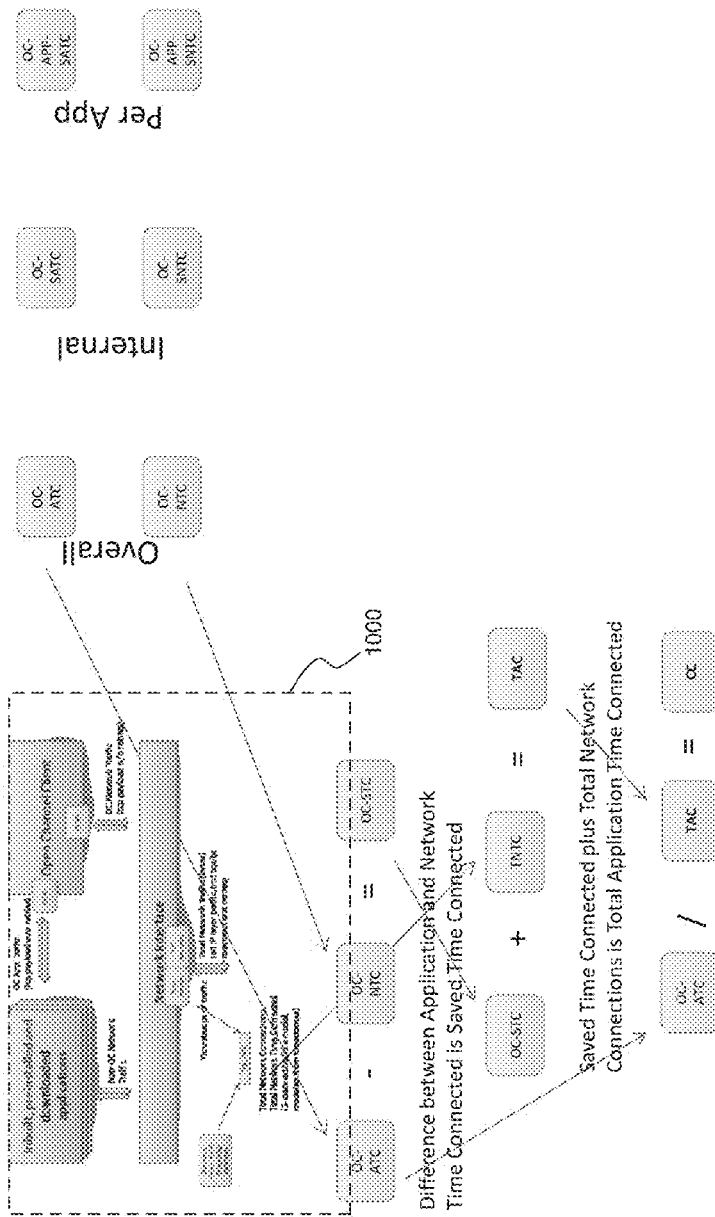
Figure 24I:
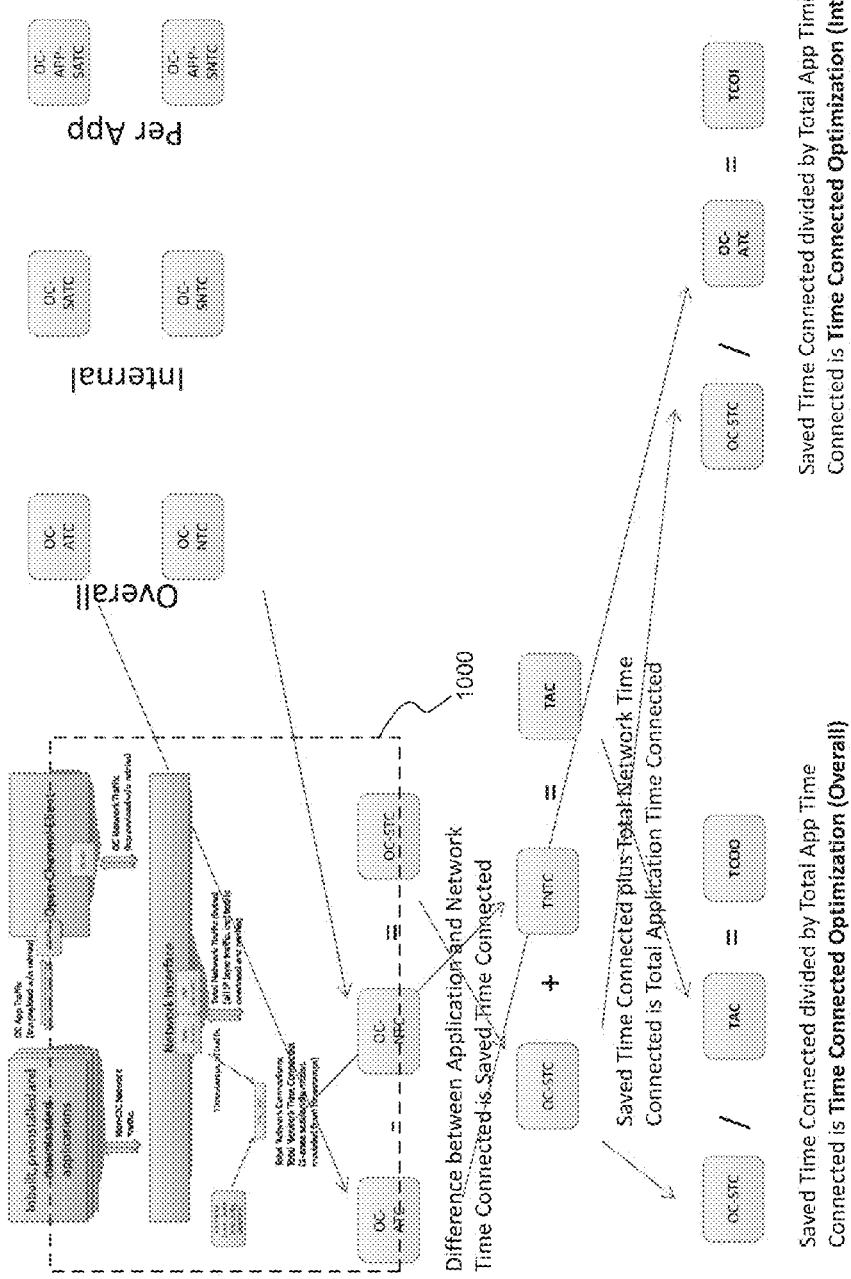
Figure 24J:
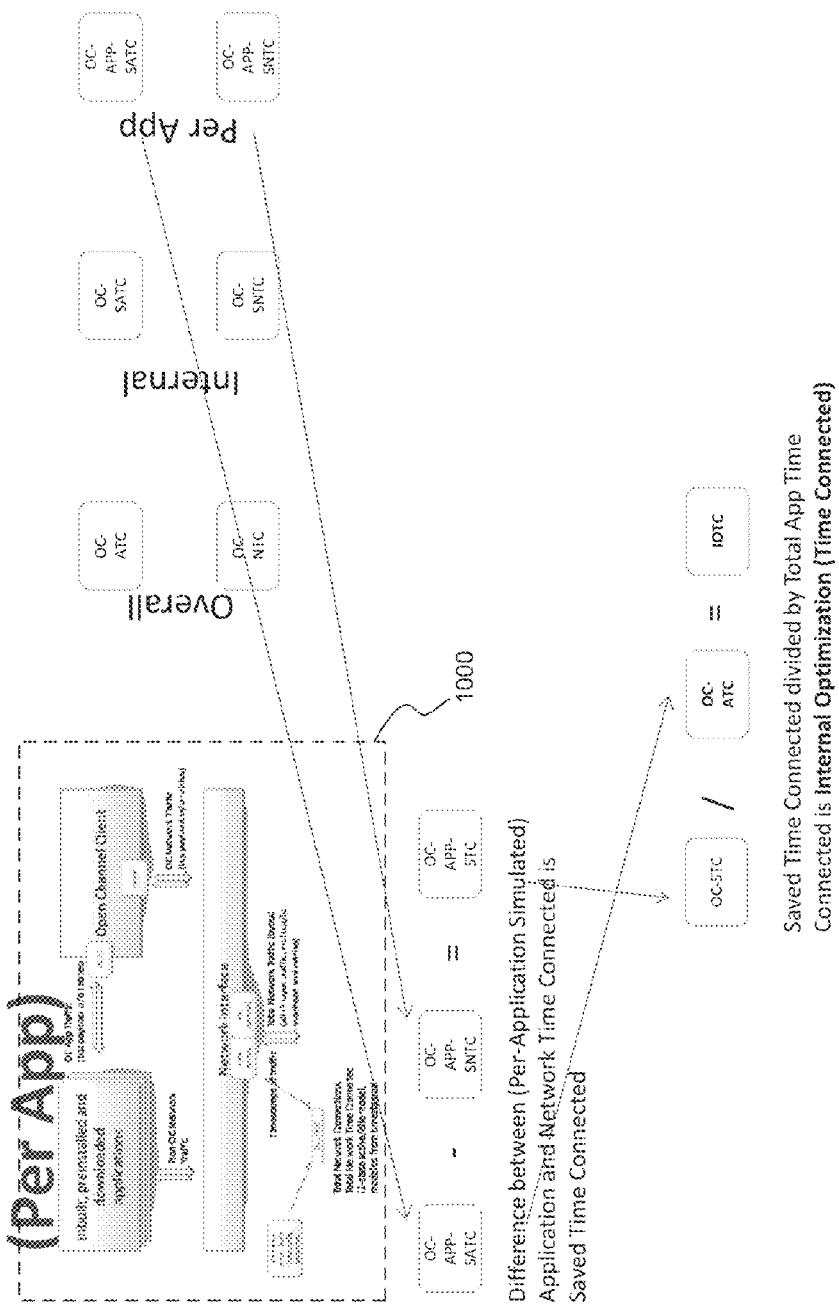

FIG. 22 illustrates various example measurement points from which a analysis core module such as, for example, analysis core 255a of FIG. 2E or analysis core 375a of FIG. 3E, can perform measurements for modeling signals in the data network. Some examples of the output metrics which can be adapted by the analysis core module are listed in FIGS. 23A-23E.

As discussed above, in some embodiments the a analysis core can make various calculations. For example, FIG. 24A graphically illustrates an example of open channel bytes calculations.

In this example, with respect to the HTTPS traffic, the OC's mock certificate is smaller than the certificate received from the network, which would appear as negative savings. For HTTPS handshakes, bytes-to-app are replaced with bytes-from-network. With respect to from-app-bytes only, the OC receives the request irrespective of network availability. Most often caused by network unavailability. In cases when request does not go out to network and is not served from cache, adjust OC-AT-ADJ to 0.

In this example, the difference between (adjusted) Application (App) and Network Traffic is Saved Traffic (i.e., [OC-AT-ADJ]−[OC-NT]=[OC-ST]). The Saved Traffic plus the Total Network Traffic is the total application traffic (i.e., [OC-ST]+[TNT]=[TAT]). The (adjusted) App Traffic divided by the Total App Traffic is the Bytes Coverage (i.e., [OC-AT-ADJ]/[TAT]=BC.

In some embodiments, the open channel bytes calculation's coverage can be affected by:
  Traffic channeled directly to Network Interface instead of through: OC
    TCP ports configured to bypass: IMAP, POP, 7TP
    OC client in failover
    $3^{rd}$ party client reconfiguring traffic flows (typically tethering)

Total Network Traffic recorded for incorrect interfaces: Interfaces defined for TNT are configured manually. New device models need to be verified.

Temporal factors: Total Network Traffic is recorded periodically, while OC Application Traffic is recorded for each transaction. Disruptions in data collection, such as device reboot may cause different cut-off for these metrics. Network change notifications may also appear in a middle of a longer transaction, making it unclear which network interface was used.

TCP/IP and UDP protocol overhead and TCP retransmissions: measured for Total Network Traffic, but not measured for OC Application Traffic.

FIGS. 24A-24J graphically illustrate various calculations of example output metrics that can be used in embodiments of the analysis core module.

Figure 25:
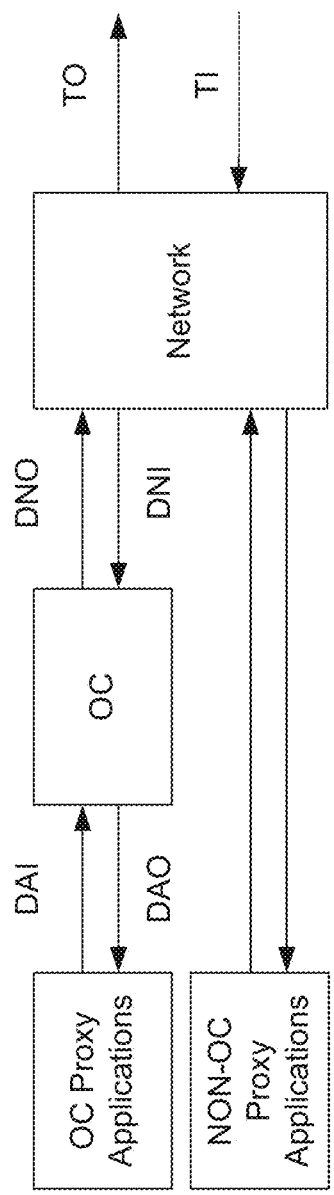
FIG. 25 depicts an example diagram illustrating a general architectural overview of a distributed Open Channel system including the measurement points from which a analysis core module can perform measurements for modeling signals in the data network.

FIG. 25 depicts an example diagram illustrating a general architectural overview of a distributed Open Channel system including the measurement points from which a analysis core module can perform measurements for modeling signals in the data network. FIGS. 26A-26N show additional examples of and/or alternative output metrics that the analysis core module can adapt.

For example, FIGS. 26A-26C illustrate example Data Metrics. FIGS. 26D-26F illustrate example Optimization Metrics. In some embodiments, exception can exist for ISOC/ISOTC: Internal Signaling Optimization formulas do not use simulated values in by protocol calculations. FIG. 26G illustrates example Users Metrics. In some embodiments, the user metrics can be used to provide the unique number of users (e.g., as identified by 7TP address) or user combinations within the time period of concern. Additionally, the metrics may be useful to calculate metrics like bytes/connections per user per day. FIG. 26H illustrates example Battery Metrics. FIGS. 26I-26K illustrate example Signaling Metrics. For example, a Signaling Overall metric can provide the number of state transitions within the time period of concern, broken by the radio state. Likewise, a Time Connected Overall can provide the time connected within the time period of concern, broken by the radio state. FIGS. 26L-26M illustrate example Dimensions Metrics. FIG. 26N illustrates example Optimization Metrics. FIG. 26N illustrates example Optimization Metrics.

Figure 27:
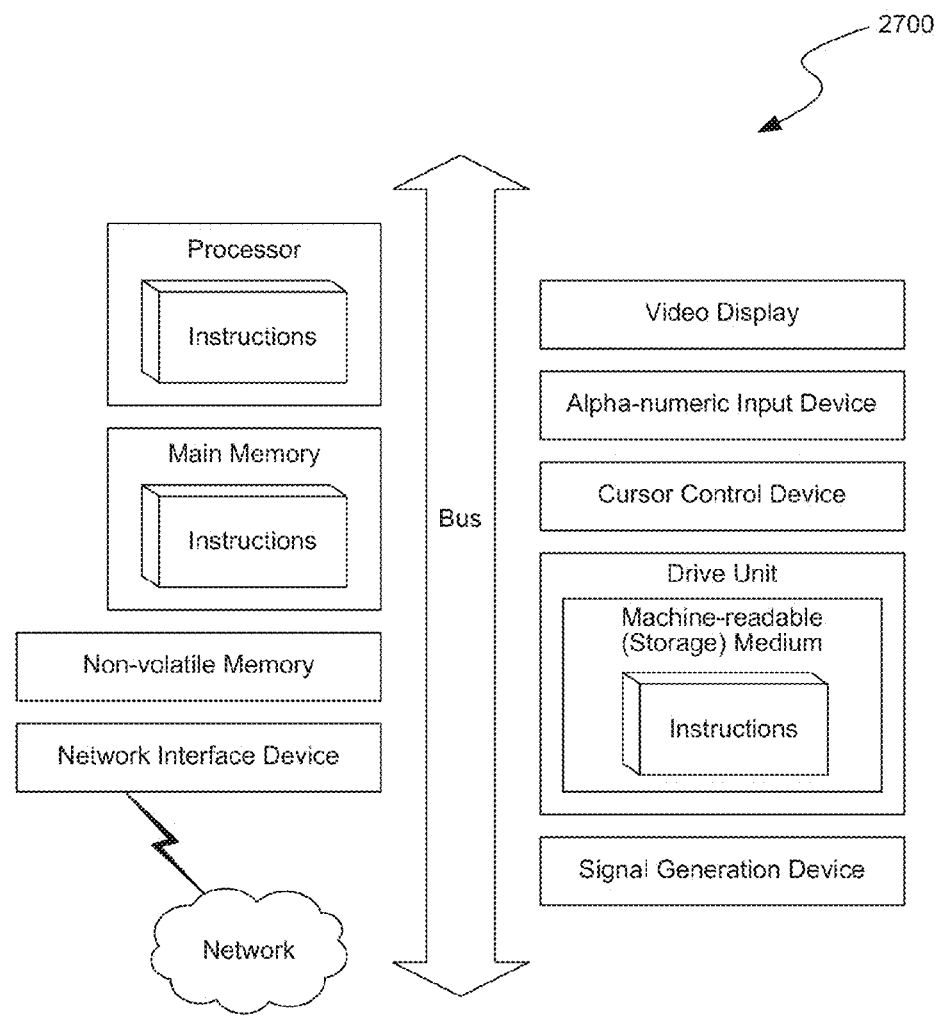
FIG. 27 shows a diagrammatic representation of a machine in the example form of a computer system within which a set of instructions, for causing the machine to perform any one or more of the methodologies discussed herein, may be executed.

FIG. 27 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Additional Embodiments

In some embodiments, a method of modeling signaling in a mobile network is disclosed. The method includes: determining if transactions initiated by mobile applications executing on a mobile device in the mobile network cause network signaling requiring a corresponding radio connection, wherein at least a portion of the network signaling caused by the transactions is filtered by a traffic optimization engine; and modeling the network signaling for the mobile device based, at least in part, on the filtered network signaling.

In some embodiments, the filtered network signaling does not cause a corresponding radio connection.

In some embodiments, modeling the network signaling for the mobile device further comprises calculating signaling efficiency indicating a total number of the radio connections that are saved as a result of the filtering.

In some embodiments, calculating the signaling efficiency further comprises: accessing a radio log and a traffic activity log associated with the mobile device; modeling a quantity of virtual radio connections based on the radio log and the traffic activity log, wherein the virtual radio connections indicate radio connections that would occur but for said filtering; determining a quantity of actual radio connections based on the radio log, wherein the total number of the radio connections that are saved comprises the difference between the quantity of virtual radio connections and the quantity of actual radio connections.

In some embodiments, modeling the network signaling for the mobile device further comprises calculating a time connected efficiency indicating a total radio connection time saved as a result of the filtering.

In some embodiments, calculating the time connected efficiency further comprises: accessing a radio log and a traffic activity log associated with the mobile device; modeling a virtual radio time connected based on the radio log and the traffic activity log, wherein the virtual radio time connected indicates an amount of time that the mobile device radio would be active but for said filtering; determining an actual radio time connected based on the radio log, wherein the actual radio time connected indicates an amount of time that the mobile device radio is active; wherein the total radio connection time saved comprises the difference between the virtual radio time connected and the actual radio time connected.

In some embodiments, the methods further comprise tracking the transactions initiated by the mobile applications executing on the mobile device in the mobile network.

In some embodiments, the methods further comprise applying, by the traffic optimization engine, a traffic optimization technique to filter the network signaling such that at least the portion of the network signaling is filtered.

In some embodiments, the methods further comprise accessing traffic activity logs indicating traffic metrics measured at multiple traffic measurement points in the mobile device, wherein modeling the network signaling further comprises calculating a connection status and a time connected interval based on the traffic metrics.

In some embodiments, modeling the network signaling for the mobile device further comprises attributing the network signaling to individual applications of the mobile applications executing on the mobile device.

In some embodiments, the methods further comprise accessing a radio log and a traffic activity log associated with the mobile device, wherein the radio log indicates a state of a mobile device radio, wherein the traffic activity log indicates various traffic metrics measured at multiple measurement points in the mobile device; and maintaining the traffic activity log by calculating one or more fields.

In some embodiments, modeling the network signaling based on the one or more fields.

In some embodiments, maintaining the traffic activity log comprises long polling.

In some embodiments, the one or more fields are divided into connection flag fields and time connected count fields.

In some embodiments, the one or more fields are categorized into one or more of the following categories: actual, simulated, actual simulated, virtual simulated, actual simulated per application, and virtual simulated per application.

In some embodiments, the traffic optimization engine comprises one or more elements of a distributed caching and proxy system.

In some embodiments, the distributed caching and proxy system includes a proxy client and a proxy server.

In some embodiments, the filtered radio connections are cached locally by the proxy client.

In some embodiments, a method of modeling network signaling in a mobile network is disclosed. The method comprises: accessing a radio log associated with a mobile device operating in the mobile network, the radio log indicating a state of a mobile device radio; accessing a traffic activity log associated with the mobile device, the traffic activity log indicating various traffic metrics measured at multiple measurement points in the mobile device; calculating one or more fields based on one or more of the radio log and the traffic activity log; and modeling the network signaling for the mobile device based on the one or more fields.

In some embodiments, the method further comprises determining if transactions initiated by mobile applications executing on the mobile device in the mobile network cause network signaling requiring a corresponding radio connection on the mobile device, wherein at least a portion of the network signaling caused by the transactions is filtered by a traffic optimization engine.

In some embodiments, the filtered network signaling does not cause a corresponding radio connection on the mobile device and the unfiltered network signaling does cause corresponding radio connection on the mobile device.

In some embodiments, modeling the network signaling further comprises calculating a connection status and a time connected interval based, at least in part, on the one or more calculated fields.

In some embodiments, modeling the network signaling for the mobile device further comprises calculating signaling efficiency indicating a total number of the radio connections that are saved as a result of the filtering.

In some embodiments, calculating the signaling efficiency further comprises: accessing a radio log and a traffic activity log associated with the mobile device; modeling a quantity of virtual radio connections based on the radio log and the traffic activity log, wherein the virtual radio connections indicate radio connections that would occur but for said filtering; determining a quantity of actual radio connections based on the radio log, wherein the total number of the radio connections comprises the difference between the quantity of virtual radio connections and the quantity of actual radio connections.

In some embodiments, modeling the network signaling for the mobile device further comprises calculating a time connected efficiency indicating a total radio connection time saved as a result of the filtering.

In some embodiments, calculating the time connected efficiency further comprises: accessing a radio log and a traffic activity log associated with the mobile device; modeling a virtual radio time connected based on the radio log and the traffic activity log, wherein the virtual radio time connected indicates an amount of time that the mobile device radio would be active but for said filtering; determining an actual radio time connected based on the radio log, wherein the actual radio time connected indicates an amount of time that the mobile device radio is active; wherein the total radio connection time saved comprises the difference between the virtual radio time connected and the actual radio time connected.

In some embodiments, the methods further comprise maintaining the traffic activity log by tracking transactions and measuring the various traffic metrics at the multiple measurement points in the mobile device.

In some embodiments, the one or more fields are divided into connection flag fields and time connected count fields.

In some embodiments, the one or more fields are categorized into one or more of the following categories: actual, simulated, actual simulated, virtual simulated, actual simulated per application, and virtual simulated per application.

In some embodiments, a mobile device is disclosed. The mobile device comprise a radio; a processor; and a memory storing instruction, wherein the instructions, when executed by the processor, causes the mobile device to: access a radio log associated with a mobile device operating in the mobile network, the radio log indicating a state of a mobile device radio; access a traffic activity log associated with the mobile device, the traffic activity log indicating various traffic metrics measured at multiple measurement points in the mobile device; calculate one or more fields based on one or more of the radio log and the traffic activity log; and model the network signaling for the mobile device based on the one or more fields.

In some embodiments, wherein the instructions, when executed by the processor, further causes the mobile device to: determine if transactions initiated by mobile applications executing on the mobile device in the mobile network cause network signaling requiring a corresponding radio connection on the mobile device, wherein at least a portion of the network signaling caused by the transactions is filtered by a traffic optimization engine, wherein the filtered network signaling does not cause a corresponding radio connection on the mobile device and the unfiltered network signaling does cause corresponding radio connection on the mobile device.

In some embodiments, the mobile further comprises a traffic optimization engine comprising one or more elements of a distributed caching and proxy system.

In some embodiments, the distributed caching and proxy system includes a proxy client and a proxy server, and wherein the filtered radio connections are cached locally by the proxy client.

In some embodiments, the instructions, when executed by the processor, further causes the mobile device to: track transactions initiated by mobile applications executing on the mobile device in the mobile network; measure the various traffic metrics at the multiple measurement points in the mobile device; and maintain the traffic activity log based on the measurements.

In some embodiments, to model the network signaling for the mobile device, the instructions, when executed by the processor, further causes the mobile device to calculate signaling efficiency indicating a total number of the radio connections that are saved as a result of the filtering.

In some embodiments, to calculate the signaling efficiency, the instructions, when executed by the processor, further causes the mobile device to: access a radio log and a traffic activity log associated with the mobile device; model a quantity of virtual radio connections based on the radio log and the traffic activity log, wherein the virtual radio connections indicate radio connections that would occur but for said filtering; determine a quantity of actual radio connections based on the radio log, wherein the total number of the radio connections comprises the difference between the quantity of virtual radio connections and the quantity of actual radio connections.

In some embodiments, to model the network signaling for the mobile device, the instructions, when executed by the processor, further causes the mobile device to calculate a time connected efficiency indicating a total radio connection time saved as a result of the filtering.

In some embodiments, to calculate the time connected efficiency, the instructions, when executed by the processor, further causes the mobile device to: access a radio log and a traffic activity log associated with the mobile device; model a virtual radio time connected based on the radio log and the traffic activity log, wherein the virtual radio time connected indicates an amount of time that the mobile device radio would be active but for said filtering; determine an actual radio time connected based on the radio log, wherein the actual radio time connected indicates an amount of time that the mobile device radio is active; wherein the total radio connection time saved comprises the difference between the virtual radio time connected and the actual radio time connected.

In some embodiments, a computer-readable storage medium storing instructions to be implemented by a mobile device having a processor is the discloses. The instructions, when executed by the processor, causes the mobile device to: determine if transactions initiated by mobile applications executing on the mobile device in a mobile network cause network signaling requiring a corresponding radio connection, wherein at least a portion of the network signaling caused by the transactions is filtered by a traffic optimization engine, wherein the filtered network signaling does not cause a corresponding radio connection; and modeling the network signaling for the mobile device based, at least in part, on the filtered network signaling.

In some embodiments, modeling the network signaling for the mobile device further comprises calculating signaling efficiency indicating a total number of the radio connections that are saved as a result of the filtering.

In some embodiments, modeling the network signaling for the mobile device further comprises calculating a time connected efficiency indicating a total radio connection time saved as a result of the filtering.

In some embodiments, the instructions, when executed by the processor, further cause the processor to: access a radio log and a traffic activity log associated with the mobile device, wherein the radio log indicates a state of a mobile device radio, wherein the traffic activity log indicates various traffic metrics measured at multiple measurement points in the mobile device; and maintain the traffic activity log by calculating one or more fields.

In some embodiments, modeling the network signaling is based on the one or more fields.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways.

Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A method of allocating signaling in a mobile network, the method comprising:
    accessing a radio log associated with a mobile device operating in the mobile network, the radio log indicating states of a mobile device radio;
    accessing a traffic activity log associated with the mobile device, the traffic activity log indicating various traffic metrics measured at multiple measurement points in the mobile device;
    modeling an optimization technique that includes filtering, based on the states of the mobile device radio accessed from the radio log and the various traffic metrics accessed from the traffic activity log, to determine whether transactions initiated by mobile applications executing on the mobile device in the mobile network cause network signaling requiring a corresponding radio connection to be established; and
    filtering, by a traffic optimization engine, the network signaling such that at least a first portion of the network signaling is filtered and at least a second portion of the network signaling is unfiltered, wherein the filtered network signaling does not cause a corresponding radio connection and the unfiltered network signaling does cause corresponding radio connection on the mobile device;
    wherein filtering the network signaling includes reducing a number of requests that are satisfied over the mobile network by: accumulating low priority data and sending the low priority data in batches, compressing and/or transcoding the network signaling, and reducing a number of times and/or amount of time that the mobile device radio is powered on.

2. The method of claim 1, further comprising:
    tracking the transactions initiated by the mobile applications executing on the mobile device in the mobile network.

3. The method of claim 2, further comprising attributing the network signaling to individual applications of the mobile applications executing on the mobile device.

4. The method of claim 1, wherein the traffic optimization engine comprises one or more elements of a distributed caching system.

5. The method of claim 4, wherein the distributed caching system includes a client and a remote server.

6. The method of claim 5, wherein the filtered network signaling is cached locally by the client.

7. The method of claim 1, further comprising maintaining the traffic activity log by tracking transactions and measuring the various traffic metrics at the multiple measurement points in the mobile device.

8. The method of claim 1, wherein the modeling the optimization technique includes quantifying a connection savings using the optimization technique.

9. A mobile device comprising:
    a mobile device radio; and
    a processor configured for:
        accessing a radio log associated with the mobile device operating in a mobile network, the radio log indicating states of a mobile device radio;
        accessing a traffic activity log associated with the mobile device, the traffic activity log indicating various traffic metrics measured at multiple measurement points in the mobile device;
        modeling an optimization technique that includes filtering, based on the states of the mobile device radio accessed from the radio log and the various traffic metrics accessed from the traffic activity log, to determine whether transactions initiated by mobile applications executing on the mobile device in the mobile network cause network signaling requiring a corresponding radio connection to be established; and
        filtering, by a traffic optimization engine, the network signaling such that at least a first portion of the network signaling is filtered and at least a second portion of the network signaling is unfiltered, wherein the filtered network signaling does not cause a corresponding radio connection and the unfiltered network signaling does cause corresponding radio connection on the mobile device, wherein filtering the network signaling includes reducing a number of requests that are satisfied over the mobile network by: accumulating low priority data and sending the low priority data in batches, compressing and/or transcoding the network signaling, and reducing a number of times and/or amount of time that the mobile device radio is powered on.

10. The mobile device of claim 9, further comprising the traffic optimization engine comprising one or more elements of a distributed caching system.

11. The mobile device of claim 10, wherein the distributed caching system includes a client and a remote server, and wherein the filtered network signaling is cached locally by the client.

12. The mobile device of claim 9, wherein the processor is configured for:
tracking transactions initiated by mobile applications executing on the mobile device in the mobile network;
updating measurements of the various traffic metrics at the multiple measurement points in the mobile device; and
maintaining the traffic activity log based on the updated measurements.

13. The mobile device of claim 9, wherein the processor is further configured for modeling the optimization technique including quantifying a connection savings using the optimization technique.

14. A non-transitory computer-readable storage medium storing instructions to be implemented by a mobile device having a processor, wherein the instructions, when executed by the processor, cause the mobile device to:
access a radio log associated with the mobile device operating in a mobile network, the radio log indicating states of a radio of the mobile device;
access a traffic activity log associated with the mobile device, the traffic activity log indicating various traffic metrics measured at multiple measurement points in the mobile device;
model an optimization technique that includes filtering, based on the states of the mobile device radio accessed from the radio log and the various traffic metrics accessed from the traffic activity log, to determine whether transactions initiated by mobile applications executing on the mobile device in the mobile network cause network signaling requiring a corresponding radio connection to be established; and
filter, by a traffic optimization engine, the network signaling such that at least a first portion of the network signaling is filtered and at least a second portion of the network signaling is unfiltered, wherein the filtered network signaling does not cause a corresponding radio connection and the unfiltered network signaling does cause corresponding radio connection on the mobile device;
wherein filtering the network signaling includes reducing a number of requests that are satisfied over the mobile network by: accumulating low priority data and sending the low priority data in batches, compressing and/or transcoding the network signaling, and reducing the number of times and/or amount of time that the mobile device radio is powered on.

15. The non-transitory computer-readable storage medium of claim 14, wherein the instructions, when executed by the processor, further cause the mobile device maintain the traffic activity log.

16. The non-transitory computer-readable storage medium of claim 14, wherein the instructions, when executed by the processor, further cause the mobile device to model the optimization technique including quantifying a connection savings using the optimization technique.

* * * * *